US010469373B2

(12) United States Patent
Dong

(10) Patent No.: US 10,469,373 B2
(45) Date of Patent: Nov. 5, 2019

(54) IN-NETWORK AGGREGATION AND DISTRIBUTION OF CONDITIONAL INTERNET OF THINGS DATA SUBSCRIPTION IN INFORMATION-CENTRIC NETWORKING

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 212 days.

(21) Appl. No.: 15/588,465

(22) Filed: May 5, 2017

(65) Prior Publication Data

US 2018/0324091 A1 Nov. 8, 2018

(51) Int. Cl.
*H04L 12/741* (2013.01)
*H04L 12/771* (2013.01)

(52) U.S. Cl.
CPC .............. *H04L 45/54* (2013.01); *H04L 45/56* (2013.01)

(58) Field of Classification Search
CPC ................................ H04L 45/54; H04L 45/56
See application file for complete search history.

(56) References Cited

U.S. PATENT DOCUMENTS

| 10,193,805 | B2* | 1/2019 | Dong | H04L 45/745 |
| 2011/0280214 | A1* | 11/2011 | Lee | H04W 36/023 |
| | | | | 370/331 |
| 2015/0139166 | A1* | 5/2015 | Yao | H04L 67/00 |
| | | | | 370/329 |
| 2015/0281083 | A1* | 10/2015 | Kim | H04L 45/7457 |
| | | | | 370/235 |
| 2017/0012867 | A1* | 1/2017 | Royon | H04L 45/42 |
| 2017/0093691 | A1* | 3/2017 | Garcia-Luna-Aceves | |
| | | | | H04L 45/12 |
| 2017/0257904 | A1* | 9/2017 | Mildh | H04W 68/005 |
| 2017/0264536 | A1* | 9/2017 | Wood | H04L 45/54 |
| 2017/0302631 | A1* | 10/2017 | Wood | H04L 45/306 |

(Continued)

OTHER PUBLICATIONS

Xylomenos et al., A Survey of Information-Centric Networking Research, Communications Surveys and Tutorials, vol. 16, No. 2, 2014, p. 1024-1049.

(Continued)

*Primary Examiner* — Jerry B Dennison
(74) *Attorney, Agent, or Firm* — Vierra Magen Marcus LLP

(57) ABSTRACT

The disclosure relates to technology for routing data in an information centric network (ICN). A first interest message received at a router in the ICN is identified as including a first subscription request and a first notification condition from a first subscriber. The method then determines whether the first notification condition has an overlap with a second notification condition included in a second subscription request stored in a forwarding information base (FIB) of the router, where the second subscription request is included in a second interest message that was received at the router and forwarded by the router towards a producer of the data. The first notification condition may then be aggregated with the second notification condition by changing the first notification condition in the first subscription message based on the second notification condition.

22 Claims, 16 Drawing Sheets

(56) References Cited

U.S. PATENT DOCUMENTS

| | | | | |
|---|---|---|---|---|
| 2017/0373974 A1* | 12/2017 | Wood | ............... | H04L 45/20 |
| 2018/0041438 A1* | 2/2018 | Wood | ............... | H04L 45/748 |
| 2018/0041608 A1* | 2/2018 | Wood | ............... | H04L 45/54 |
| 2018/0046667 A1* | 2/2018 | Wood | ............... | H04L 67/1097 |
| 2018/0069791 A1* | 3/2018 | Dong | ............... | H04L 45/54 |
| 2018/0375771 A1* | 12/2018 | Wood | ............... | H04L 45/20 |

OTHER PUBLICATIONS

Baccelli et al., Information Centric Networking in the IoT: Experiments with NDN in the Wild, ICN'14, Sep. 24-26, 2014, Paris, France.

Amadeo et al., Named Data Networking for IoT: an Architectural Perspective, in European Conference on Networks and Communications (EuCNC), 2014.

Zhang et al., Named Data Networking (NDN) Project, NDN Technical Report NDN-0001, Oct. 31, 2010.

Carzaniga et al., Content-Based Publish/Subscribe Networking and Information-Centric Networking, ICN '11, Aug. 19, 2011, Toronto, Ontario, Canada.

Chen et al., COPS: An Efficient Content Oriented Publish/Subscribe System, Technical Report No. IFI-TB-2011-06, ISSN 1611-1044.—Aug. 28, 2011.

Object Management Group, Data Distribution Service (DDS), Version 1.4, Apr. 10, 2015.

Shelby et al., The Constrained Application Protocol (CoAP), Jun. 2014.

K. Hartke, Observing Resources in the Constrained Application Protocol (CoAP), Sep. 2015.

* cited by examiner

```
                                          ,-200
    ┌─────────────────────────────────────────────────────────────┐
    │ Content Name/Topic Name                                     │
    ├─────────────────────────────────────────────────────────────┤
206 │ Retrieve/Subscribe/Notification bits in indicating whether  │
    │ it is a normal interest message or subscription message or  │
202 │ notification message.                                       │
    │ 00-normal interest, it is processed as legacy.              │
    │ 10-subscription message, it does not require reply.         │
    │ 11-notification message, it does not require reply.         │
    ├─────────────────────────────────────────────────────────────┤
    │ Conditions (could include multiple conditions connected by  │
    │ AND OR. This is an optional field)                          │
204 │ (Condition is represented by property + operator + value)   │
    └─────────────────────────────────────────────────────────────┘
```

*FIG. 2A*

| Retrieve/Subscribe/Notification bits | Content Name | Associated Condition |
|---|---|---|
| 00 | /example.com/dataxyz | |

*FIG. 2B*

Subscription Request 228

| Retrieve/Subscribe/Notification bits | Content Name | Associated Subscription Condition |
|---|---|---|
| 10 | /example.com/temp | Value<40 |

*FIG. 2C*

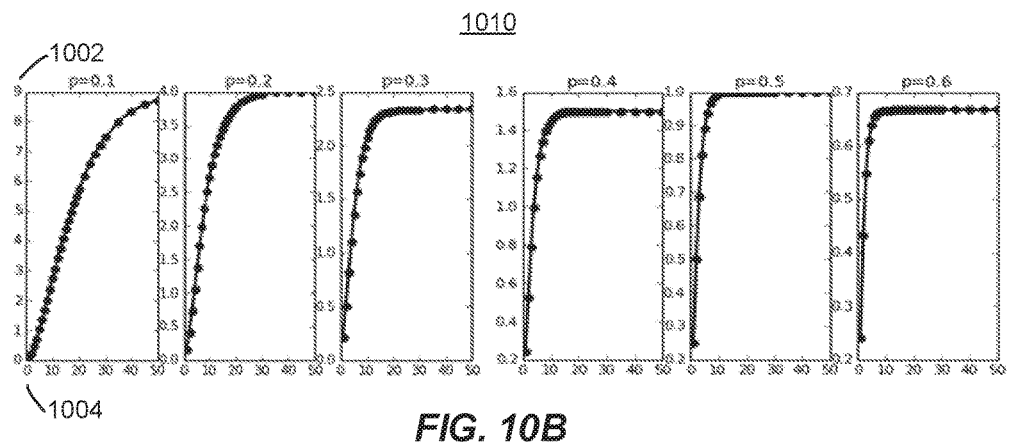
FIG. 10B
FIG. 10C
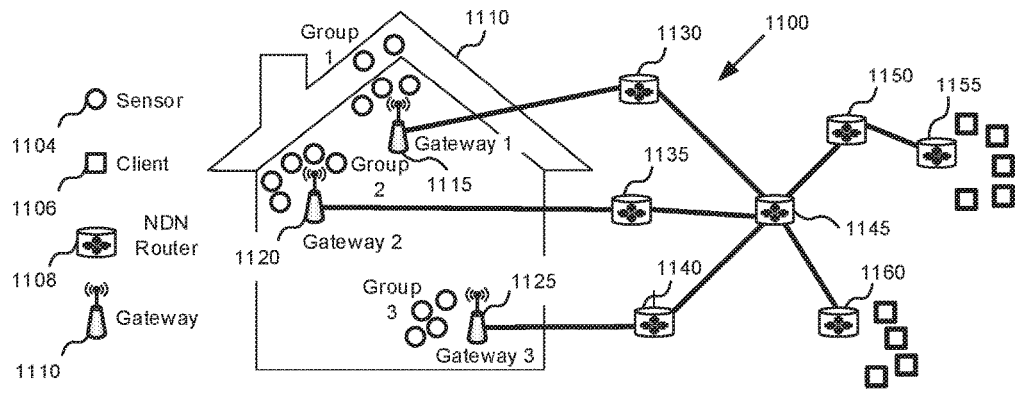
FIG. 11

IN-NETWORK AGGREGATION AND DISTRIBUTION OF CONDITIONAL INTERNET OF THINGS DATA SUBSCRIPTION IN INFORMATION-CENTRIC NETWORKING

BACKGROUND

In the traditional TCP/IP (Transmission Control Protocol/Internet Protocol) model, the client requesting some content needs to first map the URL (Uniform Resource Locator) in the name of the content to a server. This server will mostly stay the same for the length of the session. The session is actually bound to this server, and the session's goal is to transfer the specific content held from this server. In such host-centric networking paradigm, the core networking primitives revolve around naming hosts and network interfaces. Network devices can only forward packets according to the destination addresses.

Recently, information-centric networking (ICN) has been proposed. Examples of ICN include, but are not limited to, Named Data Networking (NDN), Content Centric Networking (CCN), Content Oriented Networking (CON), Data Oriented Networking (DON), and Content Based Networking (CBN). Unlike traditional host-centric networking, information is directly named in an ICN. Thus, ICN allows a client device to focus on the data needed, as opposed to referencing a specific location from which the data may be retrieved.

According to some in the field, ICN has emerged as a promising candidate for the architecture of the future Internet as well as the future Internet of Things (IoT). ICN integrates name-based routing and in-network caching as part of the network infrastructure. There are several proposals for ICN. One proposal is Named Data Networking (NDN). An NDN router maintains three data structures: the Forwarding Information Base (FIB) that associates the content names to the forwarding face(s) towards the producer(s), the Pending Interest Table (PIT) that records the incoming faces where the interests came from and have not replied by producer, the Content Store (CS) that caches content from a producer when it is forwarded to the requesters.

BRIEF SUMMARY

According to one aspect of the present disclosure, there is provided a method that includes: identifying a first interest message received at a router in the ICN as including a first subscription request and a first notification condition from a first subscriber, determining that the first notification condition has an overlap with a second notification condition included in a second subscription request stored in a forwarding information base (FIB) of the router, the second subscription request included in a second interest message that was received at the router and forwarded by the router towards a producer of the data, and aggregating the first notification condition with the second notification condition by changing the first notification condition in the first subscription message based on the second notification condition.

Optionally, in any of the preceding aspects, another implementation of the aspect provides that the first interest messages has a first subscriber forwarding face and the second interest messages has a second subscriber forwarding face, the forwarding information base (FIB) includes a forwarding face list to producer (FFLP) and a forwarding face list to subscriber (FFLS), and the method further includes forwarding data received in a notification message by at least one producer to first and second subscribers when the first and second subscriber notification conditions are respectively satisfied by the producer.

Optionally, in any of the preceding aspects, another implementation of the aspect provides that the determining includes determining whether the first and second interest messages are for more than one producer, and determining whether the first notification condition overlap with the second notification condition is one of a subset of, a superset of, or intersects with the second notification condition, and the aggregating further includes recording the first notification message based on one of whether the first and second interest messages are for more than one producer, or whether the first notification condition is a subset of, a superset of, or intersects with the second notification condition.

Optionally, in any of the preceding aspects, another implementation of the aspect provides that when the first notification condition is a subset of the second notification condition, the aggregating further includes dropping the first subscription message, and recording the first subscriber forwarding face of the first subscription message and the first notification condition in the forwarding face list to subscriber (FFLS) of the forwarding information base (FIB).

Optionally, in any of the preceding aspects, another implementation of the aspect provides that when the first notification condition does not intersect with any notification condition stored in the forwarding information base (FIB), and a forwarding face to a producer is stored in the forwarding face list to producer (FFLP) that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), forwarding the first subscription message with the first notification condition to the forwarding face to a producer that has not been associated with any notification condition in the forwarding information base (FIB), and updating the forwarding face list to producer (FFLP) of the forwarding information base (FIB) according to the forwarding.

Optionally, in any of the preceding aspects, another implementation of the aspect provides that when the first notification condition does not intersect with any notification condition stored in the forwarding information base (FIB), and a forwarding face to a producer is not stored in the forwarding face list to producer (FFLP) that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), randomly selecting a forwarding face to a producer in the FFLP, combining the first notification condition with a notification condition associated with the randomly selected forwarding face in the FFLP, forwarding the first subscription message with the combined notification condition to the randomly selected forwarding face, and updating the forwarding face list to producer (FFLP) of the forwarding information base (FIB) according to the forwarding.

Optionally, in any of the preceding aspects, another implementation of the aspect provides that when the first notification condition is a superset of the second notification condition and does not intersect with any other notification condition stored in the forwarding information base (FIB), the first and second interest messages are for more than one producer, and a forwarding face to a producer is stored in the forwarding face list to producer (FFLP) that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), changing the first notification condition in the first subscription message to a disjoint set between the superset and subset conditions of the first and second notification conditions, forwarding the first subscription message with the changed first notification condition to the forwarding face to a producer that has not been associated with any notification condition in the forwarding information base (FIB), and updating the forwarding face list to producer (FFLP) of the forwarding information base (FIB) according to the forwarding.

Optionally, in any of the preceding aspects, another implementation of the aspect provides that when the first notification condition is a superset of the second notification condition and does not intersect with any other notification condition stored in the forwarding information base (FIB), the first and second interest messages are for more than one producer, and a forwarding face to a producer is not stored in the FFLP that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), forwarding the first subscription message to a forwarding face to a producer with which the second notification condition is associated, changing the second notification condition in the FFLP to be the first notification condition, and updating the forwarding face list to producer (FFLP) of the forwarding information base (FIB) according to the forwarding.

Optionally, in any of the preceding aspects, another implementation of the aspect provides that when the first notification condition intersects with at least the second notification condition stored in the forwarding information base (FIB), the first and second interest messages are for more than one producer, and a forwarding face to a producer is stored in the forwarding face list to producer (FFLP) that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), changing the first notification condition in the first subscription message to a disjoint set from intersected conditions of the first and at least the second notification conditions, forwarding the first subscription message with the changed first notification condition to the forwarding face to a producer that has not been associated with any notification condition in the forwarding information base (FIB), and updating the forwarding face list to producer (FFLP) of the forwarding information base (FIB) according to the forwarding.

Optionally, in any of the preceding aspects, another implementation of the aspect provides that when the first notification condition intersects with at least the second notification condition stored in the forwarding information base (FIB), the first and second interest messages are for more than one producer, and a forwarding face to a producer is not stored in the forwarding face list to producer (FFLP) that has not been associated with any notification condition in the forwarding information base (FIB), the aggregating further includes recording the first subscriber forwarding face and the first notification condition of the first subscription message in the forwarding face list to subscriber (FFLS) of the forwarding information base (FIB), changing the first notification condition in the first subscription message to a disjoint set from intersected conditions of the first and second notification conditions, randomly selecting a forwarding face to a producer in the FFLP, forwarding the first subscription message with the changed first notification condition to the randomly selected forwarding face to a producer, and updating the forwarding face list to producer (FFLP) of the forwarding information base (FIB) according to the forwarding.

Optionally, in any of the preceding aspects, another implementation of the aspect provides that the method further includes receiving data from at least one producer at the router device, comparing the data to the recorded notification condition in FFLS, and forwarding the data via the matching subscriber forwarding faces toward the subscribers when the data satisfies the recorded notification condition in FFLS.

Optionally, in any of the preceding aspects, another implementation of the aspect provides that the first and second interest messages are encoded with bits identifying the first and second interest messages as having the first and second subscription requests and the first and second notification conditions, and the first and second interest messages are not stored in a pending interest table (PIT) of the router.

According to one aspect of the present disclosure, there is provided an apparatus that includes a non-transitory memory storage comprising instructions, a forwarding information based (FIB) stored on the storage, the forwarding information base (FIB) including a forwarding face to a producer for named content and subscriber forwarding faces for the named content, and one or more processors in communication with the memory, wherein the one or more processors execute the instructions to perform forwarding data to subscribers based on the forwarding face for the subscribers and as a function of in an information centric network (ICN) the router device is part of, identifying a first interest message received at the router device as including a first subscription request and a first notification condition from a first subscriber, determining that the first notification condition has an overlap with a second notification condition included in a second subscription request stored in a forwarding information base (FIB) of the router device, the second subscription request included in a second interest message that was received at the router device and forwarded by the router device towards a producer of the data, and aggregating the first notification condition with the second notification condition by changing the first notification condition in the first subscription message based on the second notification condition.

According to one aspect of the present disclosure, there is provided a non-transitory computer-readable medium storing computer instructions for routing data in an information centric network (ICN), that when executed by one or more processors, cause the one or more processors to perform the steps of identifying a first interest message received at a router in the ICN as including a first subscription request and a first notification condition from a first subscriber, determining that the first notification condition has an overlap with a second notification condition included in a second subscription request stored in a forwarding information base (FIB) of the router, the second subscription request included in a second interest message that was received at the router and forwarded by the router towards a producer of the data, and aggregating the first notification condition with the second notification condition by changing the first notification condition in the first subscription message based on the second notification condition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 2A illustrates an example interest message with subscription/notification interest messages according to example embodiments.

FIG. 2B illustrates data or fields of a conventional interest message to example embodiments.

FIG. 2C illustrates data or fields of subscription interest message that may facilitate content subscription initiated content notification according to example embodiments.

FIG. 10B illustrates graphs for a number of hops for linear increases in aggregation probabilities at different levels according to example embodiments.

FIG. 10C illustrates graphs for a number of hops for exponential increases in aggregation probabilities at different levels according to example embodiments.

FIG. 11 is a block diagram of a use case scenario for processing of subscription interest messages according to example embodiments.

DETAILED DESCRIPTION

Figure 1:
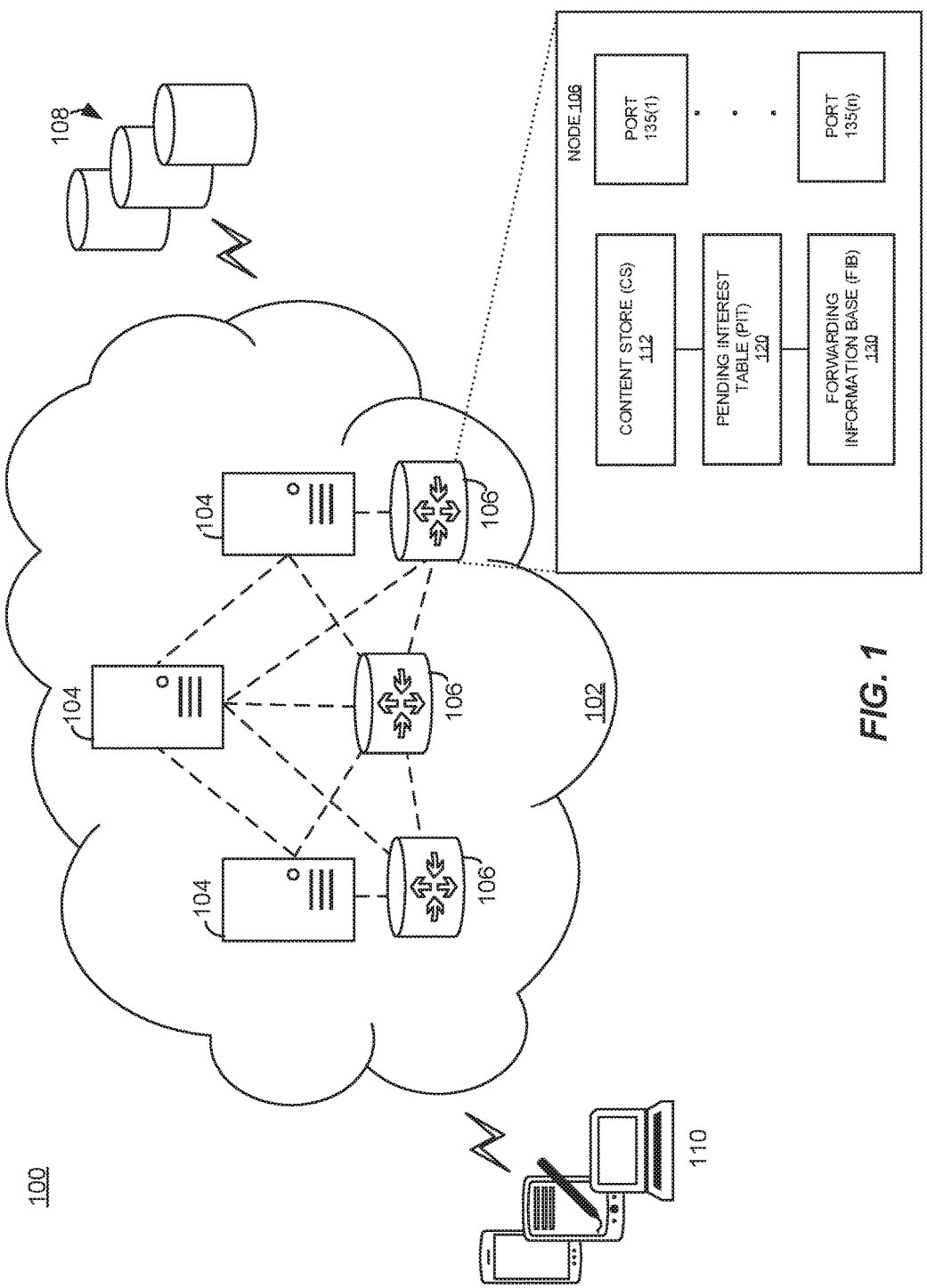
FIG. 1 illustrates a network environment an information centric network according to example embodiments.

The present disclosure relates to technology for routing data in an information centric network (ICN), and in particular to in network aggregation and distribution of conditional data subscriptions in an ICN.

Although ICN network protocols exist, there is a lack of mechanisms to support conditional subscription, such as where consumers receive notifications for content when various conditions are satisfied, as opposed to notifications for all content and topics regardless of any change. Various approaches that have been attempted to provide such support suffer from drawbacks including the need to maintain a network state by occupying the pending interest table (PIT) of network routers, maintaining predicates that are closely related to content names as separate entries in the forwarding information base (FIB) of network routers, or creating a bottleneck for notification propagation rendezvous nodes (RN) of the network.

Embodiments of the present disclosure support subscription/notification in ICNs, such that consumers can receive notifications when or at the time that specified conditions are satisfied by the updated (changed) content, without receiving all notifications. According to some embodiments, this may be accomplished by using content routers in the network that can change or aggregate subscription message notification conditions and/or distribute such subscriptions amongst multiple producers. For example, a router in an ICN may identify a received first interest message as including a first subscription request and a first notification condition from a first subscriber. The router may then determine that the first notification condition has an overlap with a second notification condition included in a second subscription request stored in a forwarding information base (FIB) of the router, where the second subscription request has been included in a second interest message that was previously received at the router and forwarded towards a producer. The router may then aggregate the first notification condition with the second notification condition (this may include changing the first notification condition in the first subscription message based on the second notification condition).

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Embodiments described herein address routing of interest messages within information-centric networks (ICN) and specifically within a named data network (NDN). In one embodiment, when an NDN router receives a "normal" interest message (e.g., not a "subscription" or a "notification" interest message—see FIG. 2), which contains the name of the requested content, the router first checks if there is a locally cached copy of the content in the router's CS. If a local copy exists, the NDN router can simply reply to the interest message by sending the content copy to the incoming face of the interest. Otherwise, the NDN router checks if there are pending interests in the router's PIT with exactly the same content name. If the same interest exists and is pending, then the incoming face of the incoming interest is added to the face list for the content name in the PIT. In this instance, the interest does not need to be further forwarded. Otherwise, the NDN router forwards the interest message by doing a longest-match lookup in the router's FIB based on the content name, and the interest is stored in the PIT (e.g., finding the matchup in FIB that has the longest name matching that of the name of the content requested). If no matching entry is maintained in the FIB, then the interest is forwarded to all the faces other than the incoming face.

When a data message reaches a NDN router, it decides whether to cache the content based on the local caching criteria after validation. An exact match in the PIT indicates that the content has been requested through the interests which have been forwarded by the NDN router. The data message is forwarded to the incoming face(s) where the interest(s) arrived.

In Named Data Networking (NDN), communications often form a usage pattern in which consumers request named content. In addition to retrieving and delivering named content based on requests, subscriptions and notifications is another important form of communication. This is particularly true in the Internet of things (IoT), in which the subscription/notification communication pattern is frequently adopted for announcement of events, such as a natural disaster, fire alarm, monitored environmental conditions, merchandise price change, etc. In this case, the notification flow is producer initiated instead of consumer (e.g., subscriber) initiated. For example, the producer pushes some information that would be delivered to the subscribed consumers.

Several approaches to support subscription/notification in NDN networks have been made, including the long-lived interests approach. In this approach, when a consumer sends an interest to the producer, the interest stays active to the producer and the NDN routers for a period of time. However, this approach has several drawbacks, including the problem of maintaining the network state by occupying the pending interest table (PIT). Complicating matters, if there are a limited number of PIT entries that can be maintained by an intermediate NDN router, the later pending interests may be discarded by the router. Another drawback to the long lived interest is that it only triggers one content information delivery when an event occurs at the producer, thereby requiring the consumer to send the long-lived interest again for future events. Still a further drawback is that each content information matching multiple long-lived interests from different consumers (the NDN routers are not able to aggregate them in the PIT since each interest may be associated with different alive periods) is delivered separately and independently to the consumers by the routers.

Another approach to support subscription/notification in NDN networks is that consumers subscribe by declaring a predicate that expresses their interests, and those predicates are used as the addresses given to a routing protocol that populates the FIBs. In this approach, the predicates are defined as interests and the predicates are maintained in FIB. However, the predicates are closely related to content names, which should not be maintained as separate entries in the FIB, which has limited space.

In still another approach, Content-Oriented Pub/Sub System (COPSS) is employed as an efficient content-centric pub/sub system. COPSS provides a push based multiple-sender, multiple-receiver multicast capability with the use of rendezvous node (RN). Consumers subscribe to a content descriptor (CD), which allows for contextual identification of information and supports hierarchies in specifying subscriptions. The RN is responsible for receiving and handling content publishing from all publishers and forwards the new content to the subscribers. However, the RN is likely to become the bottleneck for notification propagation.

COPSS maintains a separate subscription table (ST) in routers based on the CDs. In this scenario, the FIB and ST disconnect any linkage between the names and the associated CDs of content, which results in consumers not being aware of the exact name of the notified content. Thus, consumers cannot subscribe to the content for new versions/content values. Moreover, such an approach may result in severe network congestion when there are multiple new contents that match the CD, which would be notified to all subscribers, even though the new contents may contain the same information. For example, in a smart building scenario, there are a large number of temperature sensors scattered in the building. A consumer subscribes to temperature data in the building by specifying the CD as building/temperature. The temperature sensors become the producers/publishers of the temperature data. When there is change in the building temperature, all temperature sensors will publish it to the RN, which in turn will propagate the notification to all subscribers in the network. Thus, a better solution may be to distribute the subscriptions to producers such that each subscriber only receives an update from one of the producers.

Although these existing approaches attempt to support basic subscription/notification in ICNs, each has a drawback as described above. On the other hand, conditional content subscription may be essential if consumers want to receive notifications when the specified conditions are satisfied by the updated content information. For example, a consumer only requires receiving notification of the floor temperature of a building under the condition that the temperature value is less than 40 degrees Fahrenheit because the temperature being below this value may indicate that there is leakage in the pipes of the building.

Many of the existing IoT application layer protocols, such as open messaging gateway (OMG) Data Distribution Service (DDS) and Internet Engineering Task Force (IETF) Constrained Application Protocol (CoAP), define mechanisms for conditional content subscription, which requires a corresponding support by the underlying protocol stack.

DDS has a Content_Filtered_Topic class, which describes subscription that indicates the subscriber does not want to necessarily receive all values of each instance published under the Topic. Rather, it provides that a subscriber may see only the values whose contents satisfy certain criteria. The selection of the content is done using the filter expression with parameters expression_parameters.

CoAP Observe extends CoAP with a mechanism for a CoAP client to "observe" a resource on a CoAP server. The client retrieves a representation of the resource and requests the representation be updated by the server as long as the client is interested in the resource. This extension of the protocol also maintains the properties of Representational State Transfer (REST). In this extension, the CoAP server determines under what conditions resources change their state and when observers are notified of new resource states. The server decides to expose observable resources that change their state in a way that is useful in the application context. Thus, by designing CoAP resources that change their state on certain conditions, it is possible to update the client only when these conditions occur instead of supplying it continuously with raw sensor data. For example, a CoAP server with an attached temperature sensor could expose one or more of the following resources:

<coap://server/temperature/felt>, which changes its state to "HOT" whenever the temperature reading increases above a certain preconfigured threshold, and to "COLD" whenever the reading drops to a lower threshold;

<coap://server/temperature/critical?above=90>, which changes its state based on the client-specified parameter value: every few seconds to the current temperature reading if the temperature exceeds the threshold.

FIG. 1 illustrates a network environment 100 to provide content as requested by different users in an information centric network (ICN). Herein, the term "ICN" can refer to either an information centric network or information centric networking, depending on the context. The ICN 102 may be, but is not limited to, a Named Data Network (NDN), Content Centric Network (CCN), Content Oriented Network (CON), Data Oriented Network (DON), or Content Based Network (CBN). The network environment 100 may include the ICN 102 having controllers, such as ICN managers 104. The ION managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISPs).

ICN 102 may also include routers (or nodes) 106, which may include storage to cache content as it propagates through the ION 102. The routers 106 may also be communicatively coupled with the ICN managers 104 and may be configured to process requests received from users for accessing the content via user devices 110, such as a mobile device or computer. In one embodiment, the ICN is compliant with a NDN protocol.

The routers 106 may collaborate for caching content with one or more other routers 106 in the network, such as an ICN, which may be configured as follows. A router 106 may comprise three main data structures: the Forwarding Information Base (FIB) 130 that may associate the content names to the forwarding face(s) towards the producer(s), the Pending Interest Table (PIT) 120 that may record the incoming faces where the interests came from and have not replied by producer, and the Content Store (CS) 112 that may cache content from a producer when it is forwarded to the requesters. It may also include input/output (I/O) ports 135(1) to 135(n). The I/O ports are configured to receive and transmit data from/to other nodes.

The CS 112 may be used (e.g., in non-transitory memory storage) to cache (for relatively short time) or store (for relatively longer time) content data. The CS 112 may also receive and associate interests (user requests for content) with corresponding content data (requested content).

In some embodiments, PIT 120 may be any data structure (e.g., a table, list, or database) used to record and keep track of the received interests (requests for content) that are being served or pending (until the corresponding requested content data is received). Thus, the PIT may be used to route data packets.

The overhead associated with the PIT 120 can be a limiting factor in achieving desired high data rates. This may especially be so in the core of an ICN. A factor in the slowdown is that large table sizes for the PIT 120 may need to be installed on matching larger but slower memory modules. Note that a content router may need to store tens of millions of entries in the PIT 120 at one time, which may depend on multiple factors, such as link rate, round trip times, timeout period to expire the non-responded entries. Therefore, PIT 120 processing may slow the rate of both interest packet and data packet forwarding.

Embodiments disclosed herein avoid the use of the PIT 120, at least in a portion of the ICN for subscription/notification interest message processing (e.g., consumer fulfilment). For example, notification conditions of multiple messages may be aggregated at routers and/or distribute among multiple producers by routers without writing subscription interest messages or subscription requests to a PIT 120. By aggregating notification conditions it is possible for routers to satisfy consumer subscription requests and forward notification interest packets in an ICN without storing subscription requests or notification conditions in PITs of the routers.

In some embodiments, by aggregating notification conditions and distributing notification conditions of subscription requests received in subscription interest messages as described herein, the overhead associated with the PIT 120 can be reduced thus achieving desired high data rates for the ICN, such as by reducing large table sizes for the PIT 120, leading to increased rates of both interest packet and data packet forwarding.

In some embodiments, such aggregating and distributing of notification conditions as described herein, may be described as "in network aggregation" or "in network distribution" of conditional internet of things data subscription in information-centric networking.

The FIB 130 may be any data structure (e.g., a table, list, or database) used to associate content with corresponding ports (for next hops) on which the interests and content data are received and forwarded. The FIB 130 entries may indicate the next hops on which content (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The FIB 130 may be stored in any non-transitory memory storage. The data plane may comprise operations for transferring content information (interest and data) in the ICN, and the control plane may comprise operations related to controlling network operations including the data plane operations. The data structures above may be stored and maintained in a storage or memory unit of the router 106.

The network environment 100 may further include data stores 108, which may store the content or collections of content, such as files, images, videos, and the like. Accordingly, the managers 104 and the routers 106 may communicate with the data stores 108 to provide (e.g., be a "producer" of) the content to different users. Additionally, the network environment 100 may include one or more user devices 110, including for example and without limitation, desktop computers, hand-held devices, laptops or other portable computers, network computers, mobile phones, landline phones, and the like.

The user equipment (UE) 110 may have a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

The UE 110 represents any suitable end user device and may include such devices (or may be referred to) as a UE, mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

The information centric network 102 may include the hardware and software that provides an information centric network. In one embodiment, the information centric network 102 provides a wireless network. The information centric network 102 may include one or more computer systems. The computer system is a server, in one embodiment. The information centric network 102 may provide wireless communication to UE 110 in accordance with a wireless communication protocol. The information centric network 102 can include a collection of gateways through which wireless traffic passes. The ICN 102 may be compliant with an evolved packet core (EPC). However, the ICN 102 is not required to be EPC compliant. In one embodiment, the ICN 102 includes a Serving Gateway (Serving GW), a Packet Data Network Gateway (PDN GW), a Mobility Management Entity (MME) and a Home Subscriber Server (HSS). However, it is not required to include these elements in the ICN 102.

Although FIG. 1 illustrates one example of a communication system, various changes may be made to FIG. 1. For example, the network environment 100 could include any number of UEs 110, nodes 106, managers 104, data stores 108, or other components in any suitable configuration.

FIG. 2A is a description of an interest message that adds subscription/notification interest messages, with optional notification conditions according to example embodiments. The interest message 200 may facilitate consumer initiated content retrieval, content subscription and producer initiated content notification by adding bits 202 indicating the type of interest message and conditions 204 for the message. In some embodiments, the message already includes a content name 206 (e.g., as a legacy) which indicates the name of the data content desired by a subscriber (also known as a customer). Thus, interest message 200 may include two major updates (e.g., bits 202 and conditions 204) to the current interest message.

As illustrated in FIG. 2A, retrieve/subscribe/notification message type bits 202 may be added to (e.g., encoded within) the interest message and used to indicate whether the interest message is a "normal" interest message for content retrieval, a "content subscription" interest message, or a "content notification" interest message. For example, bits "00" in messages correspond to normal content retrieval as provided by existing interest messages, such as messages processed using a "normal" interest message content retrieval process. Descriptions of processing for bits "10" in messages can be used for basic and conditional subscription interest messages processed using subscription interest processes, such as described herein. Descriptions of processing for bits "11" in messages can be used for basic and conditional notification interest messages processed using notification interest processes, such as described herein. In basic subscriptions, a producer may only push the subscription information requested, which is then provided (e.g., by ICN 102 and/or routers 106) to each subscriber. With notifications such as notification interest messages, the conditions may be applied to the information and only information meeting the conditions is provided to the subscriber.

A conditions field 204 may also be added to interest message 200 to include the conditions associated with a content subscription or a notification that the conditions trigger. For a subscription interest message, field 204 may be a "notification condition" setting condition(s) for notifying the subscriber (e.g., subscribing consumer). For a notification interest message, field 204 may be a "trigger condition" representing the condition(s) that can satisfy the notification conditions for notifying the subscriber. In one embodiment, when the conditions field 204 is included in a subscription message, it indicates that the subscriber is interested in receiving notifications if the conditions are satisfied by the content update (e.g., by data value(s) at a producer or in a notification message). In another embodiment, when the conditions field 204 is included in a notification message, it represents the conditions that trigger such notification.

As appreciated, the conditions field 204 can be composed of multiple conditions. These conditions may be connected by multiple condition operators, such as AND, OR, NOR, XOR, etc. For example, a single condition may be represented by property+operator+value, (e.g., Value >90, is a single condition where value is the property, greater than is the operator and ninety is the value). Other non-limiting examples of properties, operators and values include nitrous oxide concentration >5 percent; liquid height <10 feet; data stored >10 GB; speed=60 miles per hour; and the like.

According to embodiments, a condition may have various types of properties that can be represented as data (e.g., data that is the property). Examples include properties that are a measurable, derivable, countable, or otherwise machine (e.g. computer or sensor) detectable quantity or expression that can be represented in data capable of being compared by the operator to a value (e.g., compared to similar types of data values). Some non-limiting examples include a measurement or amount of something (e.g., condition is "Liquidlevel >8"); a measurement or amount of accuracy (e.g., condition is "AccuarcyLevel>0.99"); a geographic location (e.g., condition is "Location=California"); a distance (e.g., condition is "Miles>100"); an amount of time (e.g., condition is "Minutes >10"); a speed (e.g., condition is "MilesPerHour>45"); an image resolution (e.g., condition is "MegaPixels >2"); a pixel count (e.g., condition is "Pixels=1920×1080"); a computer code (e.g., condition is "Binary >1011", or condition is "Hexadecimal=FFFF); a media type (e.g., condition is "Media=video", or condition is "Media=audio"); and the like. Various other expressions or functions or attributes associated with pieces of data are considered.

In some embodiments, the term "condition" may refer to a property (e.g., a first operand, a variable or something measured) that is compared using or based on an operator (e.g., a software operator such as <, =, >, and the like) to a value (e.g., a second operand, a known value or a scalar). Examples of such operators include binary operators, unary operators, and expressions. Also, examples of such operators include numerical and string software comparison operators such as <, =, >, and the like.

In one example the conditions "Value >60" and "Liquidlevel >8" represent two different conditions, each being a comparison "threshold" type condition. The first is whether the variable or measurement Value is greater than 60, and the second is whether the variable or measurement Liquidlevel is greater than 8. A condition of "value=80" would represent one condition, being a comparison "equality" type condition. It whether the variable or measurement value is equal to 80.

As discussed above, according to some embodiments, the conditions can be multiple and connected by multiple condition operators (e.g. AND, OR, etc.). One example of multiple conditions may be represented by property1+operator1+value1 (multiple condition operator such as AND, OR, etc.) property2+operator2+value2. In one instance they may be Value >90 OR Value <60, as two condition where value is the property of each condition; greater and less than are the operators of each condition; and ninety and sixty are the values of each condition, respectively. Another example may be Value <50 AND Time=9 am, as two condition where value is the first property and Time is the second, such as to check to see if a temperature is less than 50 degrees at 9 am. According to some embodiments, when multiple conditions have one property (e.g., only the operators and values may be different for the multiple conditions), the complexity of "aggregating" and "not aggregating" (e.g., see FIGS. 5-8E) is one or two dimensional such as described with respect to the property "Value" herein.

In another instance, multiple conditions may have more than one property in the conditions (e.g. Value >10 AND AccuarcyLevel>0.99). According to some embodiments, when multiple conditions have more than one property (e.g., the properties, operators and values may be different for the multiple conditions), the complexity of "aggregating" and "not aggregating" (e.g., see FIGS. 5-8E) may be much more complex and become multiple dimensional.

FIG. 2B illustrates data or fields of normal interest message that may facilitate consumer initiated content retrieval according to example embodiments. Interest message 210 includes retrieve/subscribe/notification bits 212 having bits "00" (bits 202 in FIG. 2A), indicating that it is a normal interest message and content name 216 having name "dataxyz" (name 206 in FIG. 2A) of the content being requested. In one embodiment, any associated condition field 204 may be blank or empty 214.

As briefly discussed above, when bits 202 are "00," the message is identified as a normal content retrieval request and may be processed by the router, such as NDN router 106, as a legacy interest message. For example, when the interest message 210 includes bits 212 that are identified (e.g., detected) as being "00," the message can be identified as a "normal" interest message (e.g., see 802, 804 and 806 if FIG. 8A) and can be processed according to the legacy process described above (when an NDN router receives a "normal" interest message which contains the name 216 of the content being requested).

FIG. 2C illustrates data or fields of a subscription interest message that may facilitate content subscription initiated content notification according to example embodiments. Interest message 220 includes retrieve/subscribe/notification bits 222 having bits "10" (bits 202 in FIG. 2A), indicating that it is a subscription interest message and subscription request 228. In one example, subscription request 228 includes content name 226 having name "/example.com/temp" (name 206 in FIG. 2A) of the content (e.g., data) being requested, including notification condition 224 having Value <40 (condition 206 FIG. 2A) for a notification being requested. In one embodiment, any associated condition field 204 will be blank or empty, such as for a non-conditional or "basic" subscription request.

As briefly discussed above, when bits 202 are "10," the message is identified as a subscription interest message, and it may not require the receiver's (e.g., producer) reply. For example, when interest message 220 includes bits 222 that are identified (e.g., detected) as being "10," the message can be identified as a "subscription" interest message and can be processed by the router, such as NDN router 106, according to the process described below for when an NDN router receives a "subscription" interest message which contains a subscription request (e.g., request 228 in FIG. 2C) and possibly at least one notification condition (e.g., condition 224 in FIG. 2C) for a notification being requested. In some examples, a "basic" subscription interest message may not have a notification condition (e.g., see field 214) because a producer may push the data/values to be reported to the consumer; while a "conditional" subscription interest message has at least one notification condition (e.g., condition 224 in FIG. 2C). In some embodiments, once a message has been identified as a subscription interest message (e.g., see 802, 804 and 810 if FIG. 8A) it will be processed (e.g., processed as described herein) by a subscription interest message processor (e.g., processor 310 of FIG. 3) and a condition matcher and aggregator (e.g., aggregator 320 of FIG. 3) of a FIB (e.g., FIB 130 of FIG. 3).

Figure 2D:
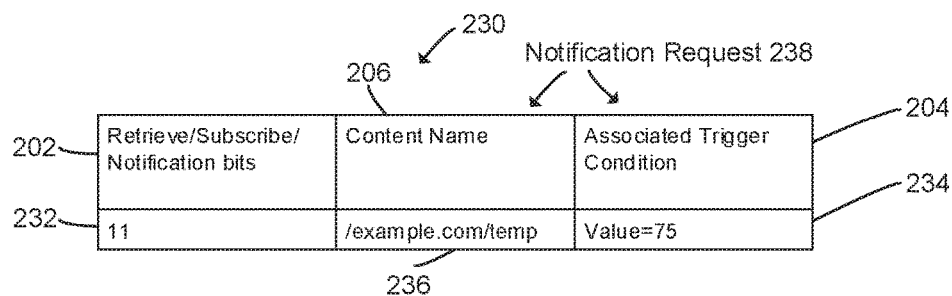
FIG. 2D illustrates data or fields of notification interest message that may facilitate content notification initiated content notification according to example embodiments.

FIG. 2D illustrates some data or fields of a notification interest message that may facilitate content notification initiated content notification according to example embodiments. Interest message 230 includes retrieve/subscribe/notification bits 232 having bits "11" (bits 202 in FIG. 2A), indicating that it is a notification interest message and notification request 238. For example, notification request 238 includes content name 236 having name "/example-.com/temp" (name 206 in FIG. 2A) of the content being requested, including notification trigger 234 having Value=90 (trigger condition 206 of FIG. 2A) for a value satisfying the notification condition being requested. In one embodiment, associated condition field 204 will be blank or empty, such as for a non-conditional or "basic" notification request.

As briefly discussed above, when bits 202 are "11," the message is identified as a notification interest message, and it may not require the receiver's reply (the receiver is one of the subscribers or consumers). For example, when interest message 230 includes bits 202 that are identified (e.g., detected) as being "11," that message can be identified as a "notification" interest message and can be processed by the NDN router 106, such as NDN router 106, according to the process described below for when an NDN router receives a "notification" interest message which contains a notification request (e.g., request 238 in FIG. 2D) and possibly at least one trigger condition (e.g., acondition 234 in FIG. 2D) for data or values satisfying the notification condition being requested. In some examples, a "basic" notification interest message may not have a trigger condition (e.g., see field 214) because a producer may push the data/values to be reported to the consumer; while a "conditional" notification interest message has at least one trigger condition (e.g., condition 234 in FIG. 2D). In some embodiments, once the message has been identified as a notification interest message (e.g., 802, 804 and 808 of FIG. 8A) it will be processed by the notification interest message processor (e.g., processor 315 of FIG. 3) and a condition matcher and aggregator (e.g., aggregator 320 of FIG. 3) of a FIB (e.g., FIB 130 of FIG. 3).

Figure 3:
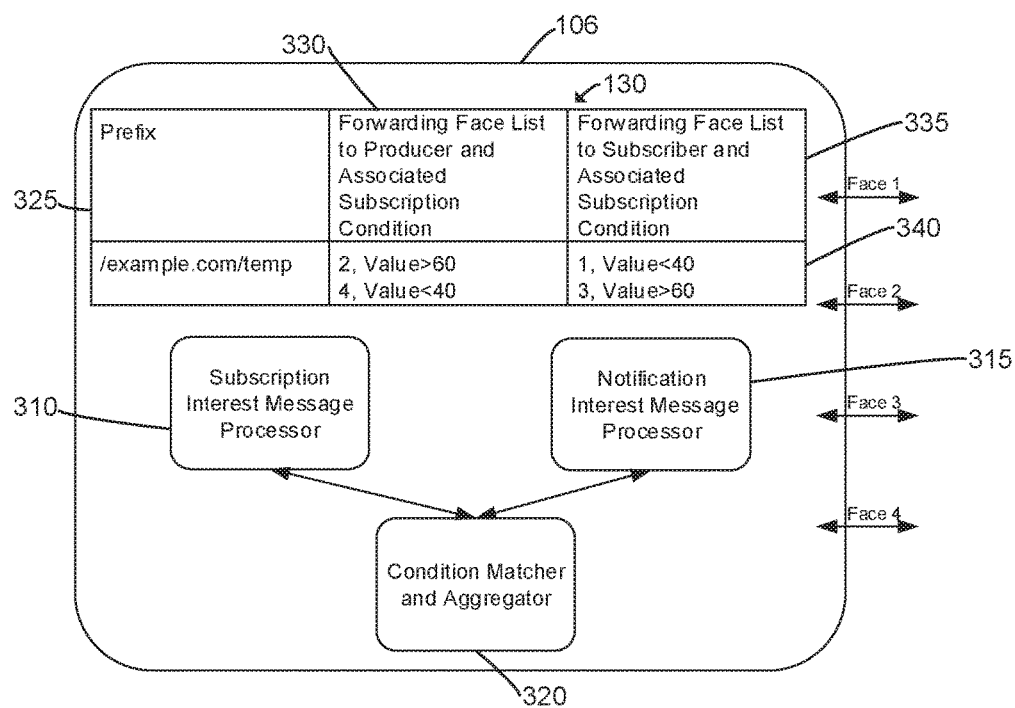
FIG. 3 is a block diagram of forwarding information base (FIB) components of a named data networking (NDN) router according to example embodiments.

FIG. 3 is a block diagram of additional components added to a named data networking (NDN) router for processing normal, subscription and notification interest messages according to example embodiments. In order to support subscription/notification (e.g., interest messages), an NDN router is modified to process the interest message types (i.e., subscription message and notification) and the conditions field 204.

To accomplish such processing, functional components of NDN router 106 are shown in FIG. 3. The components may include a subscription interest message processor 310, a notification interest message processor 315, and a condition matcher and aggregator 320 (which in some embodiments may be a processor). A forwarding information block (FIB) 130 may include prior fields (e.g., for "normal" interest message processing); and in addition, may include prefix 325 (which may include content name, such as the name of the content or data requested by a customer or subscriber); forwarding face list to the producer (FFLP) and associated subscription condition 330 (e.g., "list 330"); and forwarding face list to subscriber (FFLS) and associated condition 335 (e.g., "list 335"). Row 340, depicted in FIG. 3, provides one set of example values for prefix 325, list 330 and list 335.

The functional components (e.g., processors 310 and 315, aggregator 320 and FIB 130) may be referred to as processors, modules or components, and may each be executed on a single processor or separate processors. In some embodiments, they could be implemented with any combination of hardware and/or software. They may further include one or more elements for performing any one or combination of steps described in the embodiments. In accordance with various embodiments of the present disclosure, the methods described herein may be implemented using a hardware computer system that executes software programs.

In one embodiment, when NDN router 106 receives an interest message with retrieve/subscribe/notification bits 202 set to "10," the subscription interest message processor 310 is configured to interpret (e.g., identify and process) the message. For example, processor 310 identifies the message as a subscription interest message 220 (e.g., by reading bits 202 as being "10"). Then (e.g., based on or due to that identification), processor 310 may be configured to record the content name (e.g., name 226) at prefix 325, the incoming face of the interest message in the FIB at list 330, as well as the conditions (e.g., condition 224) if the field exists at list 330, as illustrated in row 340.

In addition to maintaining the forwarding face to content producers at list 330 for a named content at prefix 325, the FIB 130 may also maintain the forwarding face to the content's subscribers at list 335 and the notification conditions at list 335 associated with that face. The NDN router 106 may also look up the forwarding face in the FIB 130 to the subscribed content's producer based on the content name (e.g., name 226) and forward the subscription interest message accordingly. In some embodiments, router 106 will forward to the producer identified as having the exact content name or longest match of content name (for example "/example.com/temp" of examples 340).

In some embodiments, when NDN router 106 receives an interest message with retrieve/subscribe/notification bits 202 set to "11," the notification interest message processor 315 is configured to interpret (e.g., identify and process) the message. In some embodiments, processor 315 identifies the message as a notification interest message 230 (e.g., by reading bits 202 as being "11"). Then (e.g., based on or due to that identification), the notification interest message processor 315 may be configured to look up in the FIB 130 for content name (e.g., name 236) matches in the forwarding face(s) to the subscribers in list 335 based on the content name in prefix 325. The NDN router 106 (e.g., the condition matcher and aggregator 320) may then be configured to check if the triggering condition(s) 204 of the notification (e.g., value 234) match the notification conditions associated with each forwarding face to the subscriber in list 335. This may include identifying all matches with conditions recorded at list 335 (where conditions in list 330 exists). An example of which is depicted in row 340.

Where the triggering conditions 204 of the notification (e.g., value 234) match the notification conditions 204 associated with each forwarding face to the subscriber in list 335, the NDN router 106 forwards the notification interest message to the subscribers in list 335 having their notification conditions satisfied.

In some embodiments, the forwarding face list to subscriber (FFLS) and associated condition in list 335 (e.g., see examples 340) will not be broadcast among neighboring routers 106 of network 102. In some embodiments, the forwarding face to producers in list 330 in FIB 130 is broadcast as legacy among neighboring routers 106 of network 102. In other words, in some embodiments, the FFLS and associated conditions in list 335 is recorded and maintained locally at a single router 106, when that router forwards a subscription interest message to a producer or router towards that producer. In some embodiments, the subscription interest message 220 is forwarded towards the producer, but other than that forwarding, the FFLS and associated conditions are not recorded and maintained at any neighboring routers 106 of network 102.

According to embodiments, when a NDN router 106 receives a subscription interest message (e.g., message 220) with notification conditions (e.g., conditions 224), if the incoming face is already recorded in FIB 130 (e.g., in list 330), the notification conditions of the face may be aggregated by the condition matcher and aggregator 320. In some embodiments, the notification condition 224 if the new or incoming message is aggregated with the notification condition of the prior received subscription interest message that has been recorded (e.g., stored or written to a memory and) and is listed in list 335. An example is provided below to illustrate embodiments of this process (e.g., see FIGS. 4-5). According to embodiments, when an NDN router 106 receives a notification interest message (e.g., message 230) with the triggering conditions (e.g., conditions 234), the notification message is forwarded to the incoming faces (e.g., in list 335) for which the trigger conditions match the associated conditions (e.g., in list 335). The condition matcher and aggregator 320 may include or provide the logic (e.g., processing such as by a processor or module) for comparing and aggregating the notification conditions (e.g., conditions 224 and those stored in lists 330 and 335). It may also include or provide the logic (e.g., processing such as by a processor or module) for comparing and matching the trigger with notification conditions (e.g., conditions 234 and those stored in list 335).

Figure 4:
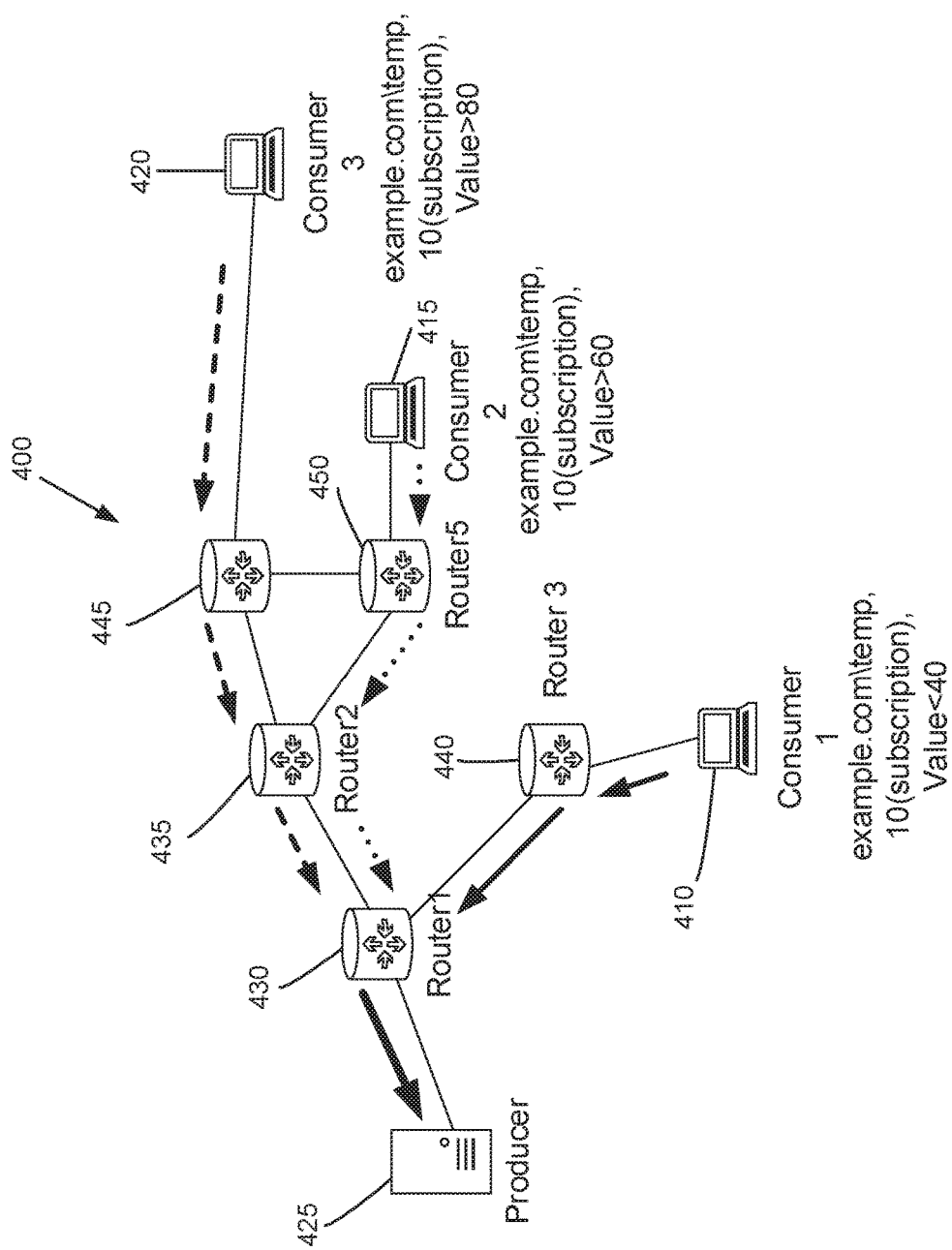
FIG. 4 is a block diagram of a network topology with NDN routers, a producer, and consumers according to example embodiments.

FIG. 4 illustrates a network topology with NDN routers, a producer, and consumers according to example embodiments. Topology 400 may illustrate how the functional components of NDN routers 106 (e.g., see FIGS. 2-3) support the subscription/notification communication pattern or protocol. Topology 400 is shown having three consumers 410, 415, and 420 (e.g., such as UEs 110), one producer 425 (e.g., such as data store 108) and a number of routers 430, 435, 440, 445, 450, and 455 (e.g., such as routers 106) in topology 400 (e.g., such as network 102).

Figure 5:
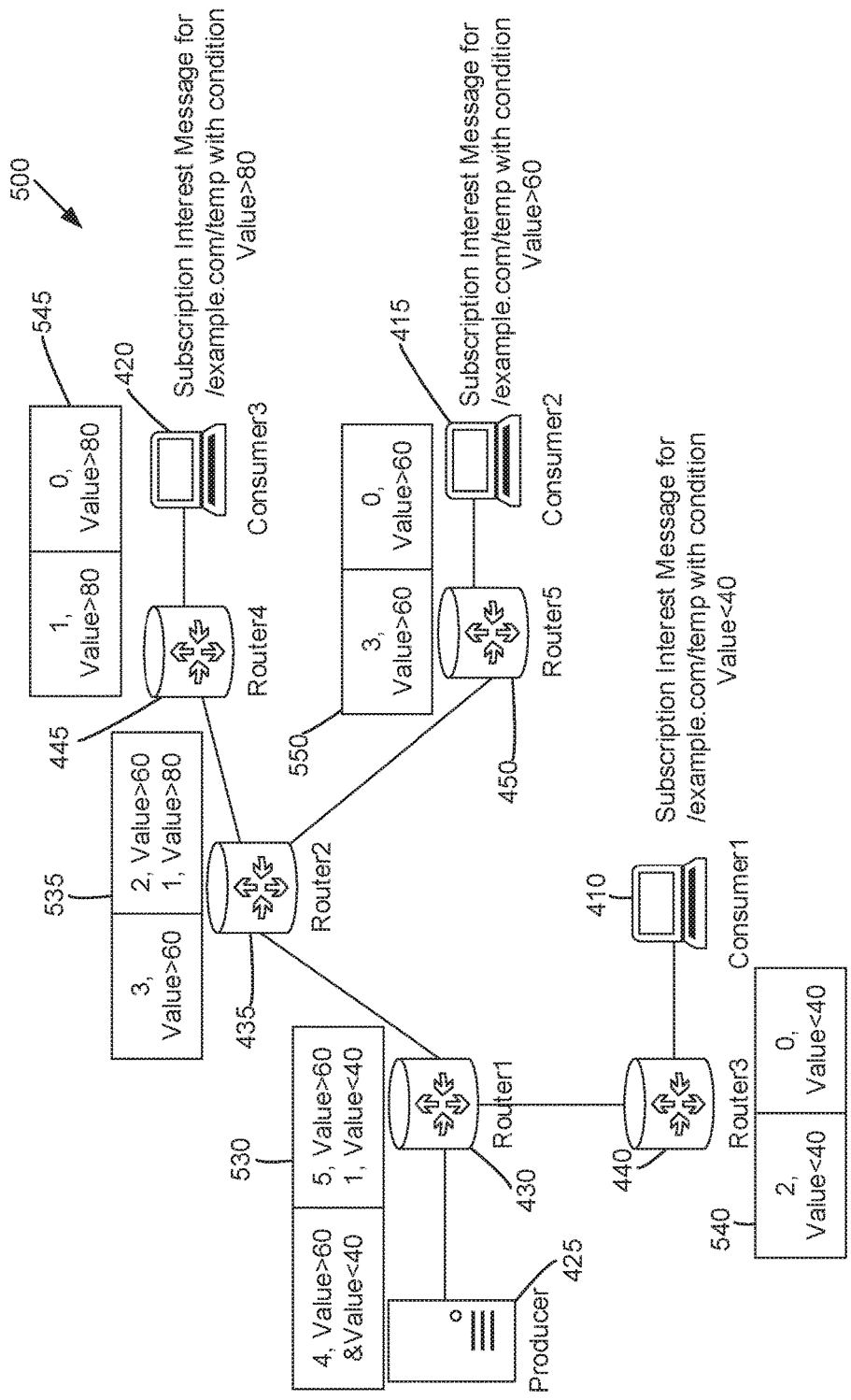
FIG. 5 is a block diagram of a network topology showing forwarding information base (FIB) updates after processing subscription interest messages shown in FIG. 4.

FIG. 5 illustrates a network topology showing forwarding information base updates after processing of subscription interest messages from consumers shown in FIG. 4 according to example embodiments. In some embodiments, after the above process described for and shown in FIG. 4, the FIB 130 maintained by each NDN router 1 at 430-router 5 at 450 in the network 400 is shown in the network topology 500 with FIB updates after processing the subscription interest messages from the consumers as shown in FIG. 5. In this example, the FIB updates (e.g., face numbers and notification conditions) are illustrated as updates 530, 535, 540, 545, 550, and 555 corresponding to respective routers 430, 435, 440, 445, 450, and 455.

In the depicted example, a consumer, such as consumer 1 at 410, sends a subscription interest message (e.g., message 220) by specifying the content name (e.g., name 226), setting the retrieve/subscribe/notification bits to "10" (e.g., bits 222) and any conditions that would request the content producer to send notifications (e.g., condition 224). Here, consumer 1 at 410 subscribes to the content with content name in URI format, such as example.com/temp, and the notification condition as the value of the temperature reading smaller than 40 (i.e., Value <40). Similarly, consumer 2 at 415 subscribes to the same content: example.com/temp with the condition that the value of the temperature reading is larger than 60 (i.e. Value >60), and consumer 3 at 420 subscribes to the same content: example.com/temp with the condition that the value of the temperature reading is larger than 80 (i.e. Value >80).

As illustrated, when an NDN router 106 receives a subscription interest message, it will record the incoming face as the forwarding face for future notifications at list 335 in its FIB 130. The subscription interest may then be forwarded through topology 400 based on the legacy FIB until it reaches the producer 425. In one embodiment, the subscription interest is not maintained in the PIT 120 of the NDN router 106.

In this example, the consumer 1 at 410 sends the subscription interest message to its attached router 3 at 440. Here, router 3 at 440 processes the subscription interest message by identifying it as a subscription interest message. Then, based on this identification, the subscription interest message processor (e.g., processor 310 of FIG. 3) is triggered to process the subscription interest message. Here, router 3 at 440 looks up in the FIB 130 to see if an entry exists in FIB 130 with the same content name as that of the new received subscription interest message. In one embodiment, router 3 at 440 looks for a content name (e.g., /example.com/temp) match in the prefix 325. In some instances, the content name and forwarding face to producer (e.g., to producer 425) were added or recorded in FIP 130 of the routers 106 when the ION name based routing table (e.g., in FIB 106) is built up or created.

In some instances, a "face" can be an identification of an interface (e.g., port) or channel (e.g., connection path) through which the router communicates. Some examples may describe a face as an identification or address of the interface or channel. In some instances, each router may have at least one face, and each face of a router may be identified as a different "face", such as by a different number or address. The different numbers may be arbitrary assignments, such as not requiring faces of a router be in any sequence. The identification or address may be a network interface index number assigned to each communication interface/channel a router has with another (device) router, consumer, producer, etc. For some embodiments, network interface index numbers differ from Internet Protocol addresses in that they are used within a single device to direct traffic, while IP addresses regulate inter-device communication.

According to some embodiments, faces (e.g., face numbers) are setup in a router's FIB during routing table/FIB creation. In one example, the face concept used herein is the one used in NDN (named data networking), which is a significant ICN architecture. In some instance, a face is the generalization of network interface. In some embodiments, it could be a physical network interface to communicate on a physical link, an overlay communication channel between NFD (named data networking forwarding daemon) and a remote node, or an inter-process communication channel between NFD and a local application. In these cases, "FACEID" may be the numerical identifier of the face.

For some instances, an "incoming interface" or "incoming face" or "forwarding face to subscriber" describes the face (e.g., face number) at which a currently received interest message was received. For some instances, an "outgoing interface" or "outgoing face" or "forwarding face to provider" describes the face (e.g., face number) at which a currently forwarded or transmitted interest message was sent.

In this example, router 3 at 440 finds that a single entry/recording exists that matches the content name (e.g., example.com/temp) in router 3's FIB 130 with the forwarding face to producer 425. Router 3 at 440 adds the incoming interface (0) and the conditions (e.g., Value <40) in the FFLS column 325 for the content name. Then, the router 3 at 440 forwards the subscription interest message to the router 1 at 430 based on the forwarding face to producer 425 of the content name in FFLP 330, and records the used forwarding face and the conditions in the FFLP 330. Similar to the description above for router 3 at 440 processing the message from consumer 1 at 410, the subscription interest message processor of the router 1 at 430 adds the incoming interface and the conditions (e.g., Value <40) in the FFLS column 325 for the content name. Then, router 1 at 430 forwards the subscription interest message to the producer 425 based on the forwarding face to producer list 330 of the content name, and records the used forwarding face and the conditions in the FFLP 330.

In this example, the consumer 2 at 415 sends the subscription interest message to its attached router 5 at 450, which processes this message similar to the description above for router 3 at 440 processing the message from consumer 1 at 410. After identification as a subscriber interest message, the subscription interest message processor is triggered to process the message. Here, router 5 at 450 looks up in the FIB 130 to see if an entry exists in FIB 130 with the same content name as that of the new received subscription interest message. In this example, router 5 at 450 finds that a single entry exists that matches the content name in router 5's FIB 130 with the forwarding face to producer 425. Router 5 at 450 adds the incoming interface and the conditions (e.g., Value >60) in the FFLS 335 column for the content. Then, the router 5 at 450 forwards the subscription interest message to the router 2 at 435 based on the forwarding face to producer 330 of the content, and records the used forwarding face and the conditions in the FFLP 330. Similarly, the subscription interest message processor in the router 2 at 435 adds the incoming interface and the conditions (e.g., Value >60) to the FFLS 335 column for the content. The router 2 at 435 forwards the subscription interest message to the router 1 at 430 and records the used forwarding face and the conditions in the FFLP 330. The router 1 at 430 also adds the incoming interface and the conditions (e.g., Value >60) in the FFLS 335 column for the content.

In this example, the consumer 3 at 420 sends the subscription interest message to its attached router 4 at 445, which processes this message similar to the description above for router 3 at 440 processing the message from consumer 1 at 410. After identification as a subscriber interest message, the subscription interest message processor is triggered to process the message. Here, router 4 at 445 looks up in the FIB 130 to see if an entry exists in FIB 130 with the same content name as that of the new received subscription interest message. In this example, router 4 at 445 finds that a single entry exists that matches the content name in router 4's FIB 130 with the forwarding face to producer 425. The subscription interest message processor adds the incoming interface and the conditions (e.g., Value >80) to the FFLS 335 column for the content. The router 4 at 445 then forwards the subscription interest message to the router 2 at 435 based on the forwarding face to producer 330 of the content, and records the used forwarding face and the conditions in the FFLP 330. The router 2 at 435 processes this message differently than the description above for router 2 at 435 processing the message from router 5 at 450. After identification as a subscriber interest message, the subscription interest message processor is triggered to process the message. Thus, the router 2 at 435 adds the incoming interface and the conditions (e.g., Value >80) in the FFLS 335 column for the content of router 2 at 435.

In this example, router 2 at 435 looks up in the FIB 130 to see if an entry exists in FIB 130 with the same content name as that of the new received subscription interest message. In this example, router 2 at 450 finds that a single entry exists that matches the content name in router 2's FIB 130 with the forwarding face to producer 425. In this example, the aggregator 320 detects that there is already an entry in FFLP 330 for the same content name (e.g., 3, Value >60). Since the content name of the new or "current" message from router 4 at 445 already exists and is recorded in FFLP 330 for that content at router 2 at 435 as (e.g., and having an interface to producer 425 (e.g., from the prior message that came from router 5 at 450), the condition matcher and aggregator 320 of the router 2 at 435 is triggered to aggregate the "current" notification condition contained in (e.g., "associated" with) the newly received subscription interest message and the "existing" notification condition stored in FFLP. Thus, if the conditions overlap (e.g., in this single producer example), the condition (e.g., Value >80) from the consumer 3 420 can be aggregated with the existing condition (e.g., Value >60) for the face 3.

Here, the conditions overlap since the current condition is a subset of the existing condition in FFLP 330 for the content name of the later subscription. Thus, the router 2 at 435 finds the condition "Value >80" is a subset of the condition "Value >60" recorded in the FFLP and based on finding, router 2 at 435 realizes that the current subscription (e.g., the current subscription message from router 4 at 445) does not need to be forwarded further. In some embodiments, the data or values from a producer (e.g., a trigger condition) that satisfy the received notification condition "Value >80" will also satisfy the condition recorded in the FFLP "Value >60". In some instances, the data or values from a producer that satisfy the condition recorded in the FFLP "Value >60" will include any data or values that could satisfy the received notification condition "Value >80". Thus the router will get any data needed to satisfy the received notification condition when it gets data to satisfy the condition recorded. Here, the router 2 at 435 can simply drop the subscription from router 4 at 445 and for consumer 1 (and record the incoming face in the FFLS 335, as mentioned above). In some embodiments, dropping this subscription is described as changing the current notification condition (e.g., a first notification condition) in the currently received subscription message based on the existing notification condition in the FFLP (e.g., a second notification condition), where the change in the current notification condition is the dropping of the current notification condition based on the current notification condition being identified as a subset of the existing notification condition in FFLP 330 (e.g., for the same content name). In some instances, this type of aggregation (e.g., at FFLP) may be described as aggregation at FFLP.

According to embodiments, when a producer detects there is change to content that the producer produces (e.g., such as by detecting a change in a value supplied by a sensor, where the value is content requested by a customer; for one example see temperature sensors 1104 if FIG. 11), the producer initiates a notification interest message. The producer detecting a change to content that the producer produces may include the producer detecting a change in a value supplied by a sensor, where the value is content requested by a customer (e.g., for one example see temperature sensors 1104 if FIG. 11). The notification message (e.g., message 230) may include the content name (e.g., name 236). The producer may set the retrieve/subscribe/notification bits 202 to "11." In one embodiment, the conditions field 204 includes the condition (e.g., condition 234) which triggers the notification.

For example, when a temperature value at the producer 425 changes to a value of 90, that value will be included in the notification interest message as part of the conditions field 204 set to "Value=90." In one embodiments, the "triggering condition" (e.g., change in temperature) is encoded in the notification interest message as a property plus an operator plus a value, as described above. Since the triggering condition relates to the content value, the value does not need to be attached as payload of the notification interest message, but rather is included in the conditions field 204. The notification interest may then be forwarded by NDN routers 106 based on the FIB 130 that maintains the faces where the subscriptions was originally requested, such as in list 335. In one embodiment, the notification interest is not maintained in PIT and does not require reply.

Using the above example of FIGS. 4-5, when the temperature value changes to 90 at producer 425, that producer sends a notification interest message (e.g., message 230) to the router 1 at 430. The notification interest message processor 315 in the router 1 at 430 is triggered to process the notification interest message, such as by reading bits 202 being "11," thereby identifying the received message as a notification interest message.

Based on or due to the identification, the condition matcher and aggregator 320 of router 1 at 430 compares the trigger (e.g., conditions 324) field 204 of this message with the conditions associated with the forwarding faces to subscribers (e.g., in list 335) of the content (e.g., where content name of the notification message matches that in list 335). Aggregator 320 of router 1 at 430 finds a content name match with Value=90 of the trigger condition satisfying the notification condition Value >60 stored in list 335 of FIB 130 of router 1 at 430. Thus, aggregator 320 of router 1 at 430 determines that the notification interest message needs to be forwarded to the face 3, thus to the router 2 at 435. Since no match occurs with the other conditions stored in list 335 of router 1 at 430, the message is not forwarded to router 3. Similarly, the router 2 at 435 (e.g., aggregator 320 of router 2 at 435) determines that there is a content name match with Value=90 of the trigger condition satisfying the notification conditions Value >60 and Value >80 stored in list 335 of FIB 130 of router 2 at 435. Thus, the router 2 at 435 (e.g., aggregator 320 of router 2 at 435) determines that the notification interest message needs to be forwarded to both face 2 and face 3. Hence, the router 2 at 435 forwards the notification interest message to the router 4 at 445 and router 5 at 450. The router 4 at 445 (e.g., aggregator 320 of router 4 at 445) determines that there is a content name match with Value=90 of the trigger condition satisfying the notification conditions Value >80 stored in list 335 of FIB 130 of router 4 at 445. Thus, the router 4 at 445 forwards notification interest message to the subscriber consumer 3 at 420. The router 5 at 450 (e.g., aggregator 320 of router 5 at 450) determines that there is a content name match with Value=90 of the trigger condition satisfying the notification conditions Value >60 stored in list 335 of FIB 130 of router 5 at 450. Thus, the router 5 at 450 sends the notification message to its attached consumer 2 at 415 as another subscriber.

As another example using FIGS. 4-5, when the temperature value changes to 25 at producer 425, producer 425 sends a notification message with that value as a trigger condition to the router 1 at 430, with the conditions field 202 set to "Value=25". The notification interest message processor 315 in the router 1 at 430 is triggered to process the message. After identifying this message as a notification interest message based on reading bits 202 being "11," the condition matcher and aggregator 320 of router 1 at 430 compares the content name field 206 conditions field 202 of this message with the conditions associated with the forwarding faces to subscribers of the content in list 335 of router 1 at 430. From this comparison, aggregator 320 of router 1 at 430 finds a content name match with Value=25 of the trigger condition satisfying the notification condition Value<40 stored in list 335 of FIB 130 of router 1 at 430. Thus, router 1 at 430 determines that the notification interest message needs to be forwarded to the face 1, thus to the router 3 at 440. Since there is not a match with the other conditions stored in list 335 of router 1 at 430, the message is not forwarded to router 2 at 435. The router 3 at 440 determines that there is a content name match with Value=25 of the trigger condition satisfying the notification conditions Value<40 stored in list 335 of FIB 130 of router 3 at 440. Thus, the router 3 at 440 sends the notification message to its attached consumer 1 at 410 as the subscriber.

Figure 6A:
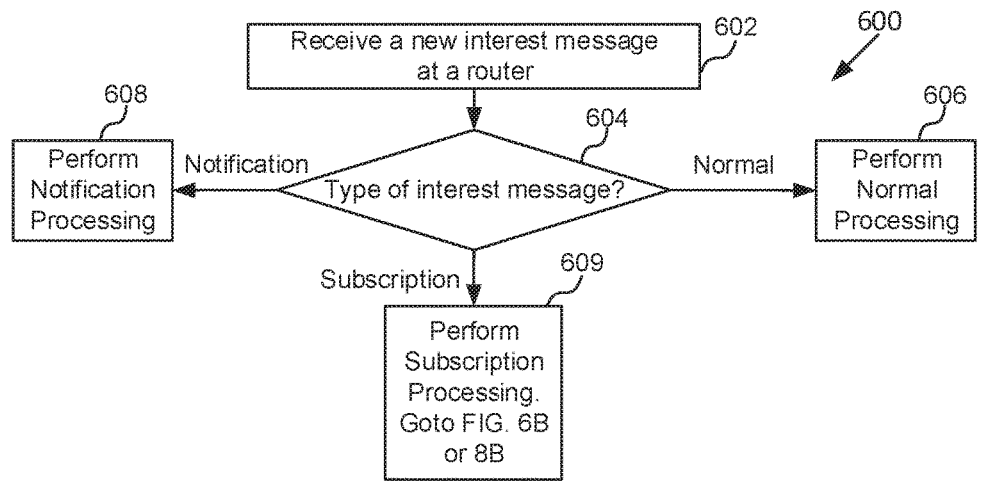
FIG. 6A is a flow diagram of a process for processing interest messages according to example embodiments.
Figure 6B:
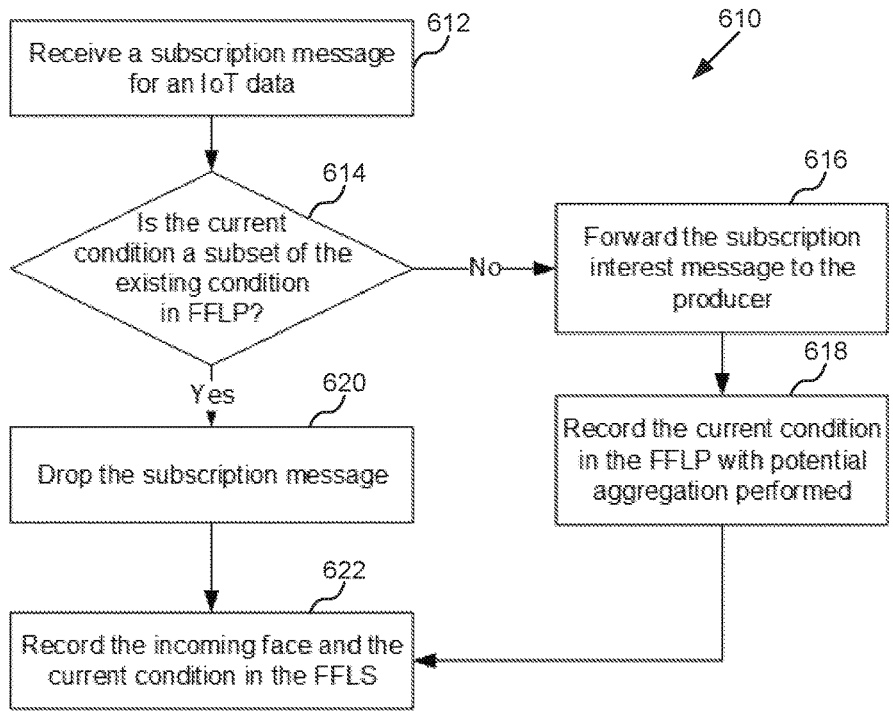
FIG. 6B is a flow diagram for processing subscription interest messages for a Single Producer Scenario according to example embodiments.
Figure 6C:
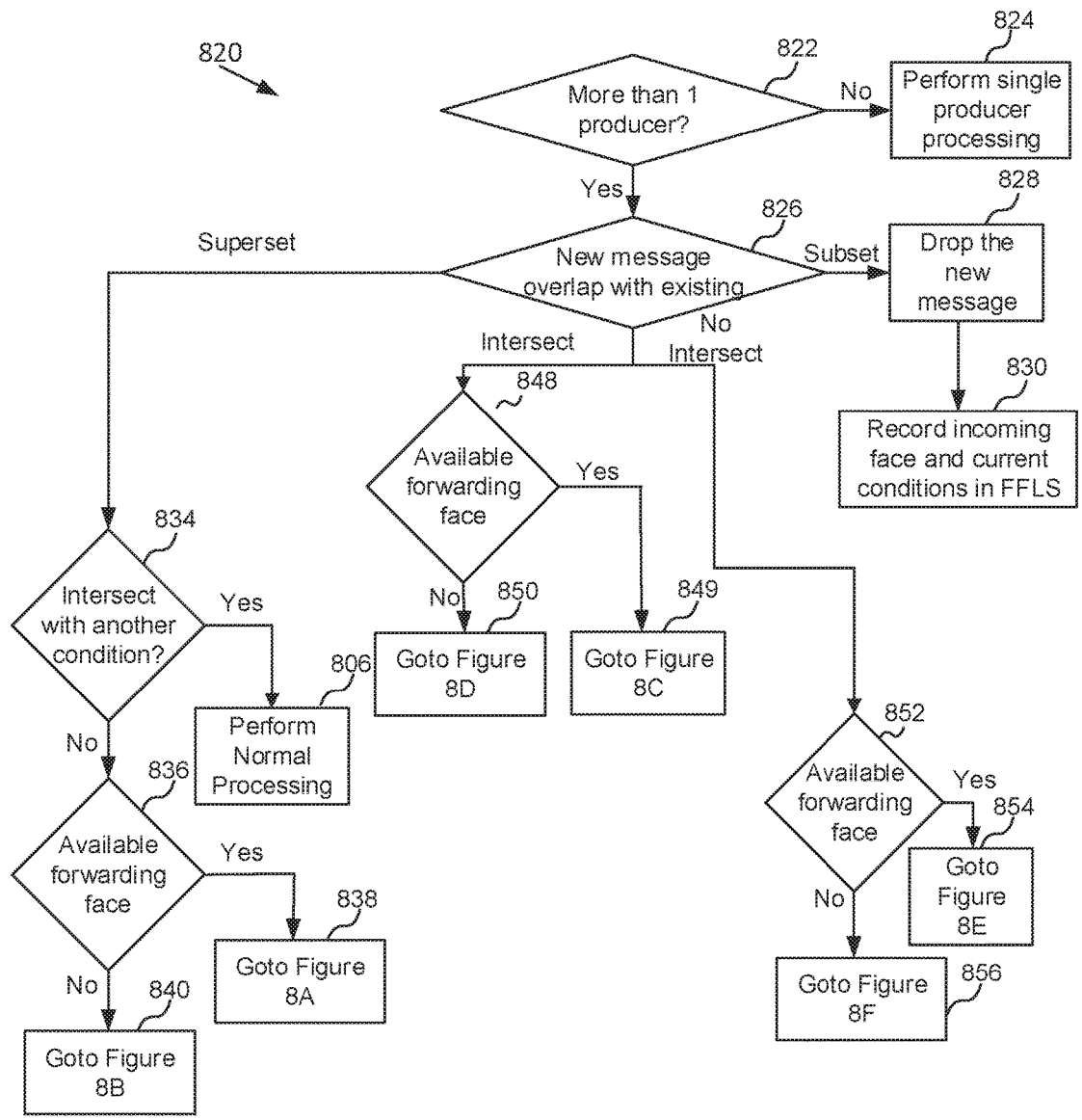
FIG. 6C is a flow diagram for processing overlapping or associated conditions according to example embodiments.

FIGS. 6-8 are flow diagrams of processing of and graphical representations of notification conditions for processing associated conditions between a currently received (e.g., new) notification condition of a received subscription interest message and existing (e.g. prior or other) notification conditions in FFLP for single (e.g., FIG. 6B) and multiple (e.g., FIGS. 6C, 7A-G and 8A-F) producer scenarios according to example embodiments.

FIG. 6A is a flow diagram of a process for processing normal, subscription and notification interest messages according to example embodiments. More specifically, FIG. 6A shows process 600 for determining whether a received interest message is to be processed as a normal, subscription or notification interest message. Process 600 may be a process performed by an NDN router 106 described herein. At 602 a new interest message is received at a NDN router 106. At 604, the type of interest message (e.g., normal, subscription or notification) is determined. In one embodiment, this is implemented by NDN router 106 reading bits 202 as described above for FIGS. 2-3.

If the type of message is a notification interest message, processing continues to 608 where notification processing of the message is performed. In some embodiments, 608 is performed by router 106 (e.g., FIB 130) performing notification message processing of the message as described above for FIGS. 2-6 and otherwise or performing notification message processing as described herein.

If the type of message is a subscription interest message, processing continues to 609 where subscription processing of the message is performed. In some embodiments, 609 is performed by router 106 (e.g., FIB 130) performing subscription message processing of the message as described above for FIGS. 2-5 or otherwise for performing notification message processing for a single producer scenario as described herein. In some single producer scenario cases, 609 includes, processing continuing to FIG. 6B (e.g., 612 of process 610) where processing overlapping or associated conditions between a currently received notification condition of a received subscription interest message that is a subset of an existing notification conditions in FFLP is performed according to example embodiments.

In some embodiments, 609 is performed by router 106 (e.g., FIB 130) performing subscription message processing of the message as described above for FIGS. 7-8 or otherwise for performing notification message processing for a multiple producer scenario as described herein. In some multiple producer scenario cases, 609 includes, processing continuing to FIG. 6C (e.g., 822 of process 820) where processing overlapping or associated conditions between a currently received notification condition of a received subscription interest message and existing notification conditions in FFLP for seven multiple producer scenarios is performed according to example embodiments.

FIG. 6B is a flow diagram of a process 610 for processing subscription interest messages for a single producer scenario where the associated condition (e.g., notification condition overlap) in the currently received subscription is a subset of one of the existing conditions in FFLP according to example embodiments. Process 610 may be process performed by an NDN router 106 described herein. Process 610 may be a message flow that applies to a subscription to Internet of things (IoT) data that only has one single producer (e.g., producer 425). In some embodiments, the subscriptions from different subscribers can be aggregated (e.g., 620-622) when they are being forwarded by the en-route ICN 102 routers 106 towards the only producer (e.g., for those subscriptions, such as based on content name) based on the associated notification conditions of the different subscribers (e.g., based on them overlapping by one being a subset of the other, see 614). Also, in some embodiments, the subscriptions from different subscribers can be aggregated (e.g., see 618) when they are being forwarded by the en-route ICN 102 routers 106 towards the only producer (e.g., for those subscriptions, such as based on content name) based on the associated notification conditions of the different subscribers (e.g., based on them overlapping by being a superset, having an intersect, or having another aggregation of conditions, see 618). The subscription distribution (e.g., see FIGS. 8A-F) may not be needed for the single producer scenario.

According to some embodiments, in process 610 we assume for purposes of discussion that the NDN routers 106 can build up (e.g., store multiple) entries in the forwarding face towards the producer ("FFLP") at 612 (e.g., list 330). In some instances, when an en-route NDN router 106 to the producer receives a subscription interest message for IoT data at 612, the NDN router 106 checks whether the received (e.g., "current") notification condition is a subset of the existing condition in the FFLP at 614 (e.g., based on comparing ranges of values that satisfy different conditions, each value may be one dimensional or multi-dimensional). If yes, the NDN router 106 indicates that the previously forwarded subscription can make sure the notifications satisfying the current notification condition reaches the NDN router 106, because the subset will be satisfied by a notification condition of the existing condition in the FFLP. Thus, it is unnecessary to forward the current subscription to the producer again.

The NDN router 106 drops the currently received subscription message at 620 and records the incoming face and the associated notification condition in the FFLS with any possible aggregation at 622 (e.g., for multiple producers see 828 and 830 of FIG. 6C). In some instances, dropping the currently received subscription message is described as changing the current notification condition (e.g., a first notification condition) in the currently received subscription message based on the existing notification condition in the FFLP (e.g., a second notification condition), where the change in the current notification condition is the dropping of the current notification condition based on the current notification condition being identified as a subset of the existing notification condition in FFLP 330. One example of such "possible aggregation" may be to determine if the incoming or current face of the currently received subscription interest message is already recoded or existing as an incoming face in FFLS 335 of the router, and the notification conditions of the current message and existing notification for the face in FFLS 335 can be aggregated. If so, the existing incoming face can be maintained and any possible aggregation of the current and existing notification conditions being performed for that face in FFLS 335.

In some instances, 622 includes the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, 622 may then include the NDN router 106 (e.g., aggregator 320) recording the original notification condition associated with (e.g., received with) the currently received subscription interest message in the FIB 130 of the router 106.

If the notification condition is not a subset of the existing condition, the router 106 indicates that the current subscription cannot be aggregated by the previously sent subscriptions. Thus, the NDN router 106 forwards the subscription interest message towards the producer at 616 and records the current condition in the FFLP with "potential aggregation" performed at 618. In some embodiments, the "potential aggregation" performed at 618 may be where the current notification condition overlaps with an existing notification condition recorded in FFLP 330, such as by being a superset of, intersect with, or having another potential aggregation with the existing notification conditions. One example of when there is no such "potential aggregation" at 618 may be to record the forwarding face to producer and forwarded message information with received notification condition from the currently received subscription interest message in the FFLP. Since there is no subset condition, there may be two entries in the FFLP, one for the current notification condition (now recorded in the FFLP) and one for the existing notification condition in FFLP 330. Then the router 106 records the incoming face and the associated notification condition with "possible aggregation" in the FFLS at 622. As noted above regarding 622, one example of such "possible aggregation" may be to determine if the incoming or current face of the currently received subscription interest message is already recoded or existing as an incoming face in FFLS 335 of the router, and the notification conditions of the current message and existing notification for the face in FFLS 335 can be aggregated. If so, the existing incoming face can be maintained and any possible aggregation of the current and existing notification conditions being performed for that face in FFLS 335. If there is not a same incoming face or overlap of the current and existing notification conditions, the incoming face and received notification condition in the currently received subscription interest message can be recorded in FFLS 335, as it was when received (e.g., without changing that notification condition).

Referring to FIG. 6B and using the example shown in FIGS. 4-5, the router 2 at 435 receives the subscription interest messages from faces 1 and 2 with the notification conditions of "Value >80" and "Value >60," respectively. In the example, we assume for purposes of discussion that the subscription from the consumer 2 at 415 arrives first. Here, the subscription from the consumer 2 at 415 is a current condition "Value >60" that is not a subset of any existing condition in FFLP. Thus, 612, 614, 616, 618 and 622 are performed since there is no existing condition in FFLP for the content name of this subscription at 614. For example, the router 2 at 435 forwards the subscription with notification condition "Value >60" to the producer 425 through the face 4 at 616.

Subsequently, the subscription from the consumer 1 at 410 arrives. Since the current condition "Value >80" is a subset of the existing condition (the notification condition "Value >60" from the consumer 2 at 415) in FFLP for the content name of the later subscription at 614. Thus, the router 2 at 435 finds the condition "Value >80" is a subset of the condition "Value >60" recorded in the FFLP at 614. Then, router 2 at 435 realizes that the current subscription does not need to be forwarded further (e.g., the processes at 616 and 618 are not performed). In some embodiments, the data or values from a producer (e.g., a trigger condition) that satisfy the received notification condition "Value >80" will also satisfy the condition recorded in the FFLP "Value >60". In some instances, the data or values from a producer that satisfy the condition recorded in the FFLP "Value >60" will include any data or values that could satisfy the received notification condition "Value >80". Thus the router will get any data needed to satisfy the received notification condition when it gets data to satisfy the condition recorded. Thus, the router 2 at 435 can simply drop the subscription from the consumer 1 at 620 and record the incoming face in the FFLS at 622. In some embodiments, dropping this subscription at 620 is described as changing the current notification condition (e.g., a first notification condition—Value >80) in the currently received subscription message based on the existing notification condition in the FFLP (e.g., a second notification condition—Value >60), where the change in the current notification condition is the dropping of the current notification condition based on the current notification condition being identified as a subset of the existing notification condition in FFLP 330 (e.g., Value >80 is a subset of Value >60) (e.g., for the same content name). In some instances, this type of aggregation (e.g., at FFLP) may be described as aggregation at FFLP.

In another example, possible aggregation may occur if two subscription come from the same incoming face, and the conditions can be aggregated. For example, in FIG. 5, if another consumer 4 attached to the Router 4 at 445 sends another subscription message for the same content name, but had a notification condition of Value >70, there could be aggregation in the FFLP at the Router 4 at 445 (the notification condition in FFLP could be changed to the subset 70<Value<80). This may be aggregation at FFLP, such as "potential aggregation" at block 618 (since this current condition is not a subset of Value >80 existing in FFLP at 614, but is a superset at 618). Then, router 4 at 445 forwards the interest message to the Router 2 at 435. At Router 2 at 435 the "possible aggregation" at 622 may occur since incoming face (3) of the message with the changed notification condition subset 70<Value<80 (e.g., received from router 4 at 445) and the incoming face (3) recorded for the existing condition Value >80 (e.g., received from router 4 at 445) are the same. This aggregation may be to record in FFLS 335 of router 2 at 435, incoming face (3) of the message with the changed notification condition, from Value >80 to notification condition Value >70.

Consequently, such in-network aggregation of subscriptions can reduce the network bandwidth consumption in transmitting the subscription message and the overhead at the producer in processing the subscription messages.

According to some embodiments, for the subscription (e.g., subscription interest messages received at an NDN router 106) to the IoT data that has multiple producers, the subscriptions (e.g., notification conditions) can be aggregated similar to the single producer scenario, meanwhile they can also be distributed among the different producers. Examples of multiple producers are when there is a producer in addition to producer 425 of FIGS. 4-5; or multiple producers 108 as shown in FIG. 1, and these multiple producers are each able to satisfy at least one of the notification conditions of the current subscription interest message received by that router, and/or an existing subscription interest message stored in FFLP 330 of that router. In this instance, the notification conditions can be aggregated similar to the single producer scenario (FIGS. 4-6B), meanwhile they can also be distributed among the different producers (FIGS. 6C, 7A-G and 8A-F).

In some embodiments, the distributing is performed to cause, or increase the chance that each producer will be in charge of sending notifications satisfying a specific set of notification conditions recorded at that NDN router 106. Some principles (e.g., goals) of the algorithm design on the in-network distribution of subscriptions (e.g., design or processes used by routers 106 for subscription/notification message processing) may be to try to involve all of the multiple producers in serving (e.g., satisfying) the subscriptions, meanwhile also assign the notification tasks for those subscriptions to the producers as evenly as possible. In some embodiments, trying to involve all producers may include having a subscription message forwarded to each of the producers available and capable of satisfying at least one of the notification conditions received at a router 106 in a subscription interest message (or in the network 102).

In some embodiments, trying to assign the notification tasks to the producers as evenly as possible may include having the same number (e.g., a minimum possible number difference) in the number of subscription messages forwarded to each of the producers available and capable of satisfying at least one of the notification conditions received at a router 106 (or in the network 102). The distribution may be based on the associated notification conditions of multiple subscription messages, and the relationship between the current notification condition of a received subscription message and existing notification conditions in the FFLP of a router. Examples of embodiments for seven different possible scenarios of receiving more than one subscription interest message for more than one producer are now discussed.

FIGS. 6C, 7A-G and 8A-F are flow diagrams of processing of and graphical representations of notification conditions for processing associated conditions between a currently received (e.g., new) notification condition of a received subscription interest message and existing (e.g. prior or other) notification conditions in FFLP for seven multiple producer scenarios according to example embodiments. These figures and scenarios will be described together in the sections below.

In particular, FIG. 6C is a flow diagram of a process 820 for processing associated conditions between a currently received (e.g., new) notification condition of a received subscription interest message and existing (e.g. prior or other) notification conditions in FFLP for multiple producer scenarios according to example embodiments. Process 820 may be process performed by an NDN router 106 described herein. FIG. 6C describes the process that follows 609 in FIG. 6A.

FIGS. 7A-G depict graphical representations of associated conditions between a currently received (e.g., new) notification condition of a received subscription interest message and existing (e.g. prior or other) notification conditions in FFLP for seven multiple producer scenarios according to example embodiments.

FIGS. 8A-F are flow diagrams for processing associated conditions between a currently received (e.g., new) notification condition of a received subscription interest message and existing (e.g. prior or other) notification conditions in FFLP for seven multiple producer scenarios according to example embodiments.

At 822 it is determined whether the currently received notification condition of a received subscription interest message and existing notification conditions in FFLP includes notification conditions for more than one producer. An example of this may include reading the content name(s) and notification condition(s) of the currently received subscription interest message and the existing subscriptions stored in FFLP and counting the number of producers required to satisfy those conditions (e.g., FIGS. 2-3). In one embodiment, the number of producers may be the count of forward faces to producers of the currently received subscription interest message and the existing subscriptions stored in FFLP. If more than one producer is not required, processing continues to 824 where single producer processing is performed (e.g., such as described in FIGS. 4-6B).

If more than one producer is required, processing continues to 826 where it is determined if a currently received (e.g., new) notification condition of a received subscription interest message overlaps with an existing (e.g. prior or other) notification condition in FFLP of the NDN router 106. The overlap may be described as an "associated condition" between the currently received and existing notification conditions. The decision made at 826 by the NDN router 106 may include processing to determine or identify that there currently received (e.g., in a new subscription interest message such as message 220) notification condition has no intersection (e.g., no overlap) with, is a subset of (e.g., an overlap such as described for single producer scenarios of FIGS. 4, 5, 6B), is a superset of, or intersects with an existing (e.g., prior recorded) notification condition in FFLP 330 of the NDN router 106. Determining whether there is an overlap may include identifying that a currently received notification condition is a subset of, a superset of, or intersects with at least one existing notification conditions recorded in FFLP 330 of the router. If there is no overlap, it may be determined that there is no "intersection" with another condition in the FFLP.

If it is determined that there is an overlap that the currently received notification condition is a subset of one existing notification conditions recorded in FFLP 330 of the router, processing continues to 828. Determining that there is an overlap that is a subset at 826 may be described as identifying (e.g., based on that determining) and/or causing processing for a first scenario of the seven multiple producer scenarios. The processing for this scenario may be described by 828 and 830 of process 820: and the graphical representation for this scenario may be provided in FIG. 7A. These descriptions will follow those for FIG. 6C.

If it is determined that there is an overlap that the currently received notification condition is a superset of one existing notification conditions recorded in FFLP 330 of the router, processing continues to 834.

At 834 it is determined whether the currently received notification condition of a received subscription interest message also intersects with an existing notification condition in FFLP of a router 106. This intersect is in addition to the currently received notification condition being a superset of an existing notification condition in FFLP of the NDN router 106. Determining whether the currently received notification condition has an intersect may be similar to processing at 826. Here, it may be determined that the current condition is both a superset of one existing condition and intersects with another existing condition in the FFLP. If there is an intersect (e.g., the overlaps are an intersect with one and a superset with another existing condition) then processing continues to 806 where normal processing of a subscription interest message is performed (e.g., as described for 616, 618 and 622 of FIG. 6B).

If there is not an intersect (e.g., the overlaps are only one superset with another existing condition) then processing continues to 836.

At 836 it is determined if there is an available forwarding face to producer in FFLP 330. 836 may include determining that there is at least one forwarding face to producer in FFLP 330 has not been associated with any notification condition in FFLP or FFLS. This may indicate there exists at least one producer of the multiple producers that has not been assigned with any notification tasks for subscription messages having notification conditions that have been received by this router 106.

If at 836 it is determined that there is an available forwarding face to producer in FFLP 330, then processing continues to 838. Determining that there is an available forwarding face to producer in FFLP 330 at 836 may be described as identifying (e.g., based on that determining) and/or causing processing for a second scenario of the seven multiple producer scenarios. The processing for this scenario may be described by 838 or process 860 of FIG. 8A; and the graphical representation for this scenario may be provided in FIG. 7B. These descriptions will follow those for FIG. 6C.

If at 836 it is determined that there is not an available forwarding face to producer in FFLP 330, then processing continues to 840. Determining that there is not an available forwarding face to producer in FFLP 330 at 836 may be described as identifying (e.g., based on that determining) and/or causing processing for a third scenario of the seven multiple producer scenarios. The processing for this scenario may be described by 840 or process 870 of FIG. 8B; and the graphical representation for this scenario may be provided in FIG. 7C. These descriptions will follow those for FIG. 6C.

If it is determined that there is an overlap that the currently received notification condition is an intersect with one or more of the existing notification conditions recorded in FFLP 330 of the router, processing continues to 848.

At 848 it is determined if there is an available forwarding face to producer in FFLP 330. 848 may include determining that there is at least one forwarding face to producer in FFLP 330 has not been associated with any notification condition in FFLP or FFLS. This may indicate there exists at least one producer of the multiple producers that has not been assigned with any notification tasks for subscription messages having notification conditions that have been received by this router 106.

If at 848 it is determined that there is an available forwarding face to producer in FFLP 330, then processing continues to 849. Determining that there is an available forwarding face to producer in FFLP 330 at 849 may be described as identifying (e.g., based on that determining) and/or causing processing for a fourth scenario of the seven multiple producer scenarios. The processing for this scenario may be described by 849 or process 876 of FIG. 8C; and the graphical representation for this scenario may be provided in FIG. 7D. These descriptions will follow those for FIG. 6C.

If at 848 it is determined that there is not an available forwarding face to producer in FFLP 330, then processing continues to 850. Determining that there is not an available forwarding face to producer in FFLP 330 at 848 may be described as identifying (e.g., based on that determining) and/or causing processing for a fifth scenario of the seven multiple producer scenarios. The processing for this scenario may be described by 850 or process 882 of FIG. 8D; and the graphical representation for this scenario may be provided in FIG. 7E. These descriptions will follow those for FIG. 6C.

If it is determined that there is no intersect (e.g., no overlap) of the currently received notification condition with any of the existing notification conditions recorded in FFLP 330 of the router, processing continues to 852.

At 852 it is determined if there is an available forwarding face to producer in FFLP 330. 852 may include determining that there is at least one forwarding face to producer in FFLP 330 has not been associated with any notification condition in FFLP or FFLS. This may indicate there exists at least one producer of the multiple producers that has not been assigned with any notification tasks for subscription messages having notification conditions that have been received by this router 106.

If at 852 it is determined that there is an available forwarding face to producer in FFLP 330, then processing continues to 854. Determining that there is an available forwarding face to producer in FFLP 330 at 852 may be described as identifying (e.g., based on that determining) and/or causing processing for a sixth scenario of the seven multiple producer scenarios. The processing for this scenario may be described by 854 or process 890 of FIG. 8E; and the graphical representation for this scenario may be provided in FIG. 7F. These descriptions will follow those for FIG. 6C.

If at 852 it is determined that there is not an available forwarding face to producer in FFLP 330, then processing continues to 856. Determining that there is not an available forwarding face to producer in FFLP 330 at 852 may be described as identifying (e.g., based on that determining) and/or causing processing for a seventh scenario of the seven multiple producer scenarios. The processing for this scenario may be described by 856 or process 894 of FIG. 8F; and the graphical representation for this scenario may be provided in FIG. 7G. These descriptions now follow.

In scenario 1, the associated notification condition in the currently received subscription interest message is a subset of one of the existing notification conditions in FFLP 330 of a router 106 (e.g., 826). In some embodiments, a subset may be where the entire received notification condition is contained within one of the existing notification conditions in the FFLP 330. It may also be described as a mathematical subset such as where the entire received notification condition is "contained" inside one of the entire existing notification conditions in the FFLP 330, that is, all elements (e.g. data or values from a producer) that satisfy the received notification condition will also satisfy one of the entire existing notification conditions in the FFLP 330.

Figure 7A:
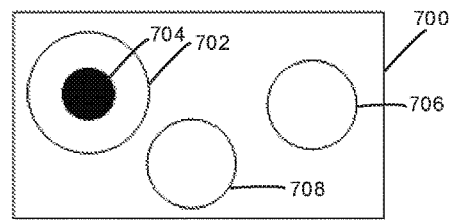
FIGS. 7A-G depicts scenarios for a multiple producer scenario with overlapping or associated conditions according to example embodiments.

FIG. 7A depicts a scenario for a multiple producer scenario where the associated notification condition in the currently received subscription is a subset of one of the existing notification conditions in FFLP according to example embodiments (e.g., condition 704 as a subset of condition 702). As shown in FIG. 7A, in scenario 700 the existing notification conditions in FFLP 702, 706 and 708 are labeled by the empty circles, the associated notification condition 704 in the currently received subscription is labeled by the black circle, which will be used in denoting the other scenarios too. Here associated notification condition 704 in the currently received subscription is shown as a subset of existing notification condition in FFLP 702.

In this scenario, the associated notification condition 704 in the currently received subscription can be "aggregated" into the one existing condition 702 in FFLP 330. This aggregating may include the NDN router 106 (e.g., aggregator 320) simply dropping the received subscription message (the message, such as a message 220, having the currently received notification condition 704). For example, at 828 the new subscription interest message is dropped. In some instances, dropping existing condition 704 is described as changing the associated notification condition 704 (e.g., a first notification condition) in the currently received subscription message based on the existing notification condition 702 in the FFLP (e.g., a second notification condition), where the change in the current notification condition 704 is the dropping of the current notification condition based on the current notification condition being identified as a subset of the existing notification condition 702 in FFLP 330 (e.g., for the same content name). This may be similar to as described for 620 of FIG. 6B. In some instances, this aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this aggregating may then include the NDN router 106 (e.g., aggregator 320) recording the original notification condition associated with (e.g., received with) the currently received subscription interest message in the FIB 130 of the router 106.

In some examples, this aggregating may then also include the NDN router 106 (e.g., aggregator 320) recording the incoming face and associated condition of the received subscription message in the FFLS 335 with any "possible aggregation." For example, at 830 the incoming face and associated condition 704 of the received subscription message are recorded in the FFLS 335 with any "possible aggregation."

One example of such "possible aggregation" may be, if there is not a same incoming face for the current message and one existing in FFLS at 830, the incoming face and current conditions are recorded in FFLS 335. If there is a same incoming face for the current message and one existing in FFLS (and a possible aggregation of the notification conditions associated with those faces) at 830, the existing incoming face can be maintained and any possible aggregation of the current and existing notification conditions being performed. This may be similar to as explained for 622 of FIG. 6B. In addition, this aggregating may then include keeping the FFLP 330 unchanged (e.g., nothing is written into the FFLP as part of the aggregation).

In some embodiments, after this aggregating, the FFLP 330 now includes a notification condition for the aggregate of conditions 702 and 704; and a subscription interest message has already been sent to the multiple producers for condition 702; thus upon any of the producers detecting a change in content to a value that satisfies condition 702, the producer will send a notification message to this router. In some embodiments, upon receipt of this notification message, this router 106 will determine if that value satisfies condition 704 as well as 702 and forward the notification message with the value (as the trigger condition) to any of one or both of the subscribers having their condition in FFLS satisfied by that value.

In one example, the associated notification condition 704 is Value >80 and is "aggregated" into the one existing condition Value >60 by dropping the incoming message and recording the associated face and notification condition in FFLS 335 as Value >80. In some embodiments, as discussed above, dropping condition 704 is described as changing the current notification condition based on the existing notification condition in the FFLP. Then, a notification message with trigger condition Value=75 is sent by the producer to router 106 to satisfy the existing condition Value >60 in FFLP 330 (and forwarded by the router 106 to that producer). Upon receipt of this message, the router 106 will lookup that content name in FIB and based on the Value=75 of the trigger condition, determine that the notification should be sent to the subscriber of the one existing condition Value >60 recorded in FFLS 335, but not to the subscriber of the associated condition Value >80 in FFLS 335. In another instance, a trigger condition having Value=90 would be sent to both subscribers.

One embodiment of a procedure taken by the NDN router 106 in Scenario 1 is shown below. In one embodiment, the process is performed as the first scenario at 826, 828 and 830.

In some instances, the router procedure below has an input that is the associated condition $s_{current}$ in the currently received subscription, the existing conditions in FFLP $S_1$, $S_2, \ldots, S_j$, and an output that is possible updates to FFLS, possible updates to FFLP, and how to handle the currently received subscription (e.g., whether to change produce, change notification condition, and/or change forwarding of the message). Upon receiving the input, the procedure determines if the associated condition is a subset (e.g., see symbol that looks like the uppercase letter U in a sans-serif font, rotated 90 degrees clockwise and underlined) of any of the existing conditions in FFLP by performing the comparison of $s_{current} \subseteq S_i$, i∈[1, l], for exiting conditions in FFLP which are the set/count of i=1 to l of the current subscriptions.

If the associated condition is determined to be a subset of any of the existing conditions in FFLP, then the router procedure output is to drop the currently received subscription message; record the incoming interface and associated condition $s_{current}$ in the FFLS with any possible aggregation of the currently received subscription message (with any aggregation in FFLS), and keep the FFLP unchanged. In some instances, if the associated condition is determined not to be a subset of any of the existing conditions in FFLP, then the received subscription is forwarded to the producer identified in that message, such as based on the information in FIB of the router.

---

Algorithm 1 Procedure taken in Scenario 1

--- input: the associated condition in the currently received subscription $s_{current}$, the existing conditions in FFLP $S_1, S_2, ..., S_l$.
    output: how to update FFLS, FFLP, and handle the currently received subscription.
        if $s_{current} \subseteq S_i$, i ∈ [1, l], then
            drop the subscription message;
            record the incoming interface and $s_{current}$ in the FFLS with any possible aggregation;
            keep the FFLP unchanged;
    End

---

In scenario 2, the associated notification condition in the currently received subscription interest message is a superset of one of the existing notification conditions in FFLP 330 of the NDN router 106 and does not intersect with the other conditions (e.g., 826 and 834) (e.g., based on comparing ranges of values that satisfy different conditions, each value may be one dimensional or multi-dimensional). Moreover (e.g., in addition and at the same time), there is at least one forwarding face to producer in FFLP 330 has not been associated with any notification condition for that router 106, which means there exists at least one producer that has not been assigned with any notification tasks (e.g., at NDN router 106, or in its FFLP 330). For example, at 836 and 838, there is at least one forwarding face to producer listed in FFLP 330 that is available (e.g., has not been assigned with any notification tasks from NDN router 106). In this instance, some principles (e.g., goals) may be to distribute the current subscription (e.g., in the received subscription message) to one of those unassigned producers in FFLP 330. In one instance, if there is only one available forwarding face to producer listed in FFLP 330, a subscription interest message with a new/changed (e.g., aggregated) notification condition based on the superset will be forwarded (e.g., sent) to that one available forwarding face to producer (e.g., 866). In another instance, if there is more than one available forwarding face to producer listed in FFLP 330, a subscription interest message with a new/changed (e.g., aggregated) notification condition based on the superset will be forwarded to a randomly selected one of the more than one available forwarding faces to producer (e.g., 866).

A superset may be where one of the entire existing notification conditions in the FFLP 330 is contained within the received notification condition. A superset may also be described as a mathematical superset such as where one of the entire existing notification conditions in the FFLP 330 is "contained" inside the received notification condition, that is, all elements of one of the entire existing notification conditions in the FFLP 330 are also elements of the received notification condition.

Figure 7B:
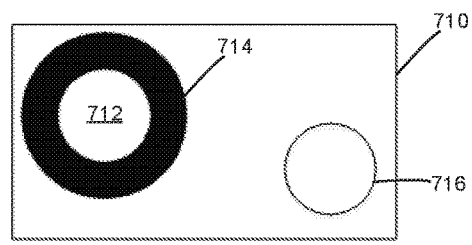

FIG. 7B depicts a scenario for a multiple producer scenario where the associated notification condition in the currently received subscription is a superset of one of the existing notification conditions in FFLP according to example embodiments (e.g., see condition 714 as a superset of condition 712). As shown in FIG. 7B, in scenario 710 the existing notification conditions in FFLP 712 and 716 are labeled by the empty circles, the associated notification condition 714 in the currently received subscription is labeled by the black circle. Here associated notification condition 714 in the currently received subscription is shown as a superset of existing notification condition in FFLP 712.

In this scenario, the existing condition 712 in FFLP 330 can be "aggregated" into the associated notification condition 714 in the currently received subscription. In some embodiments, this aggregating may be described by 838; or more in detail by process 860 of FIG. 8A. Process 860 may be process performed by an NDN router 106 described herein.

In some instances, this aggregating may include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this aggregating may include the NDN router 106 (e.g., aggregator 320) recording the original notification condition associated with (e.g., received with) the currently received subscription interest message in the FIB 130 of the router 106.

In some examples, this aggregating may include the NDN router 106 (e.g., aggregator 320) recording the incoming face and associated condition of the received subscription message in the FFLS 335 with any "possible aggregation." According to embodiments, descriptions of "possible aggregation" such as with respect to aggregation in FFLS 335 may be a part of "this aggregating" or "this not aggregating" such as described with respect to aggregation in FFLS 330. One example of such "possible aggregation" may be to record the received associated notification condition 714 in the currently received subscription as it was received (e.g., without changing that notification condition). For example, at 862 the incoming face and associated condition 714 of the received subscription message are recorded in the FFLS 335 with any "possible aggregation." One example of such "possible aggregation" may be, if there is not a same incoming face for the current message and one existing in FFLS at 862, the incoming face and current conditions are recorded in FFLS 335. If there is a same incoming face for the current message and one existing in FFLS (and a possible aggregation of the notification conditions associated with those faces) at 862, the existing incoming face can be maintained and any possible aggregation of the current and existing notification conditions being performed. This may be similar to as explained for 622 of FIG. 6B.

This aggregating may then also include the NDN router 106 (e.g., aggregator 320) changing the current notification condition in the subscription message to the disjoint set (or difference set) between the superset and subset conditions of the one existing condition 712 in FFLP 330 and the associated notification condition 714 in the currently received subscription.

A disjoint set may be where a portion (e.g., a part but not all) of the received notification condition is not contained within a portion of one of the existing notification conditions in the FFLP 330. A disjoint set may also be described as a mathematical disjoint set such as where the set of conditions of the received notification condition that does not intersect with any portion of one of the existing notification conditions in the FFLP 330. In some instances, a disjoint set may be described as a difference set between two sets of data or values. For example, at 864, the new (e.g., received) notification condition is changed to the disjoint set between the superset and subset conditions of the one existing condition 712 in FFLP 330 and the associated notification condition 714 in the currently received subscription.

In addition, this aggregating may then also include forwarding the subscription message having (e.g., with) the changed (e.g., new and updated) notification condition to one of the unused forwarding faces to producer (e.g., the one detected or identified in FFLP 330). For example, at 866, a subscription message with the changed notification condition is forwarded to the one unused forwarding faces to producer (e.g., the one detected or identified in FFLP 330).

In addition, this aggregating may then also include updating the FFLP 330 according to or based on the forwarded subscription message. For example, at 868, the information for the forwarded subscription message (e.g., the forwarding to producer face and subscription message content name and updated notification condition) is written into FFLP 330 as part of the aggregation.

In some embodiments, the FFLP 330 now includes a notification condition for the aggregate of conditions 712 and 714; and a subscription interest message has already been sent to the multiple producers for condition 712 and for the disjoint set of conditions 712 and 714 (e.g., the part of condition 714 that is not included in condition 712); thus upon any of the producers detecting a change in content to a value that satisfies condition 712 or the disjoint set, the producer will send a notification message to this router. In some embodiments, upon receipt of this notification message, this router 106 will determine if that value satisfies condition 712 as well as the disjoint set and forward the notification message with the value (as the trigger condition) to any of one or both of the subscribers having their condition in FFLS satisfied by that value.

In one example, the associated notification condition 714 is Value >60 and is "aggregated" into the one existing condition Value >80 by recording the associated incoming face and notification condition as Value >60 in FFLS 335; and forwarding a subscription request to the available producer with the changed notification condition 60<Value <80; and recording the outgoing interface and condition for that message in FFLP 330. Then, a notification message with trigger condition Value=75 is sent by the available producer to router 106 to satisfy the changed notification condition 60<Value <80 in FFLP 330 (forwarded to that available producer as part of aggregation). Upon receipt of this message, the router 106 will lookup that content name in FIB and based on the Value=75 of the trigger condition, determine that the notification should be sent to the subscriber of the new associated condition Value >60 recorded in FFLS 335, but not to the subscriber of the existing condition Value >80 recorded in FFLS 335. In another instance, a trigger condition having Value=90 would be sent to both subscribers.

One embodiment of a procedure taken by the NDN router 106 in Scenario 2 is shown below. In one embodiment, the process is performed as the first scenario at 826, 834, 836, and 838 (e.g., process 860).

In some instances, the router procedure below has an input that is the associated condition $s_{current}$ in the currently received subscription, the existing conditions in FFLP $S_1$, $S_2, \ldots, S_l$ that are associated with face $f_1, f_2, \ldots, f_l$, and the total number of forwarding faces towards producers nf. It has an output that is possible updates to FFLS, possible updates to FFLP, and how to handle the currently received subscription (e.g., whether to change produce, change notification condition, and/or change forwarding of the message). Upon receiving the input, the procedure determines if the associated condition is a superset (e.g., see symbol that looks like the uppercase letter U in a sans-serif font, rotated 90 degrees counter-clockwise) of any of the existing conditions in FFLP by performing the comparison to identify the relationship $s_{current} \supset S_i$, $i \in [1,l]$ (i.e. condition $s_{current}$ is a superset of condition $S_i$ or condition $S_i$ is a subset of condition $s_{current}$ for exiting conditions in FFLP which are the set/count of i=1 to l of the current subscriptions. Here, it also determines if the associated condition does not intersect (e.g., based on comparing ranges of values that satisfy different conditions, each value may be one dimensional or multi-dimensional) with any other (e.g., other than the one it is a superset of) of the existing notification conditions in FFLP by performing the comparison to identify whether $j \in [1,l], j \neq i, s_{current} \cap S_j$ n=∅ or if there are not other intersections. In addition, it also determines if there is at least one forwarding face to producer in FFLP 330 has not been associated with any notification condition for that router by performing the comparison of nf−l>0, which will have the total number of forwarding faces towards producers nf greater than the total number of the current subscriptions l (e.g., nf−l>0) if there is at least one forwarding face to producer in FFLP 330 has not been associated with any notification condition.

If the associated condition is determined to be a superset of any of the existing conditions in FFLP, does not intersect any other existing condition and there is at least one forwarding face to producer in FFLP 330 has not been associated with any notification condition, then the router procedure output is to record the incoming interface and associated condition $s_{current}$ in the FFLS with any possible aggregation of the currently received subscription message (with any aggregation in FFLS), change the associated condition to the disjoint set between the superset and subset conditions of the one existing condition in FFLP 330 and the associated notification condition as shown by $s_{current} = s_{current} - S_i$, forward the subscription message having (e.g., with) the changed (e.g., new and updated) notification condition to one of the unused forwarding faces to producer (e.g., to a face other than $f_1, f_2, \ldots, f_l$); and record the used face and changed $s_{current}$ in FFLP. In some instances, if the associated condition is not determined to be a superset of any of the existing conditions in FFLP, or does intersect any other existing condition, then the received subscription is forwarded to the producer identified in that message, such as based on the information in FIB of the router.

---
Algorithm 2 Procedure taken in Scenario 2
--- input: the associated condition in the currently received subscription $s_{current}$, the existing conditions in FFLP $S_1, S_2, ..., S_l$ that are associated with face $f_1, f_2, ..., f_l$, the total number of forwarding faces towards producers nf.
outpu: How to update FFLS, FFLP, and handle the currently received subscription.
   if $s_{current} \supset S_i$, $i \in [1, l]$ and for every $j \in [1, l]$, $j \neq i$, $s_{current} \cap S_j = \emptyset$ and nf − l > 0 then
      record the incoming interface and $s_{current}$ in the FFLS with any possible aggregation;
      $s_{current} = s_{current} - S_i$;
      forward the subscription message to a face other than $f_1, f_2, ..., f_l$;
      record the used face and $s_{current}$ in FFLP;
   End

---

In scenario 3, the associated notification condition in the currently received subscription interest message is a superset of one of the existing notification conditions in FFLP 330 of a router 106 and does not intersect with the other conditions (e.g., 826 and 834) (e.g., based on comparing ranges of values that satisfy different conditions, each value may be one dimensional or multi-dimensional). Moreover (e.g., in addition and at the same time) there is not at least one forwarding face to producer in FFLP 330 has not been associated with any notification condition for that router 106, which means that from the current NDN router 106 point of view, each of the multiple producers (e.g., known at that router 106, or in its FFLP 330) have been assigned with at least one notification task from that router 106 (e.g., at that router 106, or in its FFLP 330). For example, at 836, there are no forwarding face to producer listed in FFLP 330 that are available (e.g., each producer listed has been assigned with at least one notification task from that router 106) (e.g., 836 and 840). In this instance, it is not possibly to satisfy a principle to distribute the current subscription to one of those unassigned producers in FFLP 330, because they are all assigned.

Figure 7C:
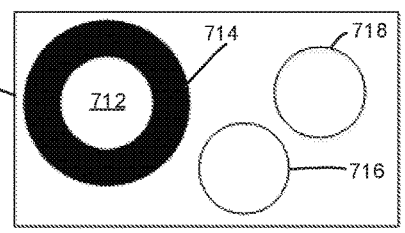

FIG. 7C depicts a scenario for a multiple producer scenario where the associated notification condition in the currently received subscription is a superset of one of the existing notification conditions in FFLP according to example embodiments (e.g., see condition 714 as a superset of condition 712). As shown in FIG. 7C, in scenario 711 the existing notification conditions in FFLP 712, 716 and 718 are labeled by the empty circles, the associated notification condition 714 in the currently received subscription is labeled by the black circle. Here associated notification condition 714 in the currently received subscription is shown as a superset of existing notification condition in FFLP 712.

In this scenario, the one existing condition 712 in FFLP 330 can be "aggregated" into the associated notification condition 714 in the currently received subscription. In some embodiments, this aggregating may be described by 840: or more in detail by process 870 of FIG. 8B. Process 870 may be process performed by the NDN router 106 described herein.

In some instances, this aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this aggregating may then include the NDN router 106 (e.g., aggregator 320) recording the original notification condition associated with (e.g., received with) the currently received subscription interest message in the FIB 130 of the router 106.

In some examples, this aggregating may include the NDN router 106 (e.g., aggregator 320) recording the incoming face and associated condition of the received subscription message in the FFLS 335 with any "possible aggregation." For example, at 871 the incoming face and associated condition 714 of the received subscription message are recorded in the FFLS 335 with any "possible aggregation." One example of such "possible aggregation" may be, if there is not a same incoming face for the current message and one existing in FFLS at 871, the incoming face and current conditions are recorded in FFLS 335. If there is a same incoming face for the current message and one existing in FFLS (and a possible aggregation of the notification conditions associated with those faces) at 871, the existing incoming face can be maintained and any possible aggregation of the current and existing notification conditions being performed. This may be similar to as explained for 622 of FIG. 6B.

This aggregating may then also include the NDN router 106 (e.g., aggregator 320) changing the current notification condition in the subscription message to the disjoint set between the superset and subset conditions of the one existing condition 712 in FFLP 330 and the associated notification condition 714 in the currently received subscription. For example, at 872, the new (e.g., received) notification condition is changed to the disjoint set between the superset and subset conditions of the one existing condition 712 in FFLP 330 and the associated notification condition 714 in the currently received subscription.

In addition, this aggregating may then also include forwarding the subscription message having (e.g., with) the changed (e.g., new and updated) notification condition to the forwarding faces to producer with which the existing subset condition is associated. For example, at 873, a subscription message with the changed notification condition is forwarded to the forwarding faces to producer of the currently received subscription message (e.g., the one of the received subscription message recorded in the FFLS 335 at 871).

In addition, this aggregating may then also include updating the FFLP 330 according to or based on the forwarded subscription message. For example, at 874, the information for the forwarded subscription message (e.g., the forwarding to producer face and subscription message content name and updated notification condition) is written into FFLP 330 as part of the aggregation.

In some embodiments, the FFLP 330 now includes a notification condition for the aggregate of conditions 712 and 714: and a subscription interest message has already been sent to the multiple producers for condition 712 and for the disjoint set of conditions 712 and 714 (e.g., the part of condition 714 that is not included in condition 712); thus upon any of the producers detecting a change in content to a value that satisfies condition 712 or the disjoint set, the producer will send a notification message to this router. In some embodiments, upon receipt of this notification message, this router 106 will determine if that value satisfies condition 712 as well as the disjoint set and forward the notification message with the value (as the trigger condition) to any of one or both of the subscribers having their condition in FFLS satisfied by that value.

In one example, the associated notification condition 714 is Value >60 and is "aggregated" into the one existing condition Value >80 by recording the associated incoming face and notification condition as Value >60 in FFLS 335; and forwarding a subscription request to the producer in the forward face to producer of the received message having condition 714 with the changed notification condition 60<Value <80; and recording the outgoing interface and condition for that message in FFLP 330. Then, a notification message with trigger condition Value=75 is sent by the available producer to router 106 to satisfy the changed notification condition 60<Value <80 in FFLP 330 (forwarded to that available producer as part of aggregation). Upon receipt of this message, the router 106 will lookup that content name in FIB and based on the Value=75 of the trigger condition, determine that the notification should be sent to the subscriber of the new associated condition Value >60 recorded in FFLS 335, but not to the subscriber of the existing condition Value >80 recorded in FFLS 335. In another instance, a trigger condition having Value=90 would be sent to both subscribers.

One embodiment of a procedure taken by the NDN router 106 in scenario 3 is shown below. In one embodiment, the process is performed as the first scenario at 826, 834, 836, and 840 (e.g., process 870).

In some instances, the router procedure below has an input that is the associated condition $s_{current}$ in the currently received subscription, the existing conditions in FFLP $S_1$, $S_2$, ..., $S_l$ that are associated with face $f_1, f_2, ..., f_l$, and the total number of forwarding faces towards producers nf.

It has an output that is possible updates to FFLS, possible updates to FFLP, and how to handle the currently received subscription (e.g., whether to change produce, change notification condition, and/or change forwarding of the message). Upon receiving the input, the procedure determines if the associated condition is a superset (e.g., see symbol that looks like the uppercase letter U in a sans-serif font, rotated 90 degrees counter-clockwise) of any of the existing conditions in FFLP by performing the comparison to identify the relationship $s_{current} \supset S_i$, $i \in [1,l]$ (i.e. condition $s_{current}$ is a superset of condition $S_i$ or condition $S_i$ is a subset of condition $s_{current}$) for exiting conditions in FFLP which are the set/count of i=1 to l of the current subscriptions. Here, it also determines if the associated condition does not intersect (e.g., see symbol that looks like the uppercase letter U in a sans-serif font, rotated 180 degrees or upside down) with any other (e.g., other than the one it is a superset of) of the existing notification conditions in FFLP by performing the comparison to determine whether $j \in [1,l]$, $j \neq i$, $s_{current} \cap S_j = \emptyset$ or if there are not other intersections. In addition, it also determines if there is not at least one forwarding face to producer in FFLP 330 has not been associated with any notification condition for that router by performing the comparison of nf=1, which will have the total number of forwarding faces towards producers nf equal to the total number of the current subscriptions l (e.g., nf=l) if there is not at least one forwarding face to producer in FFLP 330 has not been associated with any notification condition.

If the associated condition is determined to be a superset of any of the existing conditions in FFLP, does not intersect any other existing condition and there is not at least one forwarding face to producer in FFLP 330 has not been associated with any notification condition then the router procedure output is to record the incoming interface and associated condition $s_{current}$ in the FFLS with any possible aggregation of the currently received subscription message (with any aggregation in FFLS), change the associated condition to the disjoint set between the superset and subset conditions of the one existing condition in FFLP 330 and the associated notification condition as shown by $s_{current} = s_{current} - S_i$, forward the subscription message having (e.g., with) the changed (e.g., new and updated) notification condition to the forwarding faces to producer with which the existing subset condition is associated (e.g., to $f_i$); and record the used face and changed $s_{current}$ in FFLP. In some instances, if the associated condition is not determined to be a superset of any of the existing conditions in FFLP, or does intersect any other existing condition then the received subscription is forwarded to the producer identified in that message, such as based on the information in FIB of the router.

---

Algorithm 3 Procedure taken in Scenario 3

--- input: the associated condition in the currently received subscription $s_{current}$, the existing conditions in FFLP $S_1, S_2, ..., S_l$ that are associated with face $f_1, f_2, ..., f_l$, the total number of forwarding faces towards producers nf.

output: how to update FFLS, FFLP, and handle the currently received subscription.

if $s_{current} \supset S_i$, $i \in [1, l]$ and for every $j \in [1, l]$, $j \neq i$, $s_{current} \cap S_j = \emptyset$ and nf = 1 then record the incoming interface and $s_{current}$ in the FFLS with any possible aggregation;

$s_{current} = s_{current} - S_i$ forward the subscription message to $f_i$;

record the used face and $s_{current}$ in FFLP;

End

---

In scenario 4, the associated notification condition in the currently received subscription interest message intersects with one or more of the existing notification conditions in FFLP 330 of a router 106 (e.g., 826 and 848) (e.g., based on comparing ranges of values that satisfy different conditions, each value may be one dimensional or multi-dimensional).

Moreover (e.g., in addition and at the same time) there is at least one forwarding face to producer in FFLP 330 has not been associated with any notification condition for that router 106, which means there exists at least one producer that has not been assigned with any notification tasks (e.g., at that router 106, or in its FFLP 330). For example, at 848 and 849, there is at least one forwarding face to producer listed in FFLP 330 that is available (e.g., has not been assigned with any notification tasks from that router 106). In this instance, some principles (e.g., goals) may be to distribute the current subscription (e.g., in the received subscription message) to one of those unassigned producers in FFLP 330. In some instances, if there is only one available forwarding face to producer listed in FFLP 330, a subscription interest message with a new/changed (e.g., aggregated) notification condition based on the superset will be forwarded (e.g., sent) to that one available forwarding face to producer (e.g., see 873). In another instance, if there is more than one available forwarding face to producer listed in FFLP 330, a subscription interest message with a new/changed (e.g., aggregated) notification condition based on the superset will be forwarded to a randomly selected one of the more than one available forwarding faces to producer (e.g., see 873).

An intersection may be where a portion (e.g., a part but not all) of the received notification condition is contained within a portion of one of the existing notification conditions in the FFLP 330. An intersection may also be described as a mathematical intersect such as where the intersection is a set that contains all of the notification condition elements that belong to one of the existing notification conditions in the FFLP 330 as well as that belong to the received notification condition, but no other elements.

Figure 7D:
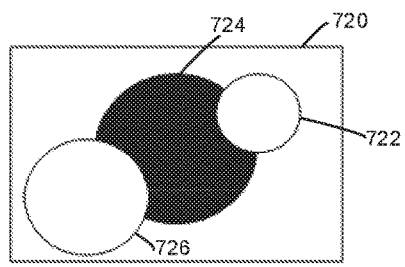

FIG. 7D depicts a scenario for a multiple producer scenario where the associated notification condition in the currently received subscription has an intersect with two of the existing notification conditions in FFLP according to example embodiments (e.g., see condition 724 as intersecting with conditions 722 and 726). As shown in FIG. 7D, in scenario 720 the existing notification conditions in FFLP 722 and 726 are labeled by the empty circles, the associated notification condition 724 in the currently received subscription is labeled by the black circle. Here associated notification condition 724 in the currently received subscription is shown as having an intersect with existing notification conditions 722 and 726 in FFLP.

In this scenario, the associated notification condition 724 in the currently received subscription can be "aggregated" into each of the two existing conditions 722 and 726 in FFLP 330. In some embodiments, this aggregating may be described by 849; or more in detail by process 876 of FIG. 8E. Process 876 may be process performed by an NDN router 106 described herein.

In some instances, this aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this aggregating may then include the NDN router 106 (e.g., aggregator 320) recording the original notification condition associated with (e.g., received with) the currently received subscription interest message in the FIB 130 of the router 106.

In some examples, this aggregating may include the NDN router 106 (e.g., aggregator 320) recording the incoming face and associated condition of the received subscription message in the FFLS 335 with any "possible aggregation." For example, at 877 the incoming face and associated condition 724 of the received subscription message are recorded in the FFLS 335 with any "possible aggregation." One example of such "possible aggregation" may be, if there is not a same incoming face for the current message and one existing in FFLS at 877, the incoming face and current conditions are recorded in FFLS 335. If there is a same incoming face for the current message and one existing in FFLS (and a possible aggregation of the notification conditions associated with those faces) at 877, the existing incoming face can be maintained and any possible aggregation of the current and existing notification conditions being performed. This may be similar to as explained for 622 of FIG. 6B.

This aggregating may then also include the NDN router 106 (e.g., aggregator 320) changing the current notification condition in the subscription message to the disjoint set from the intersected conditions of the associated notification condition 724 in the currently received subscription and the two existing condition 722 and 726 in FFLP 330. For more description on "disjoint set" see FIGS. 7B and 8C; and scenario 2 above.

For example, at 878, the new (e.g., received) notification condition is changed to the disjoint set between the intersected conditions of the associated notification condition 724 in the currently received subscription and the two existing condition 722 and 726 in FFLP 330.

In addition, this aggregating may then also include forwarding the subscription message having (e.g., with) the changed (e.g., new and updated) notification condition to one of the unused forwarding faces to producer (e.g., the one detected or identified in FFLP 330). For example, at 879, a subscription message with the changed notification condition is forwarded to the one unused forwarding faces to producer (e.g., the one detected or identified in FFLP 330).

In addition, this aggregating may then also include updating the FFLP 330 according to or based on the forwarded subscription message. For example, at 880, the information for the forwarded subscription message (e.g., the forwarding to producer face and subscription message content name and updated notification condition) is written into FFLP 330 as part of the aggregation.

In some embodiments, the FFLP 330 now includes a notification condition for the aggregate of conditions 722 and 726, and 724; and a subscription interest message has already been sent to the multiple producers a) for condition 722 and b) for the disjoint set of conditions 722 and 726, and 724 (e.g., the part of condition 724 that is not included in conditions 722 and 726); thus upon any of the producers detecting a change in content to a value that satisfies condition 722 or 726, or the disjoint set, the producer will send a notification message to this router. In some instances, upon receipt of this notification message, this router 106 will determine if that value satisfies condition 722, or 726, as well as the disjoint set and forward the notification message with the value (as the trigger condition) to any of the three of the subscribers having their condition in FFLS satisfied by that value.

In one example, the associated notification condition 724 is 60<Value <90, and is "aggregated" into the two existing condition Value >80 and Value <70 by recording the incoming face and associated notification condition as 60<Value <90 in FFLS 335; and forwarding a subscription request to the available producer with the changed notification condition 70<Value <80; and recording the outgoing interface and condition for that message in FFLP 330. Then, when a notification message with trigger condition Value=75 is sent by the available producer to satisfy the changed notification condition 70<Value <80 in FFLP 330 (forwarded to that available producer as part of aggregation). Upon receipt of this message, the router 106 will lookup that content name in FIB and based on the Value=75 of the trigger condition, determine that the notification should be sent to the subscriber of the new associated condition 60<Value <90 recorded in FFLS 335, but not to the two subscriber of the existing conditions as Value >80 and Value <70 recorded in FFLS 335. In another instance, a trigger condition having Value=85 would be sent to both the subscriber of the new associated condition 60<Value <90, and the subscriber of existing condition Value >80.

One embodiment of a procedure taken by the NDN router 106 in Scenario 4 is shown below. In one embodiment, the process is performed as the first scenario at NDN router 826, 848 and 849 (e.g., process 876).

In some instances, the router procedure below has an input that is the associated condition $s_{current}$ in the currently received subscription, the existing conditions in FFLP $S_i$, $S_2, \ldots, S_l$ that are associated with face $f_1, f_2, \ldots, f_l$, and the total number of forwarding faces towards producers nf. It has an output that is possible updates to FFLS, possible updates to FFLP, and how to handle the currently received subscription (e.g., whether to change produce, change notification condition, and/or change forwarding of the message). Upon receiving the input, the procedure determines if the associated condition has an intersect that is not a subset or superset with any of the existing conditions in FFLP by performing the comparison operations to determine if $s_{current}$ is intersecting with k number of existing conditions in FFLP, $j_1, \ldots, j_k$, where $k \geq 1$ and $i \in [1,l]$, $s_{current} \supset S_i$=false, $s_{current} \subset S_i$=false for exiting conditions in FFLP which are the set/count of i=1 to l of the current subscriptions.

In addition, it also determines if there is at least one forwarding face to producer in FFLP 330 has not been associated with any notification condition for that router by performing the comparison of nf−l>0, which will have the total number of forwarding faces towards producers nf greater than the total number of the current subscriptions l (e.g., nf−l>0) if there is at least one forwarding face to producer in FFLP 330 has not been associated with any notification condition.

If the associated condition is determined to have an intersect that is not a subset or superset with any of the existing conditions in FFLP, and there is at least one forwarding face to producer in FFLP 330 has not been associated with any notification condition then the router procedure output is to record the incoming interface and associated condition $s_{current}$ in the FFLS with any possible aggregation of the currently received subscription message (with any aggregation in FFLS), change the associated condition to the disjoint set from the intersected conditions of the associated notification condition and the existing condition in FFLP 330 as shown by $s_{current} = (s_{current} \cap S_{j_1}) \cup \ldots \cup (s_{current} \cap S_{j_k})$, forward the subscription message having (e.g., with) the changed (e.g., new and updated) notification condition to one of the unused forwarding faces to producer (e.g., to a face other than $f_1, f_2, \ldots, f_l$); and record the used face and changed $s_{current}$ in FFLP. In some instances, if the associated condition is not determined to have an intersect that is not a subset or superset with any of the existing conditions in FFLP, then the received subscription is forwarded to the producer identified in that message, such as based on the information in FIB of the router.

Algorithm 4 Procedure taken in Scenario 4 input: the associated condition in the currently received subscription $s_{current}$, the existing conditions in FFLP $S_1, S_2, \ldots, S_l$ that are associated with face $f_1, f_2, \ldots, f_l$, the total number of forwarding faces towards producers nf.
output: how to update FFLS, FFLP, and handle the currently received subscription.
 If $s_{current}$ is intersecting with k number of existing conditions in FFLP, $j_1, \ldots, j_k$, $k \geq 1$ then
  If for every $i \in [1, l]$, $s_{current} \supset S_i$ = false, $s_{current} \subset S_i$ = false and nf − l > 0 then
   record the incoming interface and $s_{current}$ in the FFLS with any possible aggregation;
   $s_{current} = (s_{current} \cap S_{j_1}) \cup \ldots \cup (s_{current} \cap S_{j_k})$;
   forward the subscription message to a face other than $f_1, f_2, \ldots, f_l$;
   record the used face and $s_{current}$ in FFLP;
 end In scenario 5, the associated notification condition in the currently received subscription interest message is an intersect with one or more of the existing notification conditions in FFLP 330 of a router 106 (e.g., 826 and 848) (e.g., based on comparing ranges of values that satisfy different conditions, each value may be one dimensional or multi-dimensional). Moreover (e.g., in addition and at the same time) there is not at least one forwarding face to producer in FFLP 330 has not been associated with any notification condition for that router 106, which means that from the current NDN router 106 point of view, each of the multiple producers (e.g., known at that router 106, or in its FFLP 330) have been assigned with at least one notification task from that router 106 (e.g., at that router 106, or in its FFLP 330). For example, at 848, there are no forwarding face to producer listed in FFLP 330 that are available (e.g., each producer listed has been assigned with at least one notification task from that router 106) (e.g., see 848 and 850). In this instance, it is not possibly to satisfy a principle to distribute the current subscription to one of those unassigned producers in FFLP 330, because they are all assigned.

Figure 7E:
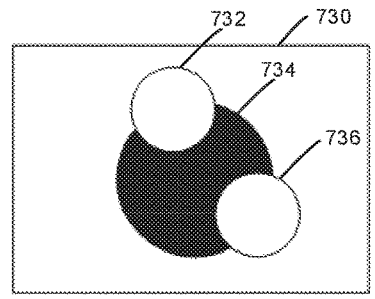

FIG. 7E depicts a scenario for a multiple producer scenario where the associated notification condition in the currently received subscription is an intersect with two of the existing notification conditions in FFLP according to example embodiments (e.g., see condition 734 as intersecting with conditions 732 and 736). As shown in FIG. 7E, in scenario 730 the existing notification conditions in FFLP 732 and 736 are labeled by the empty circles, the associated notification condition 734 in the currently received subscription is labeled by the black circle. Here associated notification condition 734 in the currently received subscription is shown as having an intersect with existing notification conditions 732 and 736 in FFLP.

In this scenario, the associated notification condition 734 in the currently received subscription can be "aggregated" into each of the two existing conditions 732 and 736 in FFLP 330. In one instance, this aggregating may be described by 850; or more in detail by process 882 of FIG. 8D. Process 882 may be process performed by an NDN router 106 described herein.

In some instances, this aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this aggregating may then include the NDN router 106 (e.g., aggregator 320) recording the original notification condition associated with (e.g., received with) the currently received subscription interest message in the FIB 130 of the router 106.

In some examples, this aggregating may include the NDN router 106 (e.g., aggregator 320) recording the incoming face and associated condition of the received subscription message in the FFLS 335 with any "possible aggregation." For example, at 883 the incoming face and associated condition 734 of the received subscription message are recorded in the FFLS 335 with any "possible aggregation." One example of such "possible aggregation" may be, if there is not a same incoming face for the current message and one existing in FFLS at 883, the incoming face and current conditions are recorded in FFLS 335. If there is a same incoming face for the current message and one existing in FFLS (and a possible aggregation of the notification conditions associated with those faces) at 883, the existing incoming face can be maintained and any possible aggregation of the current and existing notification conditions being performed. This may be similar to as explained for 622 of FIG. 6B.

This aggregating may then also include the NDN router 106 (e.g., aggregator 320) changing the current notification condition in the subscription message to the disjoint set from the intersected conditions of the associated notification condition 734 in the currently received subscription and the two existing condition 732 and 736 in FFLP 330. For more description on "disjoint set" see FIGS. 7B and 8C; and scenario 2 above. For example, at 884, the new (e.g., received) notification condition is changed to the disjoint set between the intersected conditions of the associated notification condition 734 in the currently received subscription and the two existing condition 732 and 736 in FFLP 330.

This aggregating may then also include the NDN router 106 (e.g., aggregator 320) randomly selecting a forwarding face to producer from the faces with which the intersected conditions are associated (e.g., the faces of associated notification condition 734 in the currently received subscription and the two existing condition 732 and 736 in FFLP 330. For example, at 885, a forwarding face to producer is randomly selected (e.g., the selection one of any of the faces equally probably) as one of the faces associated with the associated notification condition 734 in the currently received subscription and the two existing condition 732 and 736 in FFLP 330.

In addition, this aggregating may then also include forwarding the subscription message having (e.g., with) the changed (e.g., new and updated) notification condition to the randomly selected forwarding face to producer (e.g., the one selected as associated notification conditions 732, 734 and 736). For example, at 886, a subscription message with the changed notification condition is forwarded to the one randomly selected forwarding faces to producer.

In addition, this aggregating may then also include updating the FFLP 330 according to or based on the forwarded subscription message. For example, at 887, the information for the forwarded subscription message (e.g., the forwarding to producer face and subscription message content name and updated notification condition) is written into FFLP 330 as part of the aggregation.

In some embodiments, the FFLP 330 now includes a notification condition for the aggregate of conditions 732 and 736, and 734; and a subscription interest message has already been sent to the multiple producers a) for condition 732 and b) for the disjoint set of conditions 732 and 736, and 734; thus upon any of the producers detecting a change in content to a value that satisfies condition 732 or 736, or the disjoint set, the producer will send a notification message to this router. In some instances, upon receipt of this notification message, this router 106 will determine if that value satisfies condition 732, or 736, as well as the disjoint set and forward the notification message with the value (as the trigger condition) to any of the three of the subscribers having their condition in FFLS satisfied by that value.

In one example, the associated notification condition 734 is 60<Value <90, and is "aggregated" into the two existing condition Value >80 and Value <70 by recording the incoming face and associated notification condition as 60<Value <90 in FFLS 335; and forwarding a subscription request to the randomly selected producer from those associated with condition 732, 734 and 736 with the changed notification condition 70<Value <80; and recording the outgoing interface and condition for that message in FFLP 330. Then, a notification message with trigger condition Value=75 is sent by the random producer to router 106 to satisfy the changed notification condition 70<Value <80 in FFLP 330 (forwarded to that random producer as part of aggregation). Upon receipt of this message, the router 106 will lookup that content name in FIB and based on the Value=75 of the trigger condition, determine that the notification should be sent to the subscriber of the new associated condition 60<Value <90 recorded in FFLS 335, but not to the two subscriber of the existing conditions Value >80 and Value <70 recorded in FFLS 335. In another instance, a trigger condition having Value=85 would be sent to both the subscriber of the new associated condition 60<Value <90, and the subscriber of existing condition Value >80.

One embodiment of a procedure taken by the NDN router 106 in scenario 5 is shown below. In one embodiment, the process is performed as the first scenario at NDN router 826, 848 and 850 (e.g., process 882).

In some instances, the router procedure below has an input that is the associated condition $s_{current}$ in the currently received subscription, the existing conditions in FFLP $S_1$, $S_2$, ..., $S_l$ that are associated with face $f_1$, $f_2$, ..., $f_l$, and the total number of forwarding faces towards producers nf. It has an output that is possible updates to FFLS, possible updates to FFLP, and how to handle the currently received subscription (e.g., whether to change produce, change notification condition, and/or change forwarding of the message). Upon receiving the input, the procedure determines if the associated condition has an intersect that is not a subset or superset with any of the existing conditions in FFLP by performing the comparison of $s_{current}$ is intersecting with k number of existing conditions in FFLP, $j_1$, ..., $j_k$, k≥1 and i∈[1,l], $s_{current} \supset S_i$=false, $s_{current} \subset S_i$=false for exiting conditions in FFLP which are the set/count of i=1 to l of the current subscriptions. Here, it also determines if the associated condition does not intersect (e.g., see symbol that looks like the uppercase letter U in a sans-serif font, rotated 180 degrees or upside down) with any other (e.g., other than the one it is a superset of) of the existing notification conditions in FFLP by performing the comparison of j–[1,l], j≠i, $s_{current} \cap S_j = \emptyset$ which will only=0 if there are not other intersections. In addition, it also determines if there is not at least one forwarding face to producer in FFLP 330 has not been associated with any notification condition for that router by performing the comparison of nf=1, which will have the total number of forwarding faces towards producers nf equal to the total number of the current subscriptions l (e.g., nf=l) if there is not at least one forwarding face to producer in FFLP 330 has not been associated with any notification condition.

If the associated condition is determined to have an intersect that is not a subset or superset with any of the existing conditions in FFLP, and there is not at least one forwarding face to producer in FFLP 330 has not been associated with any notification condition then the router procedure output is to record the incoming interface and associated condition $s_{current}$ in the FFLS with any possible aggregation of the currently received subscription message (with any aggregation in FFLS), change the associated condition to the disjoint set from the intersected conditions of the associated notification condition and the existing condition in FFLP 330 as shown by $s_{current}$ ($s_{current} \cap S_{j_1}) \cup \ldots \cup (s_{current} \cap S_{j_k})$, randomly selecting a forwarding face to producer from the faces with which the intersected conditions are associated (e.g., the faces of associated notification condition and the existing condition in FFLP 330 as shown by randomly select a forwarding face $f_r$ from $f_{j_1}, \ldots, f_{j_k}$, forward the subscription message having (e.g., with) the changed (e.g., new and updated) notification condition to the randomly selected forwarding face to producer (e.g., to face $f_r$); and record the used face and changed $s_{current}$ in FFLP. In some instances, if the associated condition is not determined to have an intersect that is not a subset or superset with any of the existing conditions in FFLP, then the received subscription is forwarded to the producer identified in that message, such as based on the information in FIB of the router.

comparing ranges of values that satisfy different conditions, each value may be one dimensional or multi-dimensional). Moreover (e.g., in addition and at the same time), there is at least one forwarding face to producer in FFLP 330 has not been associated with any notification condition for that router 106, which means there exists at least one producer that has not been assigned with any notification tasks (e.g., at that router 106, or in its FFLP 330). For example, at 852 and 854, there is at least one forwarding face to producer listed in FFLP 330 that is available (e.g., has not been assigned with any notification tasks from that router 106). In this instance, some principles (e.g., goals) may be to distribute the current subscription (e.g., in the received subscription message) to one of those unassigned producers in FFLP 330. In one instance, if there is only one available forwarding face to producer listed in FFLP 330, a subscription interest message with the received notification condition will be forwarded (e.g., sent) to that one available forwarding face to producer (e.g., 879). In another instance, if there is more than one available forwarding face to producer listed in FFLP 330, a subscription interest message with a new/changed (e.g., aggregated) notification condition based on the superset will be forwarded to a randomly selected one of the more than one available forwarding faces to producer (e.g., 879).

In some embodiment not intersecting may be where none of the received notification condition is contained within any of one of the existing notification conditions in the FFLP 330. Not intersecting may also be described as a mathematical disjoint such as where there is not a set that contains any of the notification condition elements that belong to one of the existing notification conditions in the FFLP 330 as well as that belong to the received notification condition (e.g., they have no condition in common).

Figure 7F:
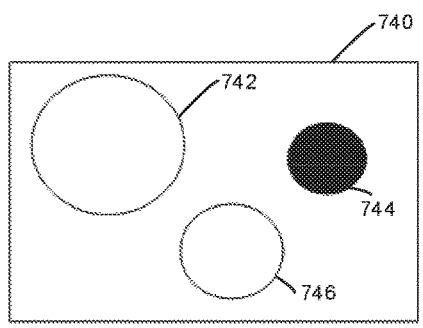

FIG. 7F depicts a scenario for a multiple producer scenario where the associated notification condition in the currently received subscription has no intersect with any of the existing notification conditions in FFLP according to example embodiments (e.g., condition 744 has no intersection with condition 742 or 746). As shown in FIG. 7F, in scenario 740 the existing notification conditions in FFLP 742 and 746 are labeled by the empty circles, the associated notification condition 744 in the currently received subscrip-

---

Algorithm 5 Procedure taken in Scenario 5 input: the associated condition in the currently received subscription $s_{current}$, the existing conditions in FFLP $S_1, S_2, \ldots, S_l$ that are associated with face $f_1, f_2, \ldots, f_l$, the total number of forwarding faces towards producers nf.
output: How to update FFLS, FFLP, and handle the currently received subscription.
If $s_{current}$ is intersecting with k number of existing conditions in FFLP, $j_1, \ldots, j_k$, k ≥ 1 then
    If for every i ∈ [1, l], $s_{current} \supset S_i$ = false, $s_{current} \subset S_i$ = false and nf = l then
        record the incoming interface and $s_{current}$ in tnhe FFLS with any possible aggregation;
        $s_{current} = (s_{current} \cap S_{j_1}) \cup \ldots \cup (s_{current} \cap S_{j_k})$;
        randomly select a forwarding face $f_r$ from $f_{j_1}, \ldots, f_{j_k}$ and forward the subscription message to $f_r$;
        $S_r = s_{current} \cup S_r$;
        record the used face and $s_{current}$ in FFLP;
end

---

In scenario 6, the associated notification condition in the currently received subscription interest message does not intersect with any of the existing notification conditions in FFLP 330 of a router 106 (e.g., 826 and 852) (e.g., based on tion is labeled by the black circle. Here associated notification condition 744 in the currently received subscription is shown as having no intersection with existing notification condition 742 or 746 in FFLP.

In this scenario, the associated notification condition 744 in the currently received subscription can-not be "aggregated" into any of the two existing condition 742 or 746 in FFLP 330. In some embodiments, this "not aggregating" may be described by 854; or more in detail by process 890 of FIG. 8E. Process 890 may be process performed by an NDN router 106 described herein.

In some instances, this not aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this not aggregating may then include the NDN router 106 (e.g., aggregator 320) recording the original notification condition associated with (e.g., received with) the currently received subscription interest message in the FIB 130 of the router 106.

In some examples, this not aggregating may include the NDN router 106 (e.g., aggregator 320) recording the incoming face and associated condition of the received subscription message in the FFLS 335 without any "possible aggregation." For example, at 891 the incoming face and associated condition 744 of the received subscription message are recorded in the FFLS 335 with any "possible aggregation." One example of such "possible aggregation" may be, if there is not a same incoming face for the current message and one existing in FFLS at 891, the incoming face and current conditions are recorded in FFLS 335. If there is a same incoming face for the current message and one existing in FFLS (and a possible aggregation of the notification conditions associated with those faces) at 891, the existing incoming face can be maintained and any possible aggregation of the current and existing notification conditions being performed. This may be similar to as explained for 622 of FIG. 6B.

This not aggregating may also include the NDN router 106 (e.g., aggregator 320) forwarding the subscription message having (e.g., with) the received notification condition (e.g., condition 744) to one of the unused forwarding faces to producer (e.g., the one detected or identified in FFLP 330). For example, at 892, a subscription message with the received notification condition is forwarded to the one unused forwarding faces to producer (e.g., the one detected or identified in FFLP 330).

In addition, this aggregating may then also include updating the FFLP 330 according to or based on the forwarded subscription message. For example, at 893, the information for the forwarded subscription message (e.g., the forwarding to producer face and subscription message content name and updated notification condition) is written into FFLP 330 as part of the aggregation.

In some embodiments, the FFLP 330 now includes a notification condition for the non-aggregate of conditions 742, 744 and 746; and a subscription interest message has already been sent to the multiple producers each of conditions 742, 744 and 746; thus upon any of the producers detecting a change in content to a value that satisfies any of these conditions, that producer will send a notification message to this router. In some instances, upon receipt of this notification message, this router 106 will determine if that value satisfies condition 742, 744 or 746, and forward the notification message with the value (as the trigger condition) to any (and at most only one) of the three of the subscribers having their condition in FFLS satisfied by that value.

In one example, the associated notification condition 744 is 60<Value <90, and is not "aggregated" into the two existing condition Value >95 and Value <50 by recording the associated incoming face and associated notification condition as 60<Value <90 in FFLS 335; forwarding a subscription request to the available producer with the received notification condition 60<Value <90; and recording the outgoing interface and condition for that message in FFLP 330. Then, a notification message with trigger condition Value=75 is sent by the available producer to satisfy the received notification condition 60<Value <90 in FFLP 330 (forwarded to that available producer as part of aggregation). Upon receipt of this message, the router 106 will lookup that content name in FIB and based on the Value=75 of the trigger condition, determine that the notification should be sent to the subscriber of the new associated condition 60<Value <90 recorded in FFLS 335 and forward the reporting interest message to that subscriber, but not to the two subscribers of the existing conditions Value >95 and Value <50 recorded in FFLS 335. In another instance, a trigger condition having Value=100 would be sent to only the subscriber of the new associated condition Value >95.

One embodiment of a procedure taken by the NDN router 106 in scenario 6 is shown below. In one embodiment, the process is performed as the first scenario at NDN router 826, 852 and 854 (e.g., process 890).

In some instances, the router procedure below has an input that is the associated condition $s_{current}$ in the currently received subscription, the existing conditions in FFLP $S_1$, $S_2, \ldots, S_l$ that are associated with face $f_1, f_2, \ldots f_l$, and the total number of forwarding faces towards producers nf. It has an output that is possible updates to FFLS, possible updates to FFLP, and how to handle the currently received subscription (e.g., whether to change produce, change notification condition, and/or change forwarding of the message). Upon receiving the input, the procedure determines if the associated condition has no intersect with any of the existing conditions in FFLP by performing the comparison of $s_{current}$ is intersecting with any existing conditions in FFLP by performing the comparison of $j \in [1,l]$, $s_{current} \cap S_j = \emptyset$ for exiting conditions in FFLP which are the set/count of i=1 to l of the current subscriptions. In addition, it also determines if there is at least one forwarding face to producer in FFLP 330 has not been associated with any notification condition for that router by performing the comparison of nf−l>0, which will have the total number of forwarding faces towards producers nf greater than the total number of the current subscriptions l (e.g., nf−l>0) if there is at least one forwarding face to producer in FFLP 330 has not been associated with any notification condition.

If the associated condition is determined to not have an intersect with any of the existing conditions in FFLP, and there is at least one forwarding face to producer in FFLP 330 has not been associated with any notification condition then the router procedure output is to record the incoming interface and associated condition $s_{current}$ in the FFLS with any possible aggregation of the currently received subscription message (with any aggregation in FFLS), and forward the subscription message having (e.g., with) the associated notification condition to one of the unused forwarding faces to producer (e.g., to a face other than $f_1, f_2, \ldots, f_l$); and record the used face and $s_{current}$ in FFLP.

Algorithm 6 Procedure taken in Scenario 6 input: the associated condition in the currently received subscription $s_{current}$, the existing conditions in FFLP $S_1, S_2, ..., S_l$ that are associated with face $f_1, f_2, ..., f_l$, the total number of forwarding faces towards producers nf.
output: how to update FFLS, FFLP, and handle the currently received subscription.
    if for every $j \in [1, l]$, $s_{current} \cap S_j = \emptyset$ and nf − 1 > 0 then
        record the incoming interface and $s_{current}$ in the FFLS with any possible aggregation;
        forward the subscription message to a face other than face $f_1, f_2, ..., f_l$;
        record the used face and $s_{current}$ in FFLP;
    end In scenario 7, the associated notification condition in the currently received subscription interest message does not intersect with any of the existing notification conditions in FFLP 330 of a router 106 (e.g., 826 and 852) (e.g., based on comparing ranges of values that satisfy different conditions, each value may be one dimensional or multi-dimensional). Moreover (e.g., in addition and at the same time) there is not at least one forwarding face to producer in FFLP 330 has not been associated with any notification condition for that router 106, which means that from the current NDN router 106 point of view, each of the multiple producers (e.g., known at that router 106, or in its FFLP 330) have been assigned with at least one notification task from that router 106 (e.g., at NDN router 106, or in its FFLP 330). For example, at 852, there are no forwarding face to producer listed in FFLP 330 that are available (e.g., each producer listed has been assigned with at least one notification task from that router 106) (e.g., 852 and 856). In this instance, it is not possibly to satisfy a principle to distribute the current subscription to one of those unassigned producers in FFLP 330, because they are all assigned.

Figure 7G:
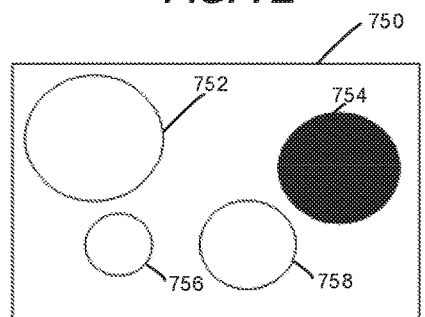
Figure 8A:
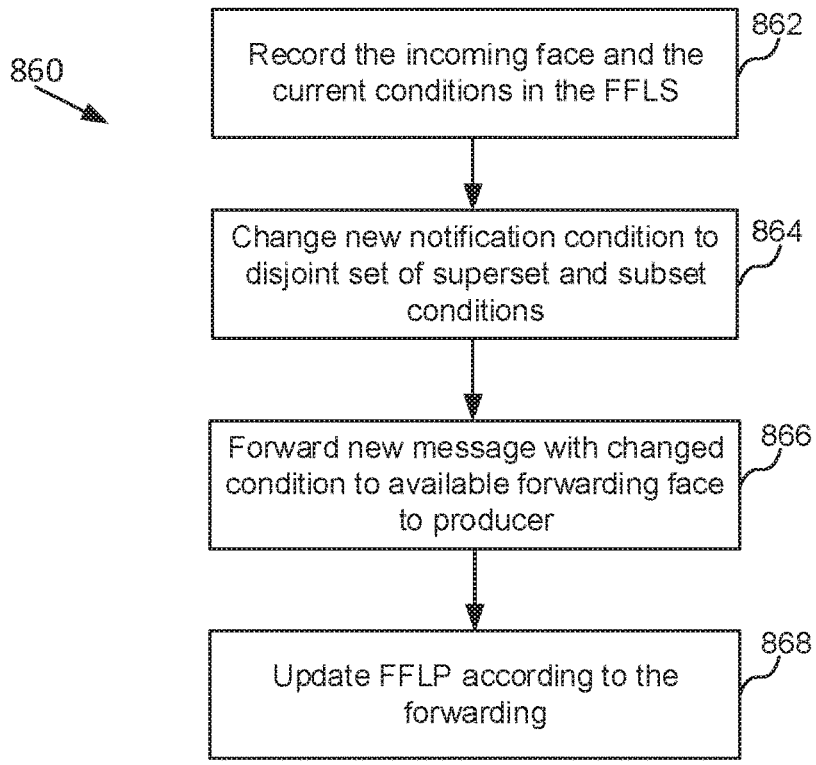
FIGS. 8A-F are flow diagrams for processing overlapping or associated conditions according to example embodiments.
Figure 8B:
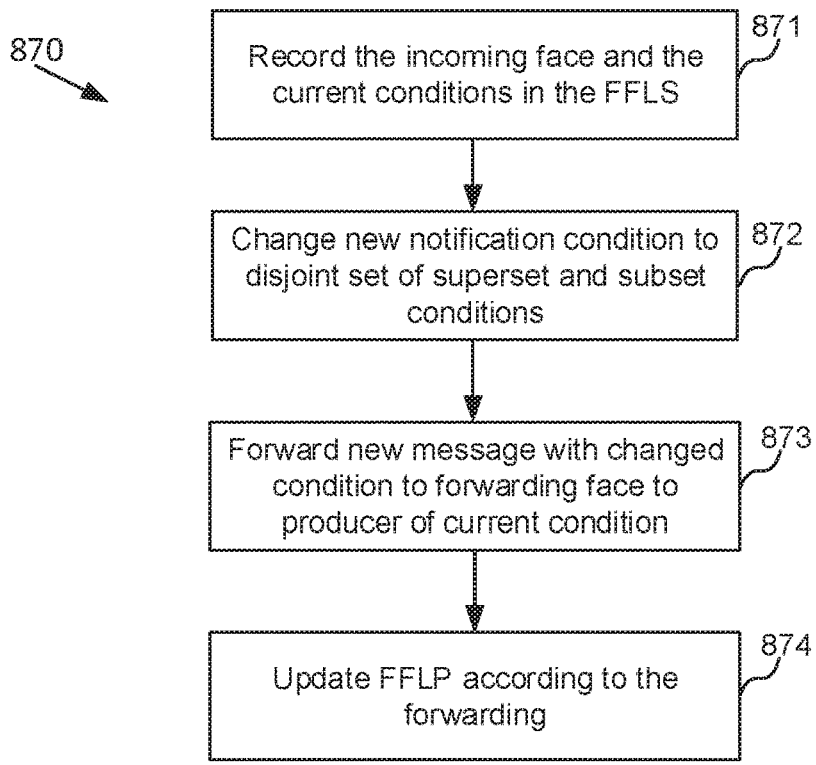
Figure 8C:
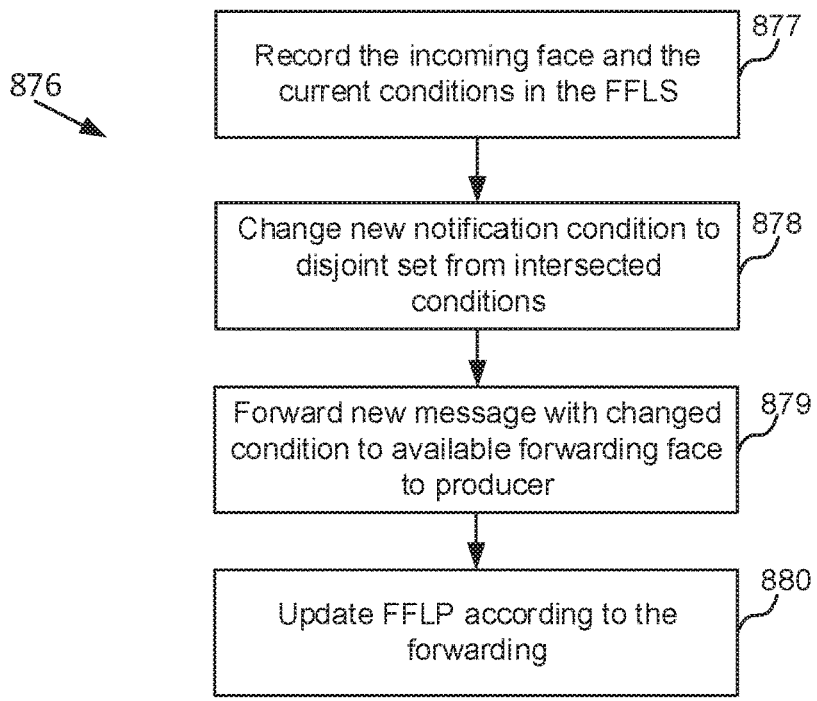
Figure 8D:
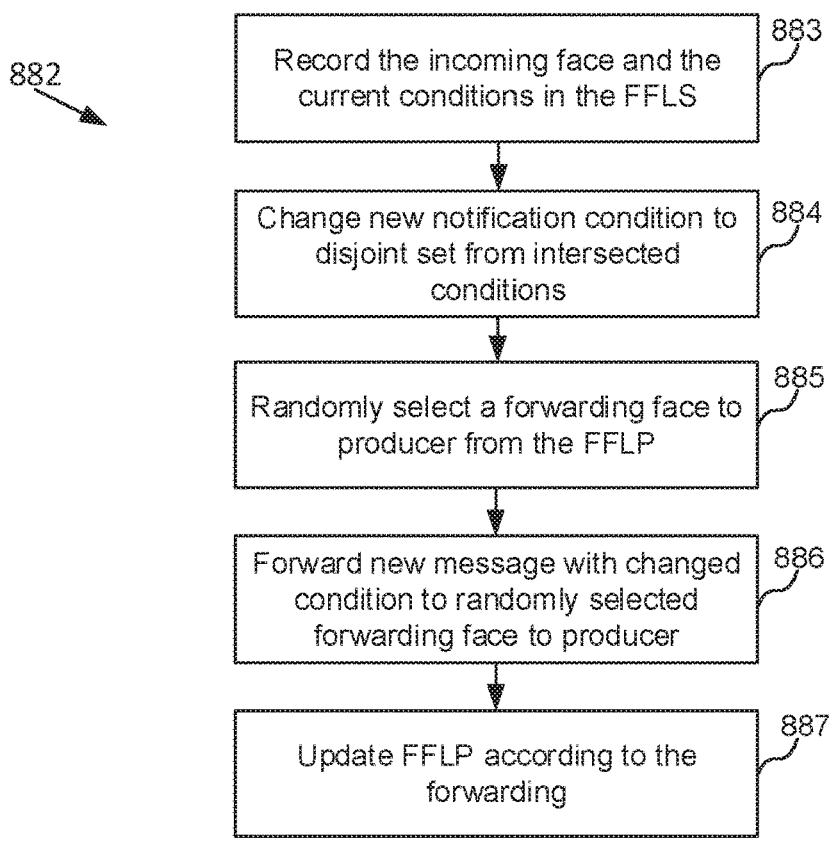
Figure 8E:
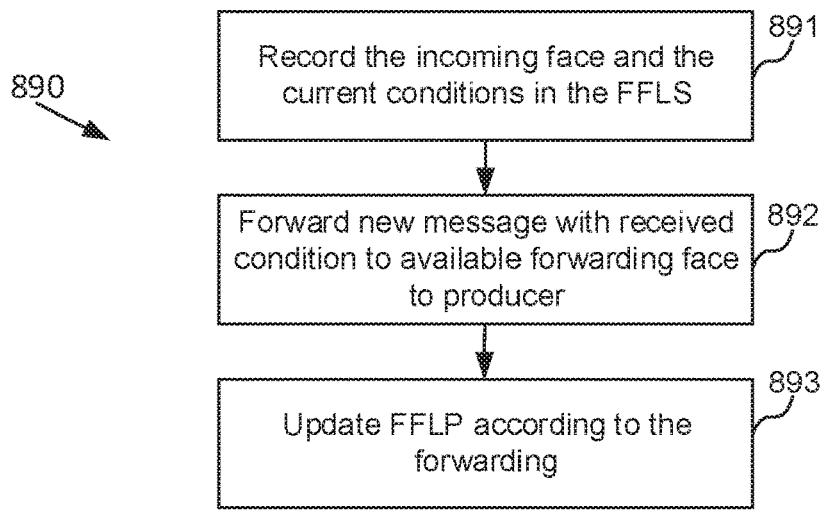
Figure 8F:
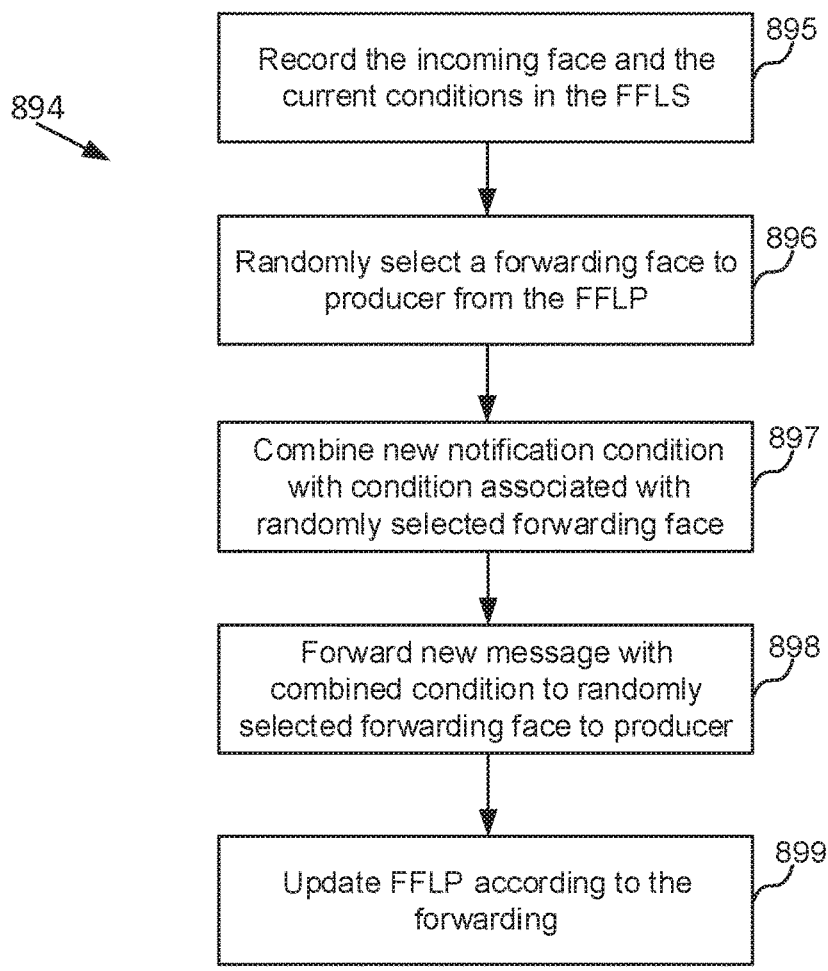

FIG. 7G depicts a scenario for a multiple producer scenario where the associated notification condition in the currently received subscription has no intersect with any of the existing notification conditions in FFLP according to example embodiments (e.g., see condition 754 has no intersection with condition 752, 756 or 758). As shown in FIG. 7G, in scenario 750 the existing notification conditions in FFLP 752, 756 and 756 are labeled by the empty circles, the associated notification condition 754 in the currently received subscription is labeled by the black circle. Here, associated notification condition 754 in the currently received subscription is shown as having no intersection with existing notification condition 752, 756 or 758 in FFLP.

In this scenario, the associated notification condition 754 in the currently received subscription cannot be "aggregated" into any of the existing conditions 752, 756 or 758 in FFLP 330. In some embodiments, this not aggregating may be described by 856; or more in detail by process 894 of FIG. 8F. Process 894 may be process performed by an NDN router 106 described herein.

In some instances, this not aggregating may then include the NDN router 106 (e.g., aggregator 320) recording a subscriber forwarding face of the currently received subscription interest message (e.g., the router interface at which the current message was received by router 106) in the FIB 130 of the router 106. In addition to recording the subscriber forwarding face, in some instances, this not aggregating may then include the NDN router 106 (e.g., aggregator 320) recording the original notification condition associated with (e.g., received with) the currently received subscription interest message in the FIB 130 of the router 106.

In some examples, this not aggregating may include the NDN router 106 (e.g., aggregator 320) recording the incoming face and associated condition of the received subscription message in the FFLS 335 without any "possible aggregation." For example, at 895 the incoming face and associated condition 754 of the received subscription message are recorded in the FFLS 335 with any "possible aggregation." One example of such "possible aggregation" may be, if there is not a same incoming face for the current message and one existing in FFLS at 895, the incoming face and current conditions are recorded in FFLS 335. If there is a same incoming face for the current message and one existing in FFLS (and a possible aggregation of the notification conditions associated with those faces) at 895, the existing incoming face can be maintained and any possible aggregation of the current and existing notification conditions being performed. This may be similar to as explained for 622 of FIG. 6B.

This not aggregating may then also include the NDN router 106 (e.g., aggregator 320) randomly selecting a forwarding face to producer from the faces in FFLP 330 (e.g., selects any of the faces of existing conditions 752, 756 or 758 in FFLP 330). For example, at 896, a forwarding face to producer is randomly selected (e.g., the selection one of any of the faces equally probably) as one of the faces associated with the existing conditions 752, 756 and 758 in FFLP 330.

This not aggregating may then also include the NDN router 106 (e.g., aggregator 320) changing the notification condition associated with the randomly selected forwarding face by combining the condition of the currently received subscription message with the condition originally associated with the randomly selected face. For example, at 897, the new (e.g., received) notification condition is changed to the combination of the total conditions of the associated notification condition 734 in the currently received subscription and the notification conditions of the randomly selected one of the existing conditions 752, 756 or 758 in FFLP 330.

In addition, this not aggregating may then also include forwarding the subscription message having (e.g., with) the changed (e.g., new and updated) notification condition to the randomly selected forwarding face to producer (e.g., the one selected as associated notification conditions 752, 756 or 758). For example, at 898, a subscription message with the changed notification condition is forwarded to the one randomly selected forwarding faces to producer.

In addition, this not aggregating may then also include updating the FFLP 330 according to or based on the forwarded subscription message. For example, at 899, the information for the forwarded subscription message (e.g., the forwarding to producer face and subscription message content name and updated notification condition) is written into FFLP 330 as part of the aggregation.

In some instances, the FFLP 330 now includes a notification condition for the non-aggregate of conditions 752, 756 and 758, and 754; and a subscription interest message has already been sent to the multiple producers a) for conditions 752, 756 and 758, and b) for the combined set of conditions associated with the randomly selected forwarding face (e.g., of 752, 756 or 758) and 734; thus upon any of the producers detecting a change in content to a value that satisfies a) condition 752, 756 or 758, or b) the combined set of conditions associated with the randomly selected forwarding face (e.g., of 752, 756 or 758) and 734, the producer will send a notification message to this router. In some instances, upon receipt of this notification message, this router 106 will determine if that value satisfies condition 752, 756 or 758, as well as the combined condition and forward the notification message with the value (as the trigger condition) to any of the four subscribers having their condition in FFLS satisfied by that value.

In one example, the associated notification condition 744 is 60<Value <90, and is not "aggregated" into the three existing conditions 55>Value >57, Value >95 and Value <50 by recording the associated incoming face and associated notification condition as 60<Value <90 in FFLS 335; forwarding a subscription request to the randomly selected producer from those associated with condition 752, 756 and 758 with the changed notification condition combining the current condition and that associated with the randomly selected face; and recording the outgoing interface and condition for that message in FFLP 330. Then, a notification message with trigger condition is sent by the random producer to satisfy the combined changed notification condition in FFLP 330 (forwarded to that random producer as part of not aggregation). Upon receipt of this message, the router 106 will lookup that content name in FIB and based on the Value=75 of the trigger condition, determine that the notification should be sent to the subscriber of the new associated condition in FFLS 335 or the subscriber of the randomly selected forward face to producer from the existing conditions in FFLS 335 (but not to the other two subscriber of the existing conditions in FFLS 335). In another instance, a trigger condition having a different value could be sent to both the subscriber of the new associated condition, and the subscriber of randomly selected existing condition.

One embodiment of a procedure taken by the NDN router 106 in scenario 7 is shown below. In one embodiment, the process is performed as the first scenario at NDN router 826, 852 and 856 (e.g., process 894).

In some instances, the router procedure below has an input that is the associated condition $s_{current}$ in the currently received subscription, the existing conditions in FFLP $S_1$, $S_2$, ..., $S_l$ that are associated with face $f_1$, $f_2$, ... $f_l$, and the total number of forwarding faces towards producers nf. It has an output that is possible updates to FFLS, possible updates to FFLP, and how to handle the currently received subscription (e.g., whether to change produce, change notification condition, and/or change forwarding of the message). Upon receiving the input, the procedure determines if the associated condition has no intersect with any of the existing conditions in FFLP by performing the comparison of $s_{current}$ is intersecting with any existing conditions in FFLP by performing the comparison of j∈[1, l], $s_{current} \cap S_j = \emptyset$ for exiting conditions in FFLP which are the set/count of i=1 to l of the current subscriptions. In addition, it also determines if there is not at least one forwarding face to producer in FFLP 330 has not been associated with any notification condition for that router by performing the comparison of nf=1, which will have the total number of forwarding faces towards producers nf equal to the total number of the current subscriptions l (e.g., nf=l) if there is not at least one forwarding face to producer in FFLP 330 has not been associated with any notification condition.

If the associated condition is determined to not have an intersect with any of the existing conditions in FFLP, and there is not at least one forwarding face to producer in FFLP 330 has not been associated with any notification condition then the router procedure output is to record the incoming interface and associated condition $s_{current}$ in the FFLS with any possible aggregation of the currently received subscription message (with any aggregation in FFLS), randomly selecting a forwarding face to producer from the faces with which the intersected conditions are associated (e.g., the faces of associated notification condition and the existing condition in FFLP 330 as shown by randomly select a forwarding face $f_r$ from, $f_{j_1}$, ..., $f_{j_k}$, forward the subscription message having (e.g., with) the associated notification condition to the randomly selected forwarding face to producer (e.g., to face $f_r$); and record the used face and $s_{current}$ in FFLP.

---

Algorithm 7 Procedure taken in Scenario 7 input: the associated condition in the currently received subscription $s_{current}$, the existing conditions in FFLP $S_1, S_2, ..., S_l$ that are associated with face $f_1, f_2, ..., f_l$, the total number of forwarding faces towards producers nf.
output: how to update FFLS, FFLP, and handle the currently received subscription.
   if for every j ∈ [1, l], $s_{current} \cap S_j = \emptyset$ and nf = 1 then
      record the incoming interface and $s_{current}$ in the FFLS with any possible aggregation;
      randomly selects a forwarding face k out of $f_1, f_2, ..., f_{nf}$;
      forward the subscription message to $f_k$;
      $S_k = s_{current} \cap S_j$;
      record the used face and $s_{current}$ in FFLP;
   End

---

Various advantages may be provided by the embodiments described herein. In some embodiments, subscribers are aggregated to the same content based on one or both of two aspects: incoming interface and associate notification condition. A subscription interest that reaches an NDN router 106 may be aggregated with the existing subscription(s) (e.g., recorded in FFLP) if it comes from the same interface (e.g., the same face) and/or the associated condition overlaps (e.g., there is some intersection) a condition of an existing record in the FIB. It may also be not aggregated, but may be producer distributed even when there is no overlap (e.g., no intersection). Such native subscriber/subscription aggregation and distribution may provide benefits of significantly reducing the transmission of the subscription interest messages in the network.

In some embodiments, an interest message carrying the new aggregate-able subscription (which is a subset of an existing subscription at the router) can be dropped (e.g., "changed" such as is noted above) by the NDN router 106 and does not need to be forwarded further towards the producer (e.g., single producer with subset, or scenario 1). In some embodiments, if a subscription interest that reaches an NDN router 106 comes from the same interface as an existing record, but the condition is not a subset of the condition of the record, then the subscription interest can be maintained in the same record. The updated condition of the forwarding face may become the super set of the existing condition and the current condition in the new subscription interest message. In some embodiments, if the content producer does not know all the subscription conditions (i.e. it always sends out the notification when there is any update to the content, given it is a resource competent server), then the interest message does not need to be forwarded further to the producer either. In some embodiments, if the content producer should know all the subscription conditions in order to filter the notifications before they are sent out, such that it can reduce the resource wasted in sending unwanted notifications to subscribers, then the interest message needs to be forwarded further towards the producer.

Without some of the embodiment herein, the subscription interest message usually needs to be forwarded all the way to the producer when the clients send the interests over time. In some of these instances, the subscription interest message cannot be aggregated in the PIT, for example in the long-lived interest solution. Here, each notification requires one long-lived interest message, which is even worse if the clients want constant notifications of content changes.

Figure 9:
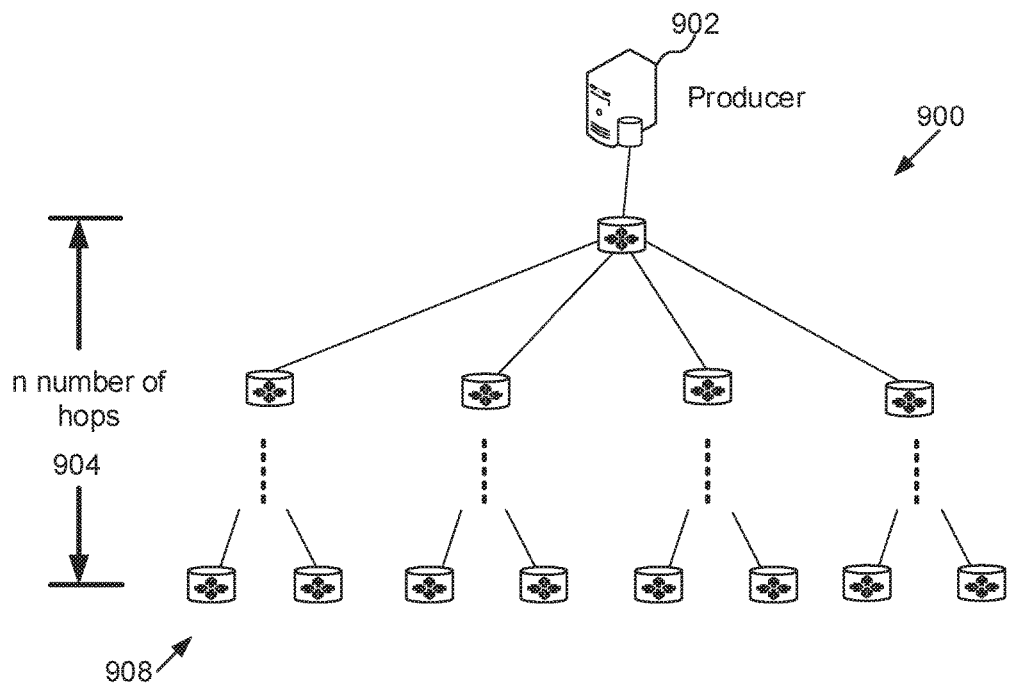
FIG. 9 is a block diagram of a tree routing topology for processing subscription interest messages according to example embodiments.

FIG. 9 is a block diagram of a tree routing topology 900 to a producer for processing of subscription interest messages from consumers/subscribers according to example embodiments. FIG. 9 shows tree routing topology 900 from clients (not shown) to producer 902. The producer 902 may be a resource competent server (e.g., providers 425 or 108), and may need not know all the subscription conditions. There could be n number of hops 904 from a leaf router indicated at 908 to the producer 902. In some embodiments, n may be between 1 to 15, which is assumed to be the largest number of hops between the client and the producer in one embodiment. In some embodiments, n may be a higher number. In some embodiments, all clients are attached to the leaf routers (e.g., they are attached below routers 908) to send subscription request messages to simplify the analysis (note, the clients may be attached to any router in the network).

FIG. 9 may be used to facilitate various analysis of the embodiments described herein. For some analyses, it may be possible to calculate the average number of hops that a subscription interest message is transported in the network. Assuming that the probability that a subscription interest message may be aggregated in an existing record in FIB of an en-route NDN router 106 is p (i) where i indicates the level in the tree topology from the bottom. p (i) is assumed to be the same for the same level i. Thus the average number of hops that a subscription interest message is forwarded in the network (denoted by hop) may be shown in the following equation:

$$\text{hop} \Sigma_{k=1}^{n} k * p(k+1) * \Pi_{j=1}^{k}(1-p(j)) \tag{1}$$

Figure 10A:
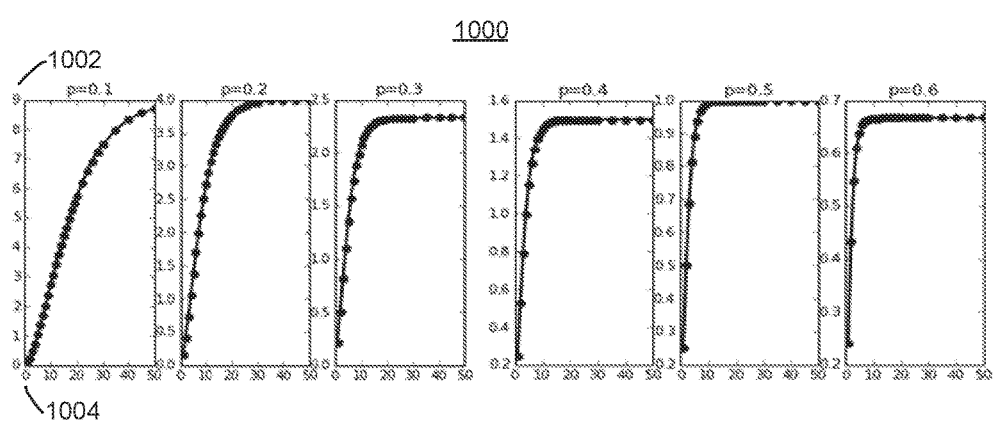
FIG. 10A illustrates graphs for a number of hops for constant aggregation probabilities at different levels according to example embodiments.

FIG. 10A is a series of graphs illustrating number of hops for constant aggregation probabilities at different levels according to example embodiments. FIG. 10A may be a series of graphs 1000 showing the vertical axis as hop distribution 1002 versus horizontal axis as n 1004 when p (i) is the same p for all levels, which takes value in [0.1, 0.2, 0.3, 0.4, 0.5, 0.6]. We can see that the hop distribution of graphs 1000 of this analysis may flatten around the values of 9, 4, 2.3, 1.5, 1, 0.67 respectively, which may mean that the traversed hop of a subscription interest message is significantly less than the distance between a client and the producer.

FIG. 10B is a series of graphs illustrating number of hops for linear increases in aggregation probabilities at different levels according to example embodiments. FIG. 10B may be a series of graphs 1010 showing the hop distribution 1002 versus n 1004 when p (i) linearly increases when the level i increases as shown in the following equation:

$$p(i)=p+(i-1)*\alpha \tag{2}$$

In equation (2), p and α are constants. The setting of p varies between [0.1, 0.6] and a is set to a relatively small value (i.e. 0.05) in the simulations of FIG. 10A to insure p (i) is less than 1 when i=15. It is observed that the hop distribution of graphs 1010 flattens around the values of 3, 2.1, 1.5, 1.1, 0.8, 0.55 respectively. The linear increment of p (i) further decreases the average number of traversed hops of a subscription interest message in the network, comparing to FIG. 10A with the same p.

FIG. 10C is a series of graphs illustrating number of hops for exponential increases in aggregation probabilities at different levels according to example embodiments. FIG. 10C is a series of graphs 1020 illustrating the hop distribution 1002 versus n 1004 when p (i) is defined as:

$$p(i) = p^{\frac{1}{i}} \tag{3}$$

It is observed that the hop distribution of graphs 1020 flattens around the values of 2, 1.5, 1.2, 0.9, 0.7, 0.5 respectively. With more rapid increment of p (i) along the level of i, the proposed solution performs more preferable in the average number of traverse d hops of a subscription interest message in the network.

FIG. 11 is a block diagram of an example of a house use case 1100 for processing of subscription interest messages from consumers/subscribers according to example embodiments. In some embodiments of this case, there are temperature sensors 1104 deployed in different floors/locations of a house 1110, and are connected to three wireless gateways 1115, 1120, 1125 in the house. The three wireless gateways connect to three different NDN 1130, 1135, 1140 routers respectively (e.g., each such as a router 106). The topology may include further routers as indicated at 1150, 1155, and 1160 respectively (e.g., each such as a router 106). NDN router 1 1130, 2 1135, 3940 connect to NDN router 4 1145 through three separate interfaces. Thus in the NDN router 4 1145, there are three forwarding interfaces for the temperature data, which may be named as temp.house1. In some existing ICN subscription/notification mechanisms the predicate-based subscription may cause a subscription message being sent to multiple content producers (i.e. all the temperature sensors in the house) if they satisfy the predicates. However, that would congest the network with notifications carrying the same updated information from multiple producers. The proposed solution of embodiments herein can realize the subscriptions of a content being distributed to producers if the content has multiple producers.

Some embodiments can distribute the various subscriptions to different groups of sensors for notifications. The distribution can be based on the conditions, e.g. Value<30, 30<Value<80, Value >80, which do not have intersections. Such distribution makes each group of sensors only need to send out notifications when the conditions are met, which can reduce the overall battery consumption over all the sensors and increase the efficiency. For example, the Gateway 1 may be only receiving subscription interest messages for temp.house1 with conditions as Value<30; the Gateway 2 may be receiving subscription interest messages for temp.house1 with conditions as 30<Value<80; the Gateway 1 may be only receiving subscription interest messages for temp.house1 with conditions as Value >80. In some embodiments, this can be achieved by the NDN router 4 at 1145 in selecting the forwarding face for the subscription interest messages. In some embodiments, when the NDN router 4 at 1145 receives a subscription interest message for temp.house1 with condition Value<30 (or less), it always forwards such interest message to the interface towards NDN router 1 at 1130. In some embodiments, when the NDN router 4 at 1145 receives a subscription interest message for temp.house1 with condition 30<Value<80, it always forwards such interest message to the interface towards NDN router 2 1135. In some embodiments, when the NDN router 4 at 1145 receives a subscription interest message for temp.house1 with condition Value<80 (or more), it always forwards such interest message to the interface towards NDN router 3 at 1140. As a result, when a notification is sent out, the following scenarios could happen.

In some embodiments, when a notification reaches the NDN router 1 at 1130, it always satisfies the condition of Value<30, which is forwarded to the NDN router 4 1145 as the next hop. In some embodiments, when the NDN router 4 at 1145 receives the notification, it will forward the notification to the corresponding forwarding face to subscribers requiring the condition as Value<30.

In some embodiments, when a notification reaches the NDN router 1 at 1130, it always satisfies the condition of 30<Value<80, which is forwarded to the NDN router 4 at 1145 as the next hop. Similarly, in some embodiments, when the NDN router 4 at 1145 receives the notification, it will forward the notification to the corresponding forwarding face to subscribers requiring the condition as 30<Value<80.

In some embodiments, when a notification reaches the NDN router 1 at 1130, it always satisfies the condition of Value >80, which is forwarded to the NDN router 4 at 1145 as the next hop. Similarly, in some embodiments, when the NDN router 4 at 1145 receives the notification, it will forward the notification to the corresponding forwarding face to subscribers requiring the condition as Value >80.

Some of the existing ICN subscription/notification mechanisms, such as in COPSS, require a new logical node RN to notification propagation. It is likely to become the bottleneck, and the notification path always involve the RN, which cannot leverage the native multicast support provided by the ICN architectures, e.g. NDN architecture.

Some embodiments herein propose solutions that enable the notification multicasting from the content producer to the subscribers which is natively supported by NDN architecture. In some embodiments, when a notification arrives at a NDN router, it is always forwarded to the interfaces where the conditions are met, which are the faces where the subscription interest message originally came from. In some embodiments, this process carries on until the notification reaches every subscriber on the multicast paths originating from the content producer.

Figure 12:
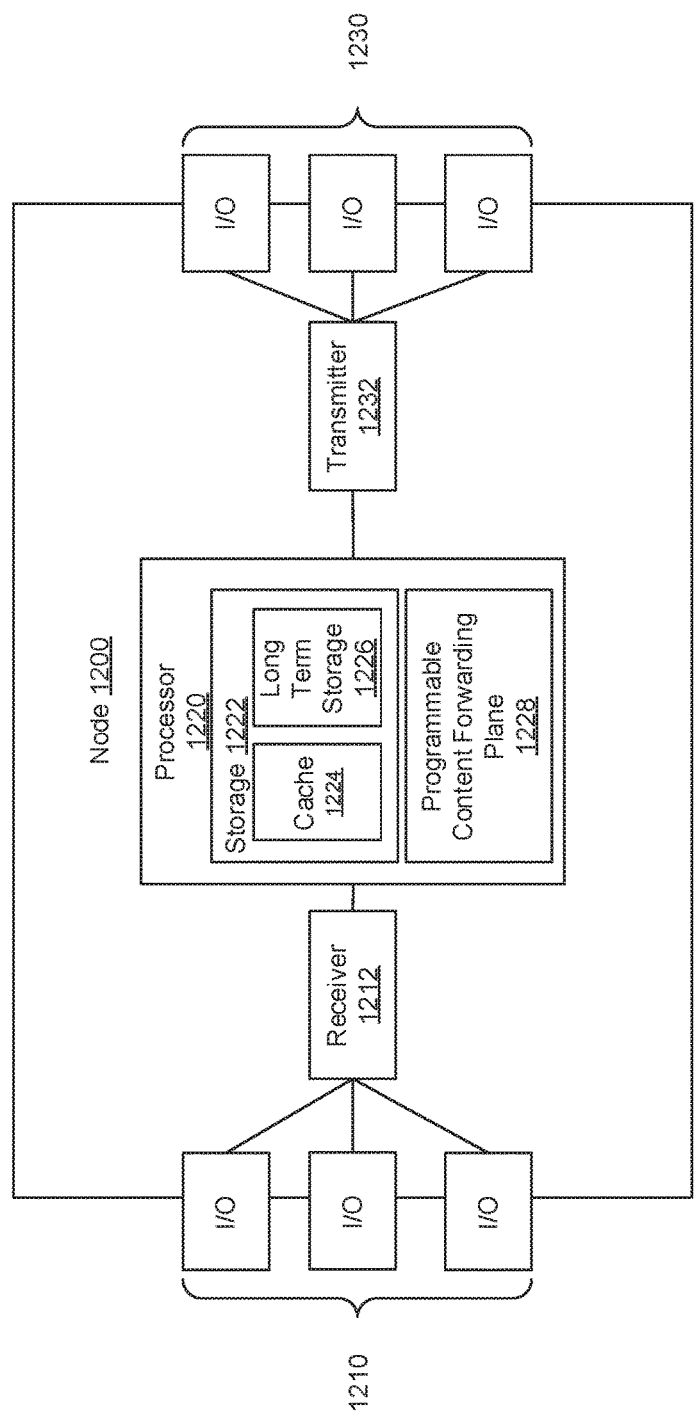
FIG. 12 illustrates an embodiment of a node in accordance with embodiments of the disclosure.

FIG. 12 illustrates an embodiment of a node 1200 (e.g., content router) in accordance with embodiments of the disclosure. The node 1200 may be, for example, the content router 106 (FIG. 1) or any other node or router as described above in the ICN. The node 1200 may comprise a plurality of input/output ports 1210/1230 and/or receivers (Rx) 1212 and transmitters (Tx) 1232 for receiving and transmitting data from other nodes, a processing system or processor 1220 (or content aware unit), including a storage 1222 and programmable content forwarding plane 1228, to process data and determine which node to send the data. The node 1200 may also receive Interest messages (or packets) and Data messages (packets) as described above. Although illustrated as a single processor, the processor 1220 is not so limited and may comprise multiple processors. The processor 1220 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1220 may be configured to implement any of the schemes described herein, such as the processes illustrated in FIGS. 1-11 using any one or combination of steps described in the embodiments. Moreover, the processor 1220 may be implemented using hardware, software, or both.

The storage 1222 (or memory) may include cache 1224 and long-term storage 1226, and may be configured to store routing tables, forwarding tables, or other tables or information disclosed herein. Although illustrated as a single storage, storage 1222 may be implemented as a combination of read only memory (ROM), random access memory (RAM), or secondary storage (e.g., one or more disk drives or tape drives used for non-volatile storage of data).

The programmable content forwarding plane 1228 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, FIB) at the processor 1220. The programmable content forwarding plane 1228 may interpret user requests for content and accordingly fetch content, e.g., based on meta-data and/or content name (prefix), from the network or other content routers and may store the content, e.g., temporarily, in storage 1222. The programmable content forwarding plane 1228 may then forward the cached content to the user. The programmable content forwarding plane 1228 may be implemented using software, hardware, or both and may operate above the IP layer or L2.

Figure 13:
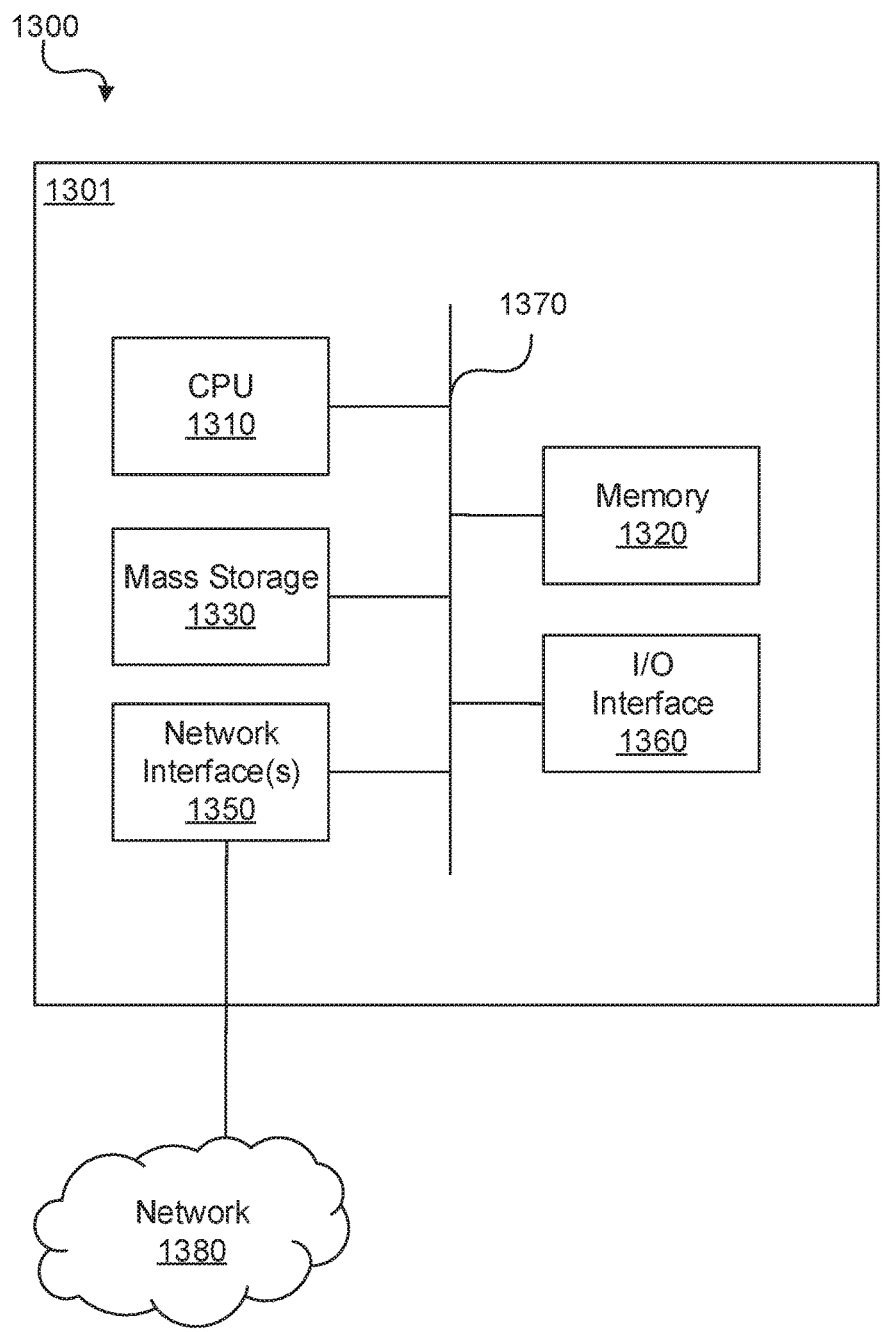
FIG. 13 is a block diagram of a network system that can be used to implement various embodiments.

FIG. 13 is a block diagram of a network system 1300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1301 (e.g., a consumer, a subscriber, a producer, a data store, or a router as described herein) equipped with one or more input/output devices, such as network interfaces, storage interfaces, and the like. The processing unit 1301 may include a central processing unit (CPU) 1310, a memory

1320, a mass storage device 1330, and an I/O interface 1360 connected to a bus. The bus may be one or more of any type of several bus architectures including a memory bus or memory controller, a peripheral bus or the like.

The CPU 1310 may comprise any type of electronic data processor. The CPU 1310 may be configured to implement any of the schemes described herein, such as the processes illustrated in FIGS. 1-11 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "port" will be understood to include a network interface.

Figure 14:
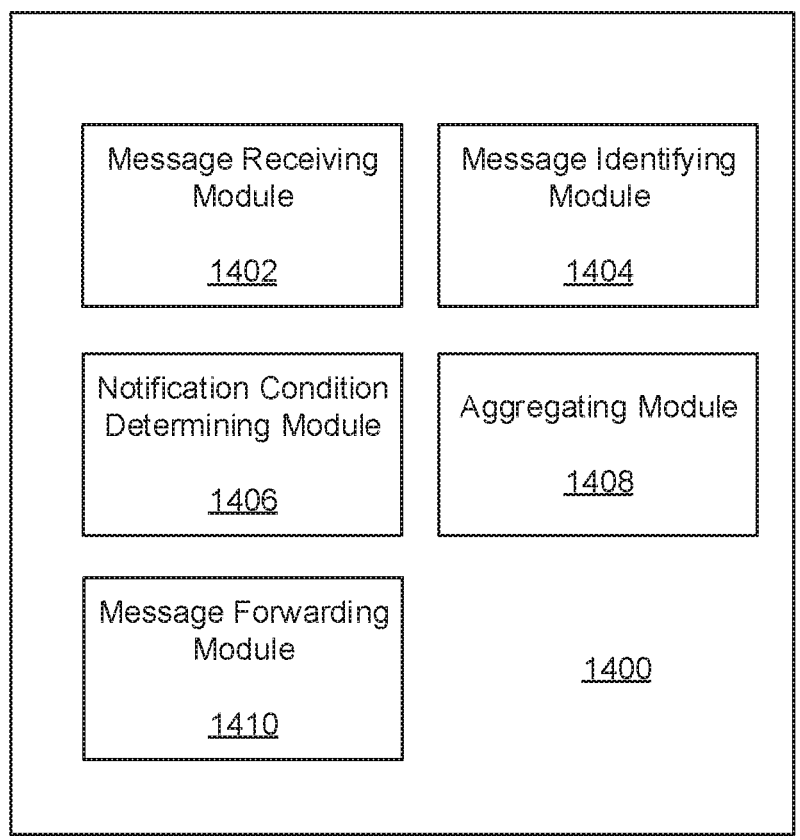
FIG. 14 is a diagram of embodiments of an apparatus used to forward packets in an ICN.

FIG. 14 is a diagram of one embodiment of an apparatus 1400 used to forward packets in an ICN. In one embodiment, the apparatus 1400 may include or be part of a content router 106. In certain embodiments, processes FIGS. 1-11 may be performed based on apparatus 1400. The apparatus includes message receiving module 1402, message identification module 1404, notification condition determining module 1406, aggregating module 1408, and message forwarding module 1410, in this embodiment. The various modules could be implemented with any combination of hardware and/or software. In general, the message receiving module 1402, may be configured to receive either interest or data packets at ports of the apparatus 1400. The message identification module 1404 may be configured to at least identify the type of message received as normal, subscription or notification. The notification condition determining module 1406 may be configured to identify the notification condition of incoming subscription messages and/or perform the functions described for processor 310 herein. The aggregating module 1408 may be configured to compare and aggregate notification conditions of incoming/current subscription messages and those of existing subscriptions; and/or perform the functions described for processor 320 of herein. The message forwarding module 1410 may be configured to determine what port to forward the interest or data packet on, and to send the packet on that port; and/or perform subscription and notification message forwarding functions described for router 106 herein.

In one embodiment, the message receiving module 1402 receives a first and a prior second subscription interest message. The message identification module 1404 may then identifying a first interest message received at the router in the ICN as including a first subscription request and a first notification condition from a first subscriber. The notification condition determining module 1406 may then determine that the first notification condition has an overlap (subset, superset, intersect) with the second notification condition included in the prior second subscription request stored in a forwarding information base (FIB) of the router, the second subscription request included in the second interest message that was received at the router and forwarded by the router towards a producer of the data. The aggregating module 1408 may then aggregate the first notification condition with the second notification condition (this may include changing the first notification condition in the first subscription message based on the second notification condition). In some embodiments, the message forwarding module 1410 may forward a subscription message with the aggregated notification conditions towards a producer.

The apparatus 1400 is not limited to the example modules. In one embodiment, the apparatus 1400 has a producer determining module that determines subscriptions are for more than one producer. The apparatus 1400 may further have a available face forwarding module that determines if there is an available face forwarding to producer in FFLP.

In some example embodiments, the apparatus 1400 may further include one or more elements for performing any one or combination of steps described in the embodiments. In accordance with various embodiments of the present disclosure, the methods described herein may be implemented using a hardware computer system that executes software programs.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals. It should be understood that the software can be installed in and sold with the router device 106. Alternatively the software can be obtained and loaded into the router device 106, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented method for routing data in an information centric network (ICN), the method comprising:
    identifying a first interest message received at a router in the ICN as including a first subscription request and a first notification condition from a first subscriber;
    determining that the first notification condition has an overlap with a second notification condition included in a second subscription request stored in a forwarding information base (FIB) of the router, the second subscription request included in a second interest message that was received at the router and forwarded by the router towards a producer of the data; and
    aggregating the first notification condition with the second notification condition by changing the first notification condition in the first interest message based on the second notification condition.

2. The computer-implemented method of claim 1, wherein
    the first interest message has a first subscriber forwarding face and the second interest message has a second subscriber forwarding face;
    the forwarding information base (FIB) includes a forwarding face list to producer (FFLP) and a forwarding face list to subscriber (FFLS); and
    forwarding data received in a notification message by at least one producer to the first and second subscribers when the first and second subscriber notification conditions are respectively satisfied by the producer.

3. The computer-implemented method of claim 1, wherein
    the determining includes
        determining whether the first and second interest messages are for more than one producer, and
        determining whether the first notification condition overlaps with the second notification condition is one of a subset of, a superset of, or intersects with the second notification condition; and
    the aggregating includes
        recording the first notification condition based on one of whether the first and second interest messages are for more than one producer, or whether the first notification condition is a subset of, a superset of, or intersects with the second notification condition.

4. The computer-implemented method of claim 2, wherein when the first notification condition is a subset of the second notification condition, the aggregating includes:
    dropping the first interest message; and
    recording the first subscriber forwarding face of the first interest message and the first notification condition in a forwarding face list to subscriber (FFLS) of the forwarding information base (FIB).

5. The computer-implemented method of claim 3, wherein when:
    the first notification condition does not intersect with any other notification condition stored in the forwarding information base (FIB); and
    a forwarding face to a producer is stored in a forwarding face list to producer (FFLP) that has not been associated with any notification condition in the forwarding information base (FIB), the aggregating includes:
        recording the first subscriber forwarding face and the first notification condition of the first interest message in the forwarding face list to subscriber (FFLS) of the forwarding information base (FIB);
        forwarding the first interest message with the first notification condition to the forwarding face to a producer that has not been associated with any notification condition in the forwarding information base (FIB); and
        updating the forwarding face list to producer (FFLP) of the forwarding information base (FIB) according to the forwarding.

6. The computer-implemented method of claim 3, wherein when:
    the first notification condition does not intersect with any other notification condition stored in the forwarding information base (FIB); and
    a forwarding face to a producer is not stored in a forwarding face list to producer (FFLP) that has not been associated with any notification condition in the forwarding information base (FIB), the aggregating includes:
        recording the first subscriber forwarding face and the first notification condition of the first interest message in the forwarding face list to subscriber (FFLS) of the forwarding information base (FIB);
        randomly selecting a forwarding face to a producer in the FFLP;
        combining the first notification condition with a notification condition associated with the randomly selected forwarding face in the FFLP;

forwarding the first interest message with the combined notification condition to the randomly selected forwarding face; and updating the FFLP of the forwarding information base (FIB) according to the forwarding.

7. The computer-implemented method of claim 3, wherein when:

the first notification condition is a superset of the second notification condition and does not intersect with any other notification condition stored in the forwarding information base (FIB);

the first and second interest messages are for more than one producer; and a forwarding face to a producer is stored in a forwarding face list to producer (FFLP) that has not been associated with any notification condition in the forwarding information base (FIB), the aggregating includes:

recording the first subscriber forwarding face and the first notification condition of the first interest message in the forwarding face list to subscriber (FFLS) of the forwarding information base (FIB);

changing the first notification condition in the first interest message to a disjoint set between superset and subset conditions of the first and second notification conditions;

forwarding the first interest message with the changed first notification condition to the forwarding face to a producer that has not been associated with any notification condition in the forwarding information base (FIB); and updating the forwarding face list to producer (FFLP) of the forwarding information base (FIB) according to the forwarding.

8. The computer-implemented method of claim 3, wherein when:

the first notification condition is a superset of the second notification condition and does not intersect with any other notification condition stored in the forwarding information base (FIB);

the first and second interest messages are for more than one producer; and a forwarding face to a producer is not stored in the FFLP that has not been associated with any notification condition in the forwarding information base (FIB), the aggregating includes:

recording the first subscriber forwarding face and the first notification condition of the first interest message in a forwarding face list to subscriber (FFLS) of the forwarding information base (FIB);

forwarding the first interest message to a forwarding face to a producer with which the second notification condition is associated;

changing the second notification condition in the FFLP to be the first notification condition; and updating the FFLP of the forwarding information base (FIB) according to the forwarding.

9. The computer-implemented method of claim 3, wherein when:

the first notification condition intersects with at least the second notification condition stored in the forwarding information base (FIB);

the first and second interest messages are for more than one producer; and a forwarding face to a producer is stored in a forwarding face list to producer (FFLP) that has not been associated with any notification condition in the forwarding information base (FIB), the aggregating includes:

recording the first subscriber forwarding face and the first notification condition of the first interest message in the forwarding face list to subscriber (FFLS) of the forwarding information base (FIB);

changing the first notification condition in the first interest message to a disjoint set from intersected conditions of the first and at least the second notification conditions;

forwarding the first interest message with the changed first notification condition to the forwarding face to a producer that has not been associated with any notification condition in the forwarding information base (FIB); and updating the FFLP of the forwarding information base (FIB) according to the forwarding.

10. The computer-implemented method of claim 3, wherein when:

the first notification condition intersects with at least the second notification condition stored in the forwarding information base (FIB);

the first and second interest messages are for more than one producer; and a forwarding face to a producer is not stored in a forwarding face list to producer (FFLP) that has not been associated with any notification condition in the forwarding information base (FIB), the aggregating includes:

recording the first subscriber forwarding face and the first notification condition of the first interest message in the forwarding face list to subscriber (FFLS) of the forwarding information base (FIB);

changing the first notification condition in the first interest message to a disjoint set from intersected conditions of the first and second notification conditions;

randomly selecting a forwarding face to a producer in the FFLP;

forwarding the first interest message with the changed first notification condition to the randomly selected forwarding face to a producer; and updating the FFLP of the forwarding information base (FIB) according to the forwarding.

11. The computer-implemented method of claim 3, and further comprising:

receiving data from the producer at the router device;

comparing the data to the recorded notification condition in FFLS; and forwarding the data via matching subscriber forwarding faces toward subscribers when the data satisfies FFLS.

12. The computer-implemented method of claim 1, wherein the first and second interest messages are encoded with bits identifying the first and second interest messages as having the first and second subscription requests and the first and second notification conditions; and the first and second interest messages are not stored in a pending interest table (PIT) of the router.

13. A router device, comprising:

a non-transitory memory storage comprising instructions;

a forwarding information based (FIB) stored on the non-transitory memory storage, the forwarding information base (FIB) including a forwarding face to a producer for named content and subscriber forwarding faces for the named content; and one or more processors in communication with the non-transitory memory storage, wherein the one or more processors execute the instructions to perform:

forwarding data to subscribers based on a forwarding face for the subscribers and as a function of an information centric network (ICN) the router device is part of;

identifying a first interest message received at the router device as including a first subscription request and a first notification condition from a first subscriber;

determining that the first notification condition has an overlap with a second notification condition included in a second subscription request stored in a forwarding information base (FIB) of the router device, the second subscription request included in a second interest message that was received at the router device and forwarded by the router device towards a producer of the data; and aggregating the first notification condition with the second notification condition by changing the first notification condition in the first interest message based on the second notification condition.

14. The router device of claim 13, wherein the first interest message has a first subscriber forwarding face and the second interest message has a second subscriber forwarding face;

the forwarding information base (FIB) includes a forwarding face list to producer (FFLP) and a forwarding face list to subscriber (FFLS); and forwarding data received in a notification message by at least one producer to the first and second subscribers when first and second subscriber notification conditions are respectively satisfied by the producer.

15. The router device of claim 13, wherein the determining includes the one or more processors further executing the instructions to perform:

determining whether the first and second interest messages are for more than one producer, and determining whether the first notification condition overlap with the second notification condition is one of a subset of, a superset of, or intersects with the second notification condition; and the aggregating includes the one or more processors further executing the instructions to perform:

recording the first notification condition based on one of whether the first and second interest messages are for more than one producer, or whether the first notification condition is a subset of, a superset of, or intersects with the second notification condition.

16. The router device of claim 14, wherein the one or more processors further executing the instructions to perform:

receiving data from one the producer at the router device;

comparing the data to the recorded notification condition in FFLS; and forwarding the data via matching subscriber forwarding faces toward subscribers when the data satisfies the FFLS.

17. The router device claim 13, wherein the first and second interest messages are encoded with bits identifying the first and second interest messages as having the first and second subscription requests and the first and second notification conditions; and the first and second interest messages are not stored in a pending interest table (PIT) of the router.

18. A non-transitory computer-readable medium storing computer instructions for routing data in an information centric network (ICN), that when executed by one or more processors, cause the one or more processors to perform the steps of:

identifying a first interest message received at a router in the ICN as including a first subscription request and a first notification condition from a first subscriber;

determining that the first notification condition has an overlap with a second notification condition included in a second subscription request stored in a forwarding information base (FIB) of the router, the second subscription request included in a second interest message that was received at the router and forwarded by the router towards a producer of the data; and aggregating the first notification condition with the second notification condition by changing the first notification condition in the first interest message based on the second notification condition.

19. The non-transitory computer-readable medium of claim 18, wherein the first interest message has a first subscriber forwarding face and the second interest message has a second subscriber forwarding face;

the forwarding information base (FIB) includes a forwarding face list to producer (FFLP) and a forwarding face list to subscriber (FFLS); and forwarding data received in a notification message by at least one producer to the first and second subscribers when the first and second subscriber notification conditions are respectively satisfied by the producer.

20. The non-transitory computer-readable medium of claim 18, wherein the determining causes the one or more processors to further perform the steps of:

determining whether the first and second interest messages are for more than one producer, and determining whether the first notification condition overlap with the second notification condition is one of a subset of, a superset of, or intersects with the second notification condition; and the aggregating causes the one or more processors to further perform the steps of:

recording the first notification condition based on one of whether the first and second interest messages are for more than one producer, or whether the first notification condition is a subset of, a superset of, or intersects with the second notification condition.

21. The non-transitory computer-readable medium of claim 20, wherein the one or more processors further perform the steps of:

receiving data from the producer at the router device;

comparing the data to the recorded notification condition in FFLS; and forwarding the data via matching subscriber forwarding faces toward subscribers when the data satisfies the FFLS.

22. The non-transitory computer-readable medium of claim 18, wherein the first and second interest messages are encoded with bits identifying the first and second interest messages as having the first and second subscription requests and the first and second notification conditions; and the first and second interest messages are not stored in a pending interest table (PIT) of the router.

* * * * *